United States Patent
Cai et al.

(10) Patent No.: US 9,668,241 B2
(45) Date of Patent: May 30, 2017

(54) SENDING FEEDBACK FOR MULTIPLE DOWNLINK CARRIERS

(71) Applicant: InterDigital Patent Holdings, Inc., Wilmington, DE (US)

(72) Inventors: Lujing Cai, Morganville, NJ (US); Benoit Pelletier, Roxboro (CA); Hong O. Zhang, Manalapan, NJ (US); Fengjun Xi, Huntington Station, NY (US); Yingxue K. Li, San Diego, CA (US); Christopher Cave, Dollard-des-Ormeaux (CA); Yan Li, Morganville, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 709 days.

(21) Appl. No.: 13/937,290

(22) Filed: Jul. 9, 2013

(65) Prior Publication Data

US 2013/0308612 A1    Nov. 21, 2013

Related U.S. Application Data

(63) Continuation of application No. 13/026,820, filed on Feb. 14, 2011, now Pat. No. 8,514,820.
(Continued)

(51) Int. Cl.
*H04W 72/02*    (2009.01)
*H04W 72/04*    (2009.01)
(Continued)

(52) U.S. Cl.
CPC .......... *H04W 72/04* (2013.01); *H04L 1/0028* (2013.01); *H04L 1/0073* (2013.01);
(Continued)

(58) Field of Classification Search
CPC ...................................................... H04W 72/04
(Continued)

(56) References Cited

U.S. PATENT DOCUMENTS 7,116,651 B2    10/2006    Hakkinen et al.
7,599,698 B2    10/2009    Cheng et al.
(Continued)

FOREIGN PATENT DOCUMENTS

CN    101523966 A    9/2009
JP    2011-517542 A    6/2011
(Continued)

OTHER PUBLICATIONS

3rd Generation Partnership Project (3GPP), R1-094069, "HS-DPCCH CQI Design for 4C-HSDPA", Qualcomm Europe, 3GPP TSG RAN WG1 Meeting #58bis Miyazaki, Japan Oct. 12-16, 2009, 1-16.
(Continued)

*Primary Examiner* — Parth Patel
(74) *Attorney, Agent, or Firm* — Condo Roccia Koptiw LLP

(57) ABSTRACT

Feedback information for multiple serving cells are transmitted on high speed dedicated physical control channel (HS-DPCCH). A slot format for transmitting feedback information is determined based on the number of configured secondary serving cells and whether multiple input multiple-output (MIMO) is configured in the serving cells. Spreading factor is reduced to 128 when two secondary serving cells are configured and MIMO is configured in at least one of the two configured secondary serving cells, or when three secondary serving cells are configured. The serving cells are grouped into feedback groups, each feedback group having one or more serving cells. Channel coding may be applied to feedback information for the feedback groups. The result-
(Continued)

ing encoded feedback information for the feedback groups is concatenated to form composite feedback information.

20 Claims, 46 Drawing Sheets

Related U.S. Application Data

(60) Provisional application No. 61/304,379, filed on Feb. 12, 2010, provisional application No. 61/320,592, filed on Apr. 2, 2010, provisional application No. 61/329,706, filed on Apr. 30, 2010, provisional application No. 61/356,437, filed on Jun. 18, 2010, provisional application No. 61/359,683, filed on Jun. 29, 2010, provisional application No. 61/374,187, filed on Aug. 16, 2010, provisional application No. 61/375,785, filed on Aug. 20, 2010.

(51) Int. Cl.
　　　H04L 1/16　　　(2006.01)
　　　H04L 5/00　　　(2006.01)
　　　H04W 52/32　　(2009.01)
　　　H04L 1/00　　　(2006.01)
　　　H04L 1/08　　　(2006.01)
　　　H04L 1/18　　　(2006.01)
　　　H04L 25/03　　(2006.01)

(52) U.S. Cl.
　　CPC .......... *H04L 1/1671* (2013.01); *H04L 5/0053* (2013.01); *H04W 52/325* (2013.01); *H04L 1/0026* (2013.01); *H04L 1/08* (2013.01); *H04L 1/1812* (2013.01); *H04L 2025/03808* (2013.01)

(58) Field of Classification Search
　　USPC .................................................. 370/336, 311
　　See application file for complete search history.

(56) References Cited

U.S. PATENT DOCUMENTS

| | | | |
|---|---|---|---|
| 7,882,084 B1* | 2/2011 | Amdahl | G06F 17/30522 707/693 |
| 8,514,820 B2* | 8/2013 | Cai | H04L 1/0028 370/328 |
| 8,543,124 B2* | 9/2013 | Papasakellariou | H04L 1/1692 370/315 |
| 8,854,976 B2* | 10/2014 | Xi | H04L 5/001 370/225 |
| 8,861,457 B2* | 10/2014 | Xu | H04L 1/00 370/329 |
| 8,917,605 B2* | 12/2014 | Pelletier | H04W 52/365 370/236 |
| 2004/0058687 A1* | 3/2004 | Kim | H04L 1/0026 455/452.2 |
| 2005/0113093 A1* | 5/2005 | Mohebbi | H04W 36/18 455/436 |
| 2005/0201474 A1 | 9/2005 | Cho et al. | |
| 2005/0243793 A1* | 11/2005 | Kim | H04W 24/00 370/347 |
| 2006/0077947 A1* | 4/2006 | Kim | H04L 1/0041 370/349 |
| 2006/0089142 A1* | 4/2006 | Vuorinen | H04W 36/0055 455/436 |
| 2006/0098567 A1 | 5/2006 | Willenegger et al. | |
| 2006/0221883 A1 | 10/2006 | Damnjanovic et al. | |
| 2007/0049309 A1* | 3/2007 | Pan | H04W 72/1289 455/509 |
| 2007/0195809 A1* | 8/2007 | Blanz | H04L 1/0025 370/426 |
| 2007/0223405 A1* | 9/2007 | Jiang | H04L 1/1812 370/278 |
| 2008/0025338 A1* | 1/2008 | Gorokhov | H04L 1/1819 370/441 |
| 2008/0026744 A1* | 1/2008 | Frederiksen | H04L 1/0026 455/425 |
| 2008/0026783 A1* | 1/2008 | Lee | H04L 1/0021 455/522 |
| 2008/0084844 A1 | 4/2008 | Reznik et al. | |
| 2008/0130584 A1* | 6/2008 | Pani | H04W 36/0083 370/332 |
| 2008/0212608 A1* | 9/2008 | Haikola | H04L 1/0003 370/465 |
| 2008/0267126 A1 | 10/2008 | Vujcic et al. | |
| 2008/0279257 A1 | 11/2008 | Vujcic et al. | |
| 2009/0034461 A1* | 2/2009 | Pelletier | H04L 25/03343 370/329 |
| 2009/0129259 A1* | 5/2009 | Malladi | H04B 7/0417 370/210 |
| 2009/0175214 A1* | 7/2009 | Sfar | H04B 7/15592 370/315 |
| 2009/0245212 A1 | 10/2009 | Sambhwani et al. | |
| 2009/0257387 A1* | 10/2009 | Gholmieh | H04L 5/0053 370/329 |
| 2009/0274960 A1* | 11/2009 | Yokouchi | H01M 4/133 429/231.8 |
| 2009/0316811 A1* | 12/2009 | Maeda | H04L 1/1671 375/260 |
| 2010/0050039 A1* | 2/2010 | Zhang | H04L 1/1822 714/749 |
| 2010/0113078 A1 | 5/2010 | Farajidana et al. | |
| 2010/0130219 A1* | 5/2010 | Cave | H04W 72/02 455/450 |
| 2010/0238984 A1* | 9/2010 | Sayana | H04B 7/0634 375/219 |
| 2010/0254268 A1* | 10/2010 | Kim | H04W 36/385 370/241 |
| 2010/0273435 A1* | 10/2010 | Sun | H04W 72/04 455/67.13 |
| 2010/0281323 A1* | 11/2010 | Wang | H04B 7/15507 714/748 |
| 2011/0026475 A1* | 2/2011 | Lee | H04L 5/001 370/329 |
| 2011/0026495 A1* | 2/2011 | Lee | H04L 5/0007 370/335 |
| 2011/0103326 A1* | 5/2011 | Kim | H04L 1/1812 370/329 |
| 2011/0110239 A1* | 5/2011 | Blanz | H04B 7/024 370/241 |
| 2011/0116530 A1* | 5/2011 | Sambhwani | H04L 1/1607 375/145 |
| 2011/0128901 A1* | 6/2011 | Lee | H04L 27/2608 370/311 |
| 2011/0158118 A1* | 6/2011 | Chou | H04L 27/2601 370/252 |
| 2011/0194500 A1* | 8/2011 | Kim | H04L 1/1854 370/328 |
| 2011/0300887 A1* | 12/2011 | Osterling | H04W 52/0206 455/507 |
| 2011/0317637 A1* | 12/2011 | Kim | H04L 1/1819 370/329 |
| 2012/0069793 A1* | 3/2012 | Chung | H04L 27/2613 370/315 |
| 2012/0106530 A1* | 5/2012 | Drugge | H04B 1/7083 370/338 |
| 2012/0140689 A1* | 6/2012 | Pelletier | H04W 76/048 370/311 |
| 2013/0182685 A1* | 7/2013 | Yu | H04W 72/087 370/336 |
| 2015/0139059 A1* | 5/2015 | Park | H04L 5/0098 370/311 |

FOREIGN PATENT DOCUMENTS

| | | |
|---|---|---|
| RU | 2360376 C2 | 6/2009 |
| RU | 2392749 C2 | 6/2010 |
| TW | 2006-37399 | 10/2006 |
| TW | 2007-27614 | 7/2007 |

(56) References Cited

FOREIGN PATENT DOCUMENTS

| | | |
|---|---|---|
| TW | 2007-29785 | 8/2007 |
| WO | WO 93/19544 A1 | 9/1993 |
| WO | WO 2005/122458 A1 | 12/2005 |
| WO | WO 2006/064047 A1 | 6/2006 |
| WO | WO 2007/053840 A2 | 5/2007 |
| WO | WO 2008/022243 A2 | 2/2008 |
| WO | WO 2008/041098 A2 | 4/2008 |
| WO | WO 2009/008787 A1 | 1/2009 |
| WO | WO 2009/120797 A1 | 10/2009 |
| WO | WO 2009/132290 A2 | 10/2009 |

OTHER PUBLICATIONS

3rd Generation Partnership Project (3GPP), R1-100279, "HS-DPCCH Design for 4C-HSDPA", Qualcomm Incorporated, 3GPP TSG-RAN WG1 #59bis Valencia, Spain, Jan. 18-22, 2010, 5 pages.

3rd Generation Partnership Project (3GPP), R1-100602, "HS-DPCCH Design Principles", Nokia Siemens Networks, 3GPP TSG-RAN WG1 Meeting #59bis Valencia, Spain, Jan. 18-22, 2010, 3 pages.

3rd Generation Partnership Project (3GPP), R1-100603, "Cubic Metric Results for HS-DPCCH Design Options for 4-Carrier HSDPA", Nokia Siemens Networks, JGPP TSG-RAN WG1 Meeting #59bis Valencia, Spain, Jan. 18-22, 2010, 3 pages.

3rd Generation Partnership Project (3GPP), Tdoc R1-02-0636, "HS-DPCCH Power Control Using the Special Pilot Bits in HS-DPCCH Revision of R1-01-0562", Samsung, Motorola, 3GPP TSG-RAN WG1 #25 Paris, France, Apr. 9-12, 2002, 7 pages.

3rd Generation Partnership Project (3GPP), R1-091317, "HS-DPCCH design for DC-HSDPA MIMO Operation", Ericsson, 3GPP TSG RAN WG1 Meeting #56bis, Seoul, Korea, Mar. 23-28, 2009, 15 pages.

3rd Generation Partnership Project (3GPP), R1-091599, "HS-DPCCH design for DC-HSDPA and MIMO", Qualcomm Europe, 3GPP TSG-RAN WG1 #56bis, Seoul, South Korea, Mar. 23-27, 2009, 21 pages.

3rd Generation Partnership Project (3GPP), R1-101329, "HS-DPCCH Orders for Activation and De-Activation of Secondary Carriers in 4C-HSDPA", Qualcomm Incorporated, 3GPP TSG-RAN WG1, Meeting #60, San Francisco, CA, Feb. 22-26, 2010, 8 pages.

3rd Generation Partnership Project (3GPP), R1-101516, "HS-DPCCH for 4-Carrier HSDPA", Nokia, 3GPP TSG-RAN WG1, Meeting #60, San Francisco, CA, Feb. 22-26, 2010, 3 pages.

3rd Generation Partnership Project (3GPP), R1-103948, "PCI/CQI Coding and Mapping for 4C-HSDPA", InterDigital Communications, LLC, 3GPP TSG-RAN WG1, Meeting #61 bis, Dresden, Germany, Jun. 28- Jul. 2, 2010, 7 pages.

3rd Generation Partnership Project (3GPP), RP-090976, "Four Carrier HSUPA", Work Item Description, 3GPP TSG-RAN WG1, Sep. 2009, 7 pages.

3rd Generation Partnership Project (3GPP), TDOC RP-030699, "Clarification on Reconfiguration of HSDPA", Panasonic, 3GPP TSG RAN Meeting #22, Maui, Hawaii, US, Dec. 9-12, 2003, 1-4.

3rd Generation Partnership Project (3GPP), TS 25.211 V9.0.0, "Technical Specification Group Radio Access Network, Physical Channels and Mapping of Transport Channels Onto Physical Channels (FDD) (Release 9)", Sep. 2009, 56 pages.

3rd Generation Partnership Project (3GPP), TS 25.212 V9.0.0, "Technical Specification Group Radio Access Network, Multiplexing and Channel Coding (FDD) (Release 9)", Sep. 2009, 108 pages.

3rd Generation Partnership Project (3GPP), TS 25.213 V9.0.0, "Technical Specification Group Radio Access Network; Spreading and Modulation (FDD) (Release 9)", Sep. 2009, 36 pages.

3rd Generation Partnership Project (3GPP), TS 25.214 V9.0.0, "Technical Specification Group Radio Access Network; Physical Layer Procedures (FDD) (Release 9)", Sep. 2009, 95 pages.

European Telecommunications Standards Institute (ETSI), TS 125. 212 V9.1.0, "Universal Mobile Telecommunications System (UMTS), Multiplexing and channel coding (FDD), (3GPP TS 25.212 Version 9.1.0 Release 9)", Jan. 2010, 1-110.

European Telecommunications Standards Institute (ETSI), TS 125. 213 V9.1.0, "Universal Mobile Telecommunications System (UMTS), Spreading and Modulation (FDD), (3GPP TS 25.213 version 9.1.0 Release 9)", Jan. 2010, 1-40.

European Telecommunications Standards Institute (ETSI), TS 125. 214 V9.1.0, "Universal Mobile Telecommunications System (UMTS), Physical Layer Procedures (FDD), (3GPP TS 25.214 version 9.1.0 Release 9)", Jan. 2010, 1-100.

3rd Generation Partnership Project (3GPP), R1-100592, "Protocol Aspects of 4-Carrier HSDPA", Ericsson, ST-Ericsson, 3GPP TSG RAN WG1 Meeting #59bis, Valencia, Spain, Jan. 18-22, 2010, 7 pages.

3rd Generation Partnership Project (3GPP), R1-102482, "On the Benefits of HS-DPCCH Optimizations for 3C-HSDPA", Ericsson, ST-Ericsson, 3GPP TSG RAN WG1 Meeting #60bis, Beijing, China, Apr. 12-16, 2010, 11 pages.

3rd Generation Partnership Project (3GPP), R2-020769, "Need for MAC-HS Segmentation Mechanism", Qualcomm, 3GPP TSG-RANWG2 Meeting #28, Kobe, Japan, Apr. 8-12, 2002, 7 pages.

3rd Generation Partnership Project (3GPP), R2-052749, "User Plane Protocol Enhancements", Ericsson, TSG-RAN WG2 Meeting #48bis, Cannes, France, Oct. 10-14, 2005, 4 pages.

3rd Generation Partnership Project (3GPP), TS 25.214 V9.1.0, "Technical Specification, Group Radio Access Network, Physical Layer Procedures (FDD) (Release 9)", Dec. 2009, pp. 1-98.

\* cited by examiner

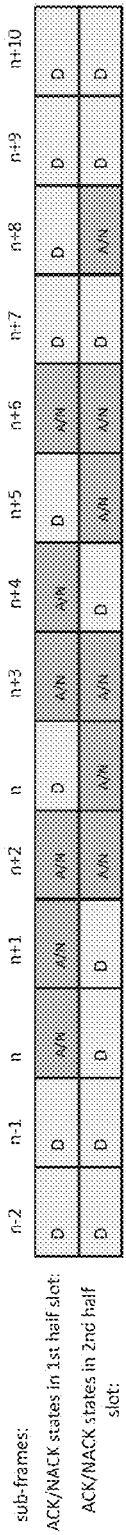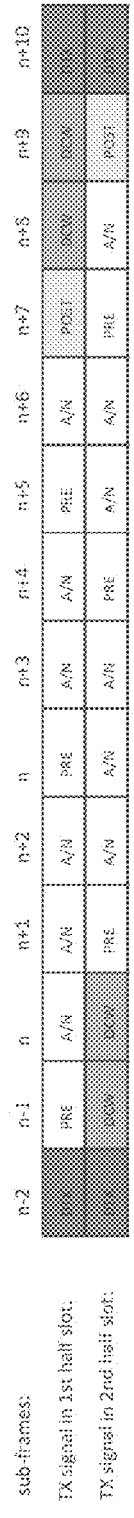
Figure 58
Figure 59

SENDING FEEDBACK FOR MULTIPLE DOWNLINK CARRIERS

CROSS REFERENCE TO RELATED APPLICATIONS

This application is a continuation of U.S. application Ser. No. 13/026,820 filed Feb. 14, 2011, which claims the benefit of U.S. Provisional Application Ser. No. 61/304,379 filed Feb. 12, 2010, U.S. Provisional Application Ser. No. 61/320, 592, filed Apr. 2, 2010, U.S. Provisional Application Ser. No. 61/329,706 filed Apr. 30, 2010, U.S. Provisional Application Ser. No. 61/356,437 filed Jun. 18, 2010, U.S. Provisional Application Ser. No. 61/359,683 filed Jun. 29, 2010, U.S. Provisional Application Ser. No. 61/374,187 filed Aug. 16, 2010, U.S. Provisional Application Ser. No. 61/375,785 Aug. 20, 2010, all of which are hereby incorporated by reference herein.

BACKGROUND

Simultaneous use of two high speed downlink packet access (HSDPA) downlink carriers was introduced as part of the Release 8 of the third generation partnership project (3GPP) wireless code division multiple access (WCDMA). This feature improves the bandwidth usage via frequency diversity and resource pooling. As the data usage continues to increase rapidly, high speed packet access (HSPA) deployment is foreseen to be deployed in more than two downlink carriers. For example, four carrier HSDPA (4C-HSDPA) may allow up to four carriers to operate simultaneously to achieve higher downlink throughput.

Feedback information such as positive acknowledgement/negative acknowledgement (ACK/NACK) information for hybrid automatic repeat request (HARQ) and channel quality indication (CQI) information may indicate the downlink channel conditions. Feedback information may be transmitted to the network over the high speed dedicated physical control channel (HS-DPCCH) feedback channel in the uplink. However, current technologies may not accommodate sending feedback information for multiple carriers such as three or more carriers. Therefore, there is a need for feedback transmission mechanisms that may allow the network to transmit in more than two carriers simultaneously, allow a wireless transmit/receive unit (WTRU) to acknowledge data reception for more than two carriers, and allow multiple the data streams if MIMO is configured.

SUMMARY

Systems, methods, and instrumentalities are disclosed that may provide for sending feedback for multiple serving cells/downlink carriers. The serving cells may include a primary serving cell and one or more secondary serving cells. Feedback information may be sent via high speed dedicated physical control channel (HS-DPCCH). Feedback information may include hybrid automatic repeat request (HARQ) positive acknowledgement/negative acknowledgement (ACK/NACK) and channel quality indication (CQI)/precoding control indication (PCI).

In an embodiment, a slot format for transmitting feedback information may be determined based on the number of configured secondary serving cells and whether multiple input multiple-output (MIMO) is configured in the serving cells. For example, one slot format may use a spreading factor of 256, and one slot format may use a spreading factor reduced from 256 to 128 for high speed downlink packet access (HSDPA). For example, the slot format with spreading factor of 128 may be selected when two secondary serving cells are configured and MIMO is configured in at least one of the two configured secondary serving cells. For example, the slot format with a spreading factor of 128 may be selected when three secondary serving cells are configured.

In an embodiment, the serving cells may be grouped into feedback groups. A feedback group may include one or more serving cells. Channel coding may be applied to feedback information for the feedback groups. The resulting encoded feedback information for the feedback groups may be concatenated to form composite feedback information. The composite feedback information may be mapped to a physical channel.

For example, HARQ feedback information for the serving cells in a feedback group may be jointly encoded. HARQ feedback information for one feedback group may be transmitted in a portion of a time slot allocated for HARQ feedback transmission. The other portion(s) of the time slot may be used to transmit HARQ feedback information for other feedback group(s). For example, CQI/PCI feedback information for the serving cells may be encoded individually. The CQI/PCI information for one feedback group may be transmitted in a time slot allocated for CQI feedback transmission, and the other time slot(s) in the subframe allocated for CQI/PCI transmission may be used to transmit CQI/PCI information for other feedback group(s).

In an embodiment, the serving cells may include a deactivated cell. Feedback information may not be transmitted for the deactivated cell. For example, a discontinuous transmission (DTX) message may be indicated for the deactivated cell in a feedback field of a HS-DPCCH subframe. For example, feedback information for active cells may be repeated to fill the whole feedback field in the HS-DPCCH subframe.

In an embodiment, different power offsets may be applied to the feedback groups. A power offset for HARQ field and CQI field may be determined depending on codebooks used. A CQI feedback cycle may be configured on a carrier-specific, carrier group-specific or common basis.

BRIEF DESCRIPTION OF THE DRAWINGS

A more detailed understanding may be had from the following description, given by way of example in conjunction with the accompanying drawings wherein.

FIGS. 14-37 illustrate example HS-DPCCH subframe formats.

FIGS. 44-55 illustrate example HS-DPCCH layouts.

FIGS. 56-61 illustrate example transmission of ACK/NACK information on HS-DPCCH over a series of subframes.

DETAILED DESCRIPTION OF ILLUSTRATIVE EMBODIMENTS

Figure 1A:
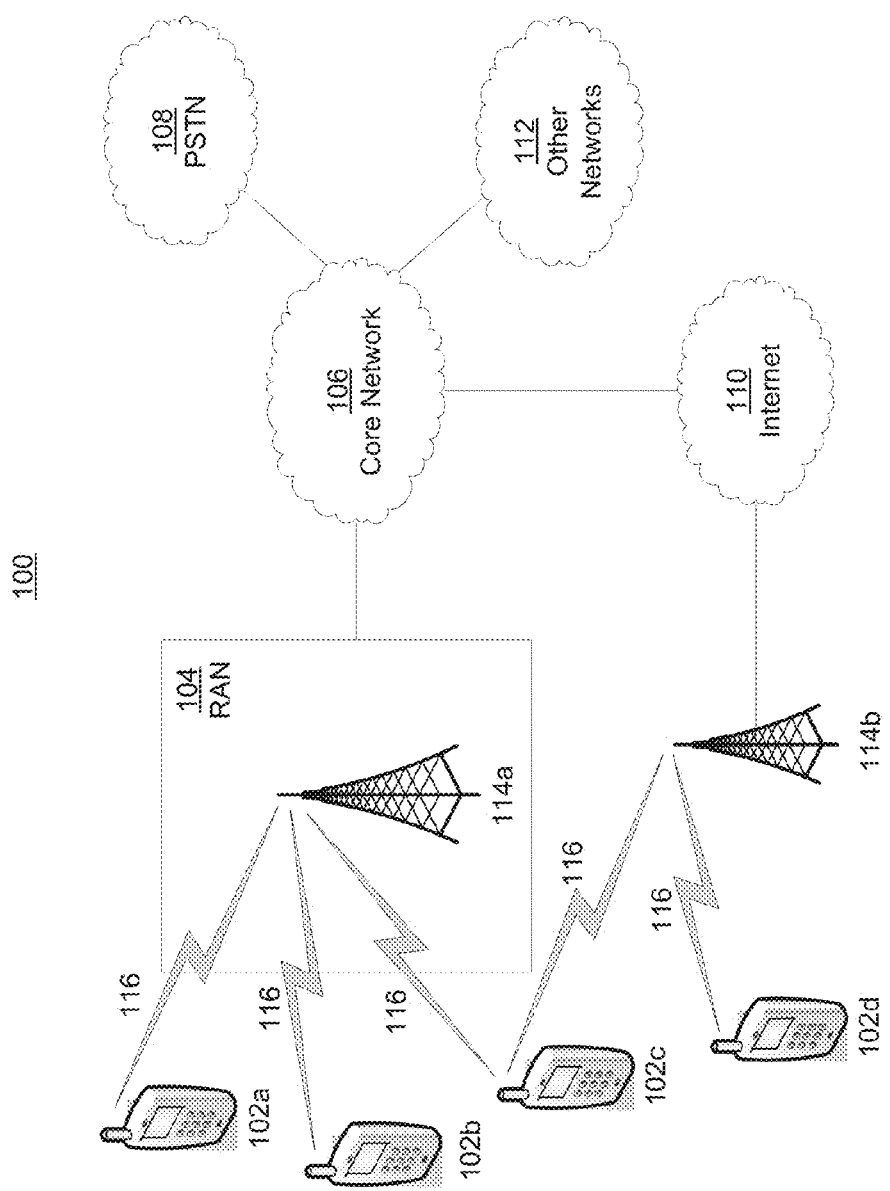
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
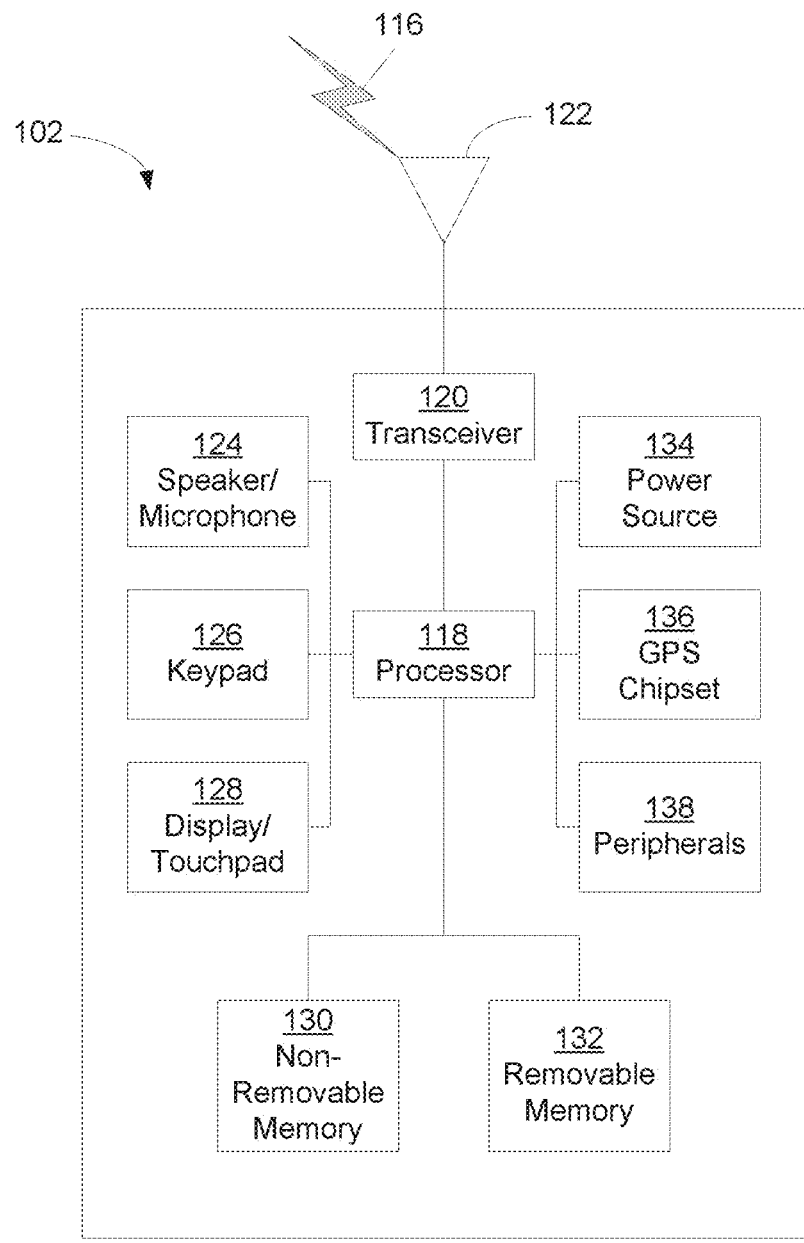
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
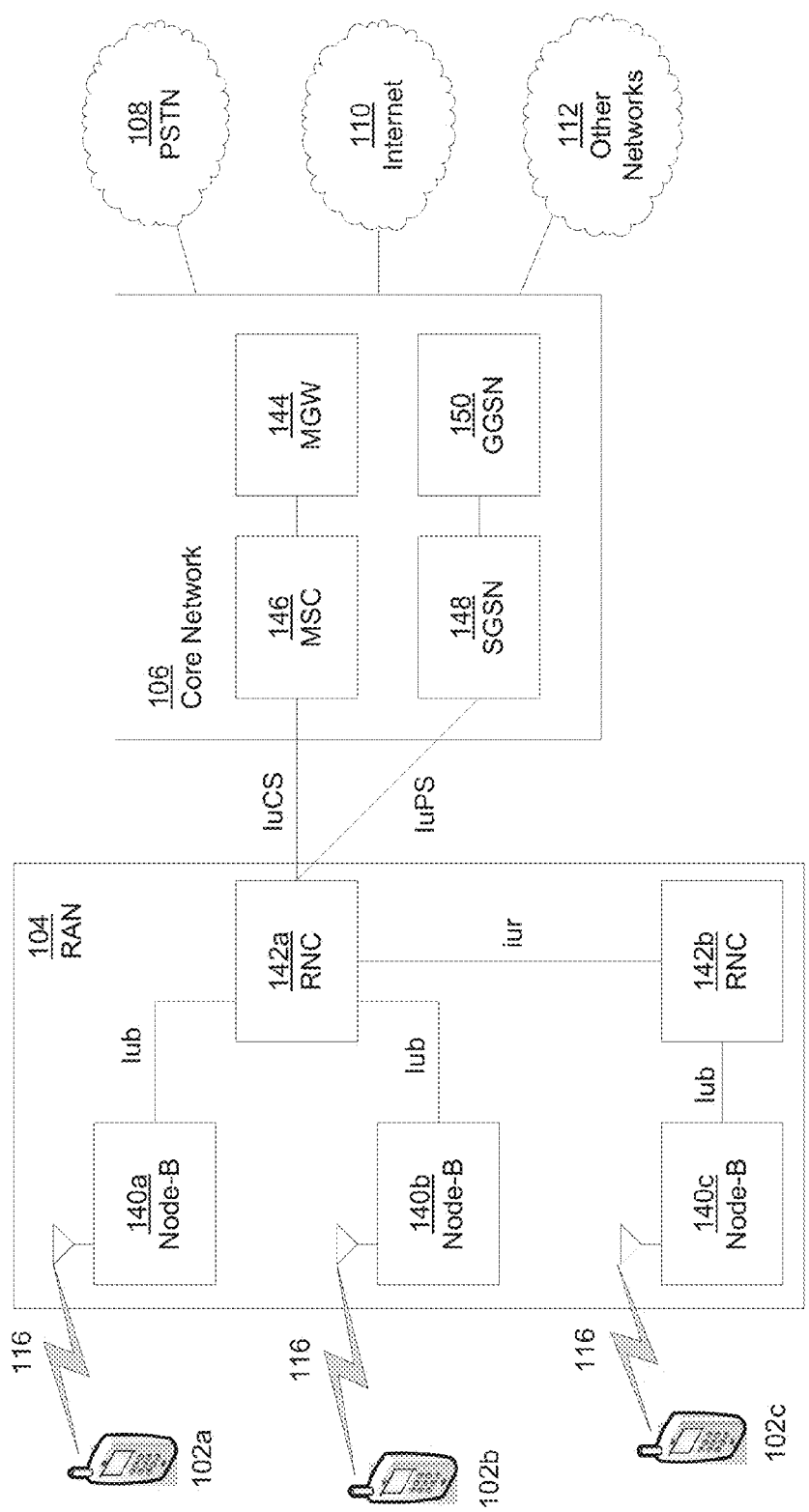
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 2A:
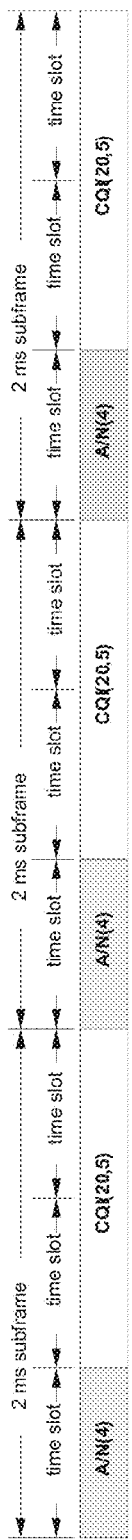
FIGS. 2A-2D illustrate example HS-DPCCH formats for single and dual carrier operation.

FIG. 2A illustrates an example HS-DPCCH format for single carrier operation (SC). As shown, the ACK/NACK codebook size may be 4 that may be denoted as A/N(4). The HS-DPCCH format may include a CQI table of 5 bits encoded by a (20, 5) Reed Muller code that may be denoted as CQI(20,5).

Figure 2B:
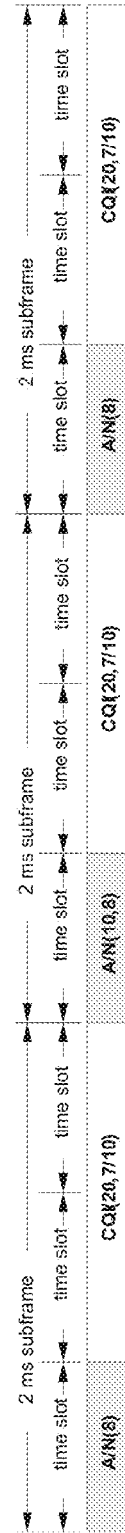

FIG. 2B illustrates an example HS-DPCCH format for single carrier operation with MIMO (SC+MIMO). As shown, the ACK/NACK codebook size may be 8 that may be denoted as A/N(8). For type A transmission, the HS-DPCCH format may include 8 bits of CQI+2 bits of PCI encoded by a (20, 10) Reed Muller code. For type B transmission, the HS-DPCCH format may include a CQI table of 5 bits encoded by a (20, 7) Reed Muller code. As shown in 2B, the format of the CQI table may be denoted as CQI(20,7/10).

Figure 2C:
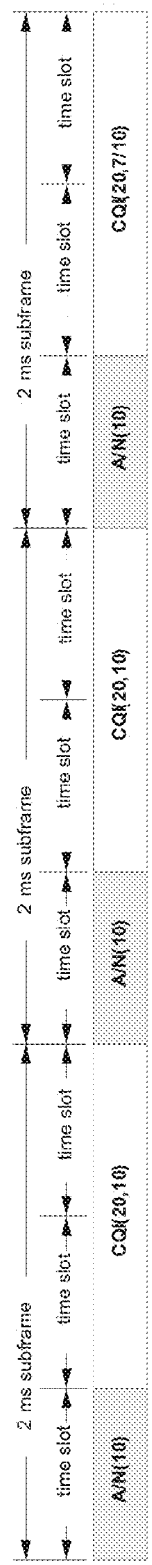

FIG. 2C shows an example HS-DPCCH format for dual carrier operation (DC). The ACK/NACK codebook size may be 10 that may be denoted as A/N(10). The HS-DPCCH format may include a CQI table of 10 bits encoded by a (20, 10) Reed Muller code that may be denoted as CQI(20,10).

Figure 2D:
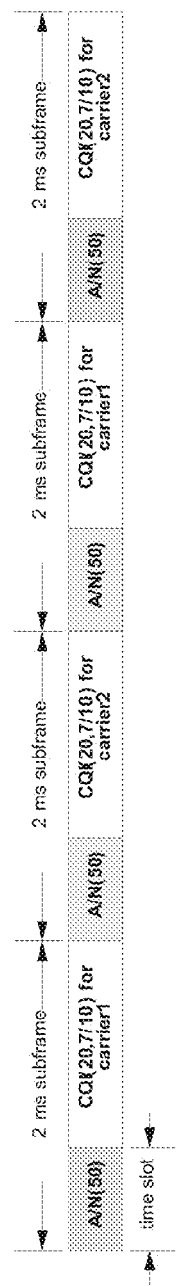

FIG. 2D shows an example HS-DPCCH format for dual carrier operation with MIMO (DC+MIMO). The ACK/NACK codebook size may be 50 that may be denoted as A/N(50). For type A transmission, the HS-DPCCH format may include a CQI table of 8 bits of CQI+2 bits of PCI encoded by a (20, 10) Reed Muller code. For type B, the HS-DPCCH format may include a CQI table of 5 bits of CQI+2 bits of precoding control information (PCI) encoded by a (20, 7) Reed Muller code. As shown in 2D, the format of the CQI table may be denoted as CQI(20,7/10). As shown in 2D, the CQI/PCI information for carriers 1 and 2 may be time multiplexed.

Figure 3:
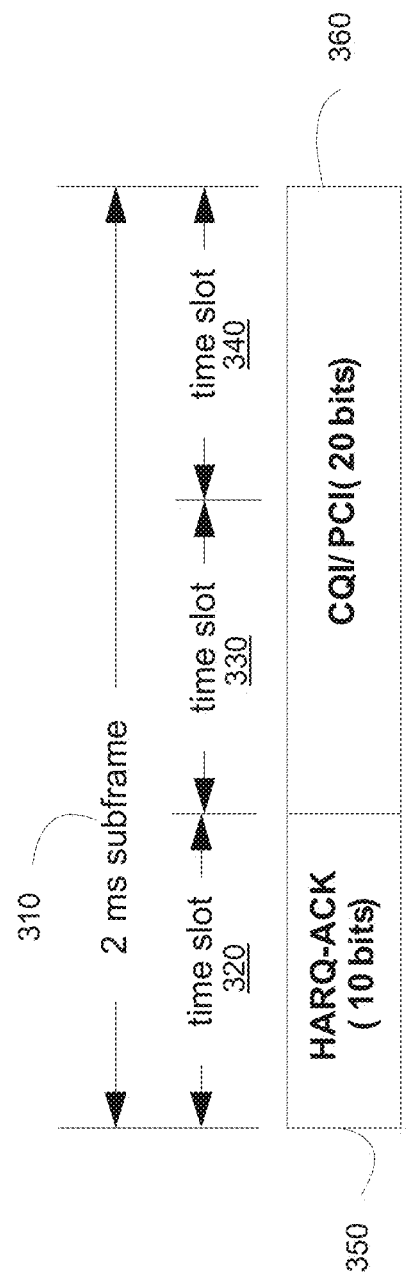
FIGS. 3-5 illustrate example HS-DPCCH subframe formats.

FIG. 3 shows an HS-DPCCH format. As shown a subframe 310 may include three time slots 320, 330, and 340. The HS-DPCCH may be configured using binary phase shift keying (BPSK) modulation with a spreading factor of 256, and a single channelization code. The HARQ-ACK field 350 allocated for carrying the acknowledgement feedback may take one time slot such as time slot 320 that may contain 10 bits. The CQI/PCI field 360 may be assigned two time slots such as time slot 330 and 340 with a total of 20 bits. The HARQ-ACK field 350 may carry the feedback for up to two HS-DSCH cells with MIMO and the CQI/PCI field 360 may carry the feedback for up to two HS-DSCH cells with MIMO alternating between each cell in time division multiplexing (TDM) fashion. The HARQ-ACK and CQI/PCI fields 350 and 360 may be coded and transmitted independently.

Example embodiments are described under the context of 3GPP Universal Mobile Telecommunications System (UMTS). To simplify the description in the context of UMTS, the following definitions may be applicable. For example, "Secondary_Cell_Enabled" may describe whether the WTRU is configured with secondary serving cell(s). "Secondary_Cell_Active" may describe whether the WTRU is configured with active secondary serving cell(s). If the WTRU is configured with one or multiple secondary serving HS-DSCH cells, Secondary_Cell_Enabled may be 1; otherwise Secondary_Cell_Enabled may be 0 and Secondary_Cell_Active may be 0. Secondary_Cell_Active may be 1 when Secondary_Cell_Enabled is 1 and at least one of the secondary serving HS-DSCH cells is activated (e.g., via HS-SCCH orders); otherwise, Secondary_Cell_Active may be 0. "Number_of Secondary_Active_Cells" may describe the number of active secondary serving cells. For example, if Secondary_Cell_Enabled is 1 and Secondary_Cell_Active is 1, Number_of Secondary_Active_Cells may equal to 1, 2, or 3, indicating the number of HS-DSCH cells that are activated; otherwise, Number_of Secondary_Active_Cells may be set to 0.

The term "HS-DSCH cell" may also be referred to as "cell", "serving cell," "carrier" and "downlink carrier," and they may be used interchangeable herein. Further, an HS-DSCH cell may include a primary serving HS-DSCH cell and/or a secondary serving HS-DSCH cell. The terms "composite PCI/CQI," "PCI/CQI" and "CQI" may be used interchangeably herein.

When the WTRU is configured for multiple-carrier operation, the HS-DPCCH subframe structure may be of length 2 ms (3×2560 chips). A subframe may include 3 slots, each of length 2560 chips. HARQ-ACK may be carried in the first slot of the HS-DPCCH sub-frame. CQI, and in case the WTRU is configured in MIMO mode, PCI, may be carried jointly in the second and third slot of the HS-DPCCH sub-frame.

In an embodiment, an HS-DPCCH slot format may accommodate more than two serving cells. For example, a single HS-DPCCH channelization code may be used to carry the feedback signaling related to downlink HS-DSCH transmission from three, four, or more serving HS-DSCH cells.

Table 1 shows example slot formats for the HS-DPCCH. As shown, slot format 1 may carry 20 bits per slot. The spreading factor may be 128, and there may be 20 bits per uplink HS-DPCCH slot. Slot format 1 may indicate that a subframe may carries 60 bits, the channel bit rate may be 30 kilobits per second (kbps), a time slot may carries 20 bit, and/or there may be three slots per subframe.

TABLE 1

| Slot Format #i | Channel Bit Rate (kbps) | Channel Symbol Rate (ksps) | SF | Bits/ Subframe | Bits/ Slot | Transmitted slots per Subframe |
|---|---|---|---|---|---|---|
| 0 | 15 | 15 | 256 | 30 | 10 | 3 |
| 1 | 30 | 30 | 128 | 60 | 20 | 3 |

Figure 12:
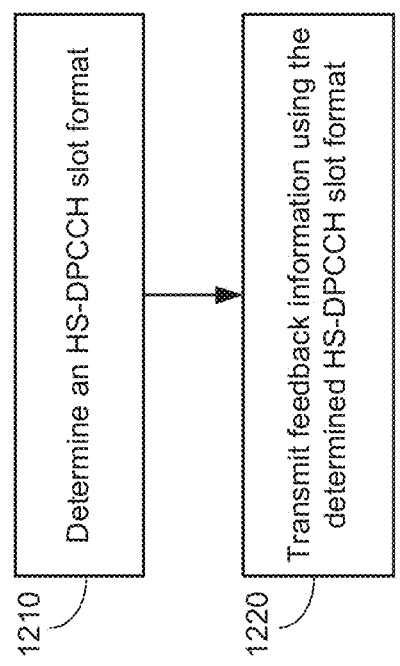
FIGS. 12 and 13 illustrate example feedback information transmission.

FIG. 12 illustrates an example feedback information transmission. As shown, at 1210, a HS-DPCCH slot format may be determined. For example, the determination may be performed via a processor of the WTRU, such as the processor 118 described above with respect to FIG. 1B. For example, HS-DPCCH slot format may be determined based on, the number of configured secondary cells, and/or the number of cells that may be configured with MIMO.

In an embodiment, if more than one secondary cell is configured, the HS-DPCCH slot format 1 shown in Table 1 may be used. For example, if the number of configured secondary cells equals to 2, or parameter Secondary_Cell_Enabled is 2, and MIMO is configured in at least one cell, the HS-DPCCH slot format 1 shown in Table 1 may be used. For example, if the number of configured secondary cells equals to 3, the HS-DPCCH slot format 1 shown in Table 1 may be used. For example, if the WTRU is configured with more than one secondary serving cells and there is one active secondary cell, or parameter Secondary_Cell_Active=1, the HS-DPCCH slot format 1 shown in Table 1 may be used. For example, if the number of active secondary active cell is greater than one, or parameter Number_of Secondary_Active_Cells>1, the HS-DPCCH slot format 1 shown in Table 1 may be used.

In an embodiment, if less than two secondary cells are configured/enabled, the HS-DPCCH slot format 0 shown in Table 1 may be used. For example, if more than two secondary serving cells are configured and less than two secondary serving cells are active, HS-DPCCH slot format 0 shown in Table 1 may be used.

At 1220, feedback information may be transmitted in accordance with the determined HS-DPCCH slot format. For example, the feedback information may be transmitted via a transceiver of the WTRU, such as the transceiver 120 described above with respect to FIG. 1B.

In an embodiment, the spreading factor for the HS-DPCCH frame structure may be reduced. For example, the spreading factor may be reduced from 256 to 128. As shown in Table 1, the spreading factor in HS-DPCCH slot format #1 is 128. This may increase the number of bits transmitted per subframe such that feedback information for three or more serving cells may be transmitted in a subframe. For example, the number of available bits for HS-DPCCH may be doubled per subframe when the spreading factor may be reduced from 256 to 128. The same BPSK encoding may be used. One slot may be dedicated to HARQ-ACK and two slots may be allocated to CQI/PCI. For example, the HARQ-ACK field may contain 20 bits and CQI/PCI field may contain 40 bits per subframe.

In an embodiment, the feedback fields with double the number of bits may be jointly encoded. A single composite feedback codebook may be transmitted with the sizes described in Table 2. Table 2 shows downlink configurations for HS-DPCCH feedback transmission. Table 2 is presented in the order of the total number of transport blocks to be transmitted. As shown in Table 2, the design complexity becomes more substantial as the size of the table grows exponentially as a function of the number of transport blocks.

TABLE 2

| Configuration case # | Number of transport blocks | Number of HSDPA Carriers | Number of carriers with MIMO | ACK/NACK codebook size (number of codes) | Max CQI/PCI size (bits) |
|---|---|---|---|---|---|
| 1 | 3 | 3 | 0 | 3 × 3 × 3 − 1 = 26 | 5 + 5 + 5 = 15 |
| 2 | 4 | 3 | 1 | 3 × 3 × 7 − 1 = 62 | 5 + 5 + 10 = 20 |
| 3 | 4 | 4 | 0 | 3 × 3 × 3 × 3 − 1 = 80 | 5 + 5 + 5 + 5 = 20 |

TABLE 2-continued

| Configuration case # | Number of transport blocks | Number of HSDPA Carriers | Number of carriers with MIMO | ACK/NACK codebook size (number of codes) | Max CQI/PCI size (bits) |
|---|---|---|---|---|---|
| 4 | 5 | 3 | 2 | $3 \times 7 \times 7 - 1 = 146$ | $5 + 10 + 10 = 25$ |
| 5 | 5 | 4 | 1 | $3 \times 3 \times 3 \times 7 - 1 = 188$ | $5 + 5 + 5 + 10 = 25$ |
| 6 | 6 | 3 | 3 | $7 \times 7 \times 7 - 1 = 342$ | $10 + 10 + 10 = 30$ |
| 7 | 6 | 4 | 2 | $3 \times 3 \times 7 \times 7 - 1 = 440$ | $5 + 5 + 10 + 10 = 30$ |
| 8 | 7 | 4 | 3 | $3 \times 7 \times 7 \times 7 - 1 = 1028$ | $5 + 10 + 10 + 10 = 35$ |
| 9 | 8 | 4 | 4 | $7 \times 7 \times 7 \times 7 - 1 = 2400$ | $10 + 10 + 10 + 10 = 40$ |

In an embodiment, the feedback fields may be split into multiple feedback channels, such as two feedback channels. Each feedback channel may include the information field generated for ACK/NACK or CQI/PCI feedback for one or more downlink carrier(s)/serving cell(s). A feedback channel may also refer to "feedback group," "feedback pair," "feedback message," or "feedback codeword," and the terms may be used interchangeably in this application. A feedback group may include one or more serving cells. A feedback channel may include or may carry feedback information for a feedback group. In an embodiment, conventional coding schemes for ACK/NACK or CQI/PCI feedback may be reused without requiring extensive optimal codebook search.

In an embodiment, feedback information for the different feedback channels may be jointly coded such that coding gain may be realized. In an embodiment, feedback information for different feedback channels may be coded independently. The separation of the feedback channels may be carried out at the physical layer mapping. The coded bits from the feedback channels may be mapped to HS-DPCCH symbols using a time-division multiplexing approach.

The feedback channels/groups may be separated via a HS-DPCCH subframe format with multiple HARQ-ACK fields and multiple CQI/PCI feedback fields. For example, an HS-DPCCH subframe may include two HARQ-ACK fields and two CQI/PCI feedback fields. Channel coding for each feedback channel may be defined and applied independently to each field. The coded bits may be mapped to HS-DPCCH symbols in the order defined by the HS-DPCCH frame format.

In an embodiment, a feedback channel may carry ACK/NACK and CQI/PCI feedback fields for up to two downlink HS-DSCH serving cells/carriers. Each feedback field may be coded jointly. For example, a feedback channel may carry regular and/or composite HARQ-ACK codewords, and regular CQI and/or composite PCI/CQI codewords. A composite HARQ-ACK codeword may include an HARQ-ACK codeword that may carry feedback information for up to two serving cells. A composite PCI/CQI codeword may carry the feedback for up to one cell with MIMO support and two cells with MIMO support when used in TDM fashion. Two feedback channels may support up to four downlink HS-DSCH serving cells, including serving cells with MIMO configured. Hereinafter, the two feedback channels/feedback codewords/feedback groups may be denoted as HS-DPCCH1 and HS-DPCCH2.

Figure 13:
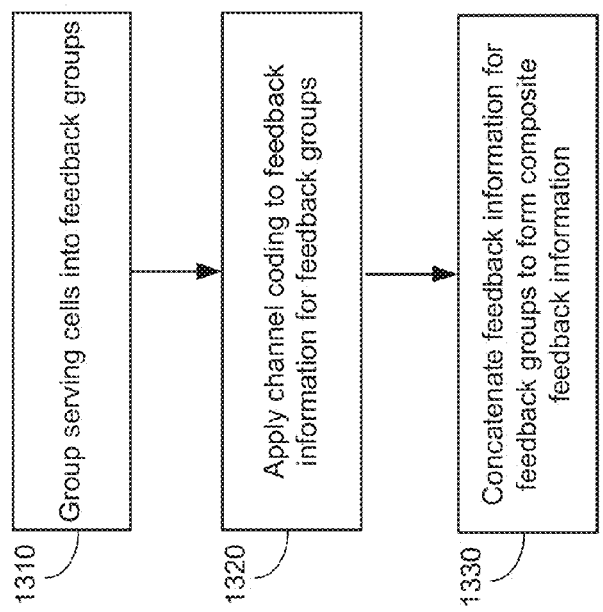

FIG. 13 illustrates example feedback information transmission. As shown, at 1310, serving cells may be grouped into feedback groups. For example, serving cells may be grouped via a processor of the WTRU, such as the processor 118 described above with respect to FIG. 1B, and/or via a transceiver of the WTRU, such as the transceiver 120 described above with respect to FIG. 1B.

In an embodiment, the feedback information from the multiple HS-DSCH serving cells may be organized into feedback pairs or feedback groups. For example, the serving cells may be grouped into two feedback groups. A feedback group may include one or more HS-DSCH serving cells. For example, a feedback group may include up to two HS-DSCH serving cells. A feedback group may be processed collectively. For example, the HARQ-ACK feedback may be encoded into a 10 bit field and CQI/PCI feedback may be encoded into a 20 bit binary field.

In an example, the serving HS-DSCH cell and the first secondary serving HS-DSCH cell may be grouped to form a first feedback group, and the third and forth secondary serving HS-DSCH cells can be grouped to form a second feedback group. In an example, the WTRU may be configured with 3 carriers, e.g. two secondary serving HS-DSCH cells are configured. One of the feedback groups may include two HS-DSCH cells, and the other feedback group may include the remaining cell. The remaining cell may include the serving HS-DSCH cell or one of the secondary serving HS-DSCH cells.

The HS-DPCCH frame format with the smaller spreading factor of 128 may be divided to transmit two feedback codewords. A feedback codeword may carry feedback information for a feedback group or feedback channel. A feedback group may be formed by grouping the feedback information of multiple HS-DSCH cells or carriers. A feedback codeword may include 30 bits.

In an embodiment, the HS-DPCCH frame format may be split via a per-field split. Individual feedback field such as the HARQ-ACK field and the CQI/PCI field may be split into multiple portions. For example, individual feedback field may be split into halves. A feedback codeword may be formed by aggregating the portion of the HARQ-ACK field(s) that correspond to the respective feedback group, and the portion of the CQI/PCI field that correspond to the respective feedback group. The HARQ-ACK fields may be mapped to a first portion of the feedback codewords in the subframe, and the PCI/CQI fields may be mapped to a second portion of the feedback codewords.

Figure 4:

FIG. 4 illustrates an example HS-DPCCH frame format. As shown a subframe 410 may include three time slots 420, 430 and 440. For example, the first time slot such as time slot 420 may be allocated to transmit HARQ-ACK information. The second and third time slot may be allocated to transmit CQI/PCI information. As shown, a time slot such as time slot 420 may be partitioned into two portions 450 and 460. Codeword 1 and codeword 2 may be transmitted in subframe 410. For example, codeword 1 may include feedback information for a first feedback group, and codeword 2 may include feedback information for a second feedback group. For example, the ACK/NACK feedbacks for serving HS-DSCH cell and a first secondary serving HS-DSCH cell may be grouped into codeword 1 and encoded into a 10 bit HARQ-ACK field. As shown, the portion 450 may be used to transmit HARQ-ACK information of codeword 1. The ACK/NACK feedbacks for a second and a third secondary serving HS-DSCH cells may be grouped into codeword 2 and encoded into another 10 bit HARQ-ACK field. As shown, the portion 460 may be used to transmit HARQ-ACK information of codeword 2. For example, the CQI/PCI feedbacks for serving HS-DSCH cell and the first secondary serving HS-DSCH cell may be grouped into codeword 1 and encoded into a 20 bit CQI/PCI field. As shown, time slot 430 may be mapped to transmit CQI/PCI feedback information of codeword 1. The CQI/PCI feedbacks for second and third secondary serving HS-DSCH cells may be grouped into codeword 2 and encoded into another 20 bit CQI/PCI field. As shown, time slot 440 may be mapped to transmit CQI/PCI feedback information of codeword 2.

In an embodiment, the HS-DPCCH frame format may be split via a per-time slot split. A time slot in the HS-DPCCH subframe may be split into multiple portions. For example, each time slot in the HS-DPCCH subframe may be split into halves. A feedback codeword may be formed by aggregating a portion of each time slot. For example, a first feedback codeword may be formed by aggregating the first halves of each time slot, and a second feedback codeword may formed by aggregating the remaining halves of each time slot. A feedback codeword may have an aggregate size of 30 bits distributed over 3 parts of 10 bits each. For example, the HARQ-ACK fields associated with each HS-DSCH cell or group of HS-DSCH cells may be mapped to a first portion of a codeword, and the PCI/CQI fields may then be mapped to a second and a third portion of the codeword.

Figure 5:
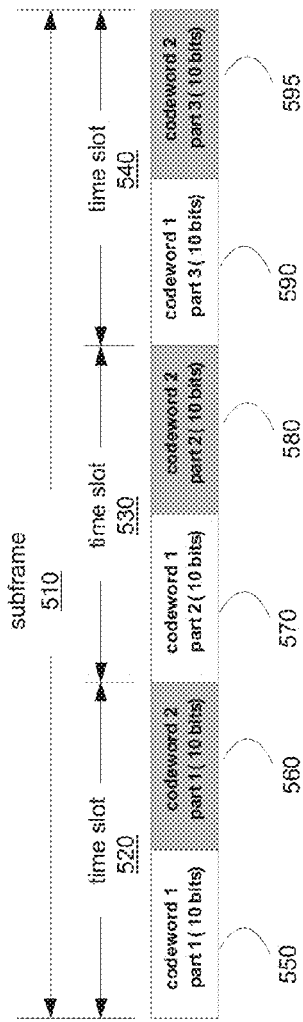

FIG. 5 illustrates an example HS-DPCCH frame format. As shown, codeword 1 and codeword 2 may be transmitted in a subframe 510 that may include three time slots 520, 530 and 540. For example, each time slot may be partitioned into two portions. As shown, time slot 520 may be partitioned into two portions 550 and 560, time slot 530 to portions 570 and 580, and time slot 540 to portions 590 and 595. For example, codeword 1 may include feedback information for a first feedback group, and codeword 2 may include feedback information for a second feedback group. As shown, codeword 1 may be partitioned into 3 parts, part 1, part 2, and part 3, and codeword 2 may be partitioned into 3 parts, part 1, part 2, and part 3. Each codeword part may be transmitted in a time slot portion.

In an example, the HARQ-ACK fields may be mapped to part 1 of the feedback codeword 1, and may be transmitted in time slot portion 550. The PCI/CQI fields may be mapped to parts 2 and 3 of the feedback codeword 1, and may be transmitted in timeslot portions 570 and 590.

In an example, the HARQ-ACK fields may be mapped to part 2 of the feedback codeword 1, and may be transmitted in time slot portion 570. The PCI/CQI fields may be mapped to parts 1 and 3 of the feedback codeword 1, and may be transmitted in timeslot portions 550 and 590.

Turning back to FIG. 13, at 1320, channel coding may be applied to the feedback information for the feedback groups. For example, channel coding may be applied via a processor of the WTRU, such as the processor 118 described above with respect to FIG. 1B, and/or via a transceiver of the WTRU, such as the transceiver 120 described above with respect to FIG. 1B.

At 1330, the feedback information for the feedback groups may be concatenated to form composite feedback information. In an embodiment, channel coding for a field of each of the multiple feedback groups may be performed independently. For example, the feedback information for the feedback groups may be concatenated via a processor of the WTRU, such as the processor 118 described above with respect to FIG. 1B, and/or via a transceiver of the WTRU, such as the transceiver 120 described above with respect to FIG. 1B.

When HS-DPCCH slot format 1 described in Table 1 is used, feedback information that correspond to multiple feedback groups may be concatenated. The feedback codewords may be concatenated prior to being mapped to physical channels. In an embodiment, concatenation may not be performed if physical channel mapping block or entity ensures that proper channel mapping is performed.

Figure 6:
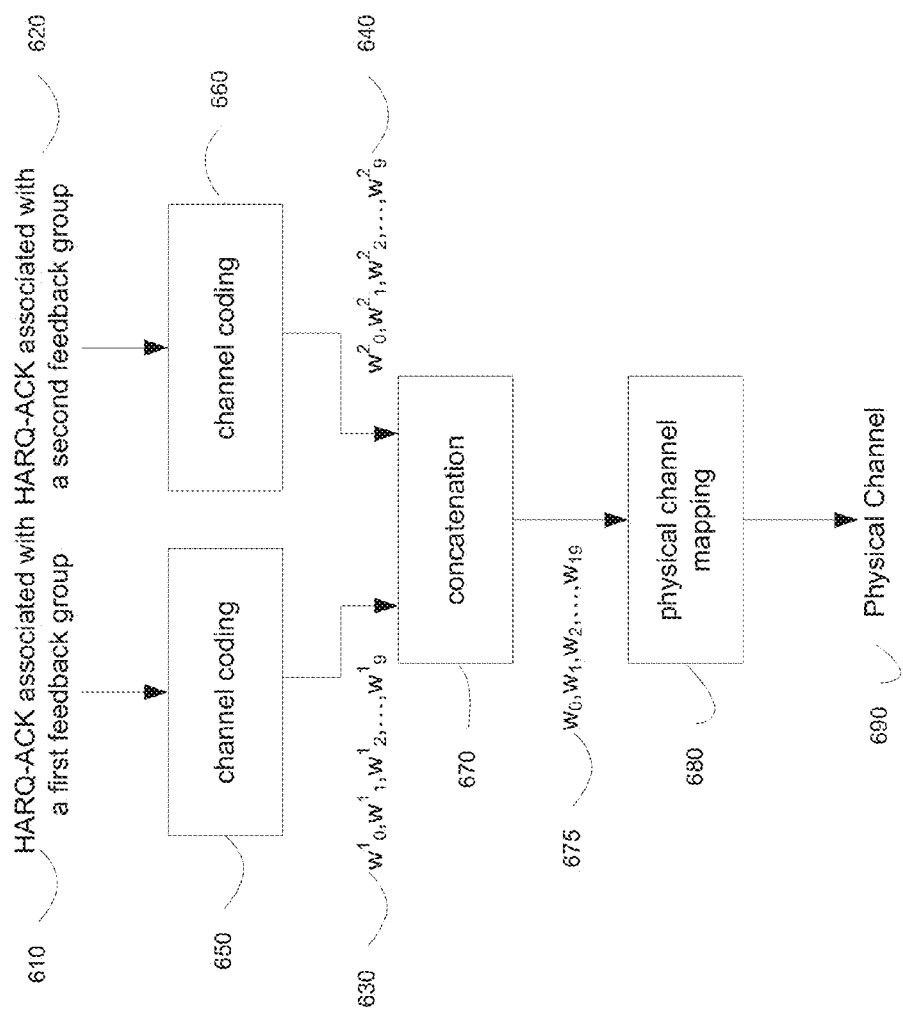
FIGS. 6 and 7 illustrate example coding flows for feedback reports.

FIG. 6 illustrates an example coding flow for HARQ-ACK messages. For example, data input bits to the coding unit may include HARQ-ACK messages for HS-DSCH cells. The feedback information data for the HS-DSCH cells may be grouped into multiple, such as two sets, and may be transmitted via separate feedback codewords. For example, a set may carry feedback information for up to two HS-DSCH cells, and may be included in a feedback codeword.

As shown in FIG. 6, HARQ-ACK associated with a first feedback group 610 may include feedback information for a first feedback group, and HARQ-ACK associated with a second feedback group 620 include feedback information for a second feedback group. Channel coding for HARQ-ACK associated with the first feedback group 610 and HARQ-ACK associated with the second feedback group 620 may be performed independently or separately via channel coding unit/function 650 and channel coding unit/function 660. Channel coding may be performed in parallel or sequentially and may be time-multiplexed.

As shown in FIG. 6, output of the two channel coding units 650 and 660 may be concatenated. HARQ-ACK message associated with the first feedback group 630 and HARQ-ACK message associated with the second feedback group 640 may be concatenated via concatenation unit 670 form output bits 675. For example, HARQ-ACK message associated with the first feedback group 630 may be denoted as $w^1_0, w^1_1, \ldots, w^1_9$, and HARQ-ACK message associated with the second feedback group 640 may be denoted as $w^2_0, w^2_1, \ldots, w^2_9$. Bits $w^1_0, w^1_1, \ldots, w^1_9$ and $w^2_0, w^2_1, \ldots, w^2_9$ may be concatenated to form $w_0, w_1, \ldots, w_{19}$. As shown, the output bits of the concatenation unit 675 may be fed into physical channel mapping function 680 to be mapped to physical channel 690.

Figure 7:
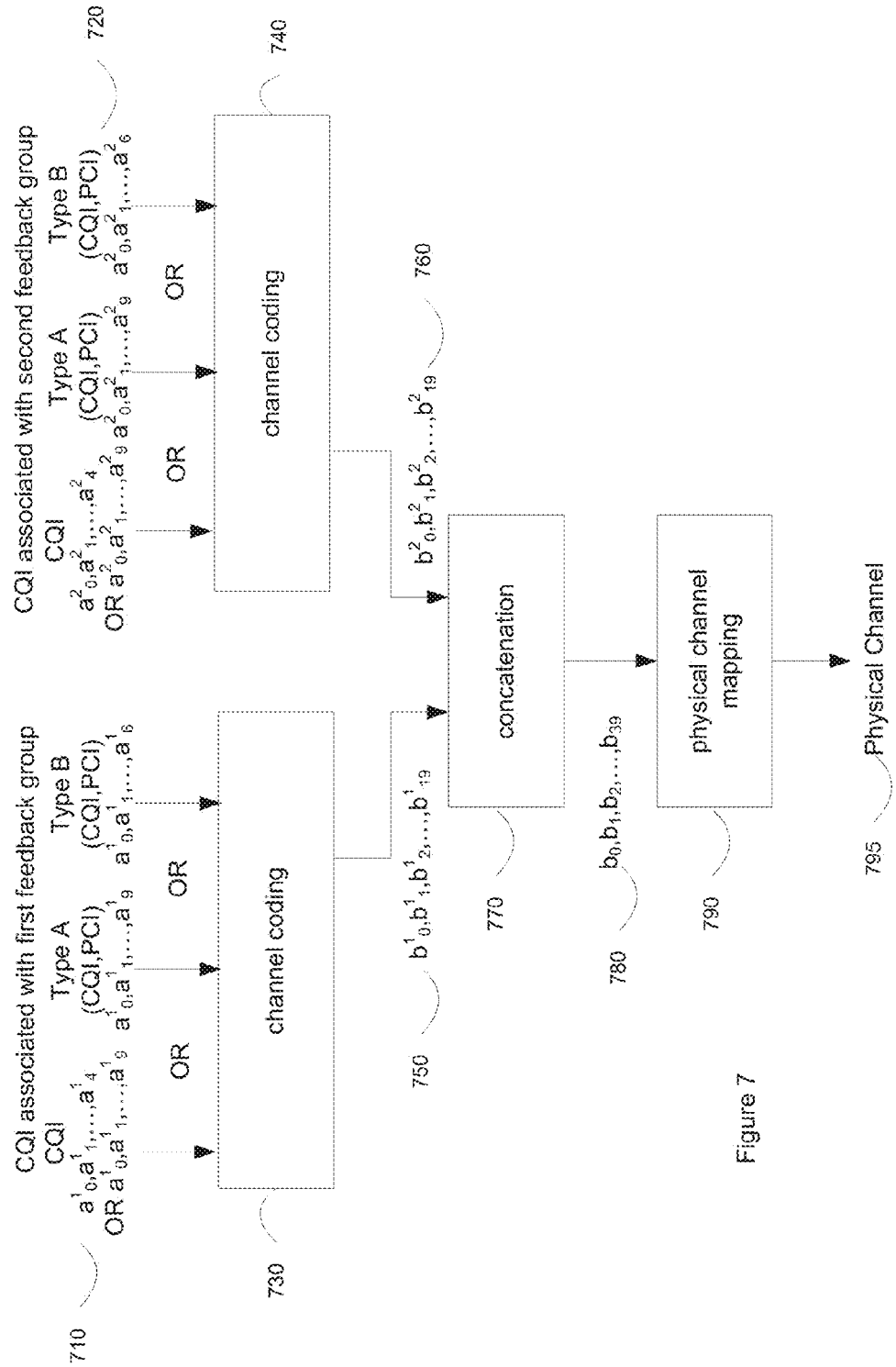

FIG. 7 illustrates an example coding flow for CQI or PCI/CQI reports. For example, data input bits to the coding unit may include CQI, type A CQI/PCI and/or type B CQI/PCI for one or more HS-DSCH cells. For example, if a feedback group includes a HS-DSCH cell configured in MIMO mode, the measurement indication for the feedback group may include precoding control indication (PCI) and channel quality indication (CQI). The feedback information data for the HS-DSCH cells may be grouped into multiple, such as two sets, and may be transmitted via separate feedback codewords. For example, a set may carry CQI, type A CQI/PCI and/or type B CQI/PCI for up to two HS-DSCH cells, and may be included in a feedback codeword.

As shown in FIG. 7, CQI, CQI/PCI type A, and/or CQI/PCI type B associated with a first feedback group 710 may include CQI, CQI/PCI type A, and/or CQI/PCI type B associated with a second feedback codeword 720 may include feedback information for a second feedback group. Channel coding for CQI, CQI/PCI type A, and/or CQI/PCI type B report(s) associated with the first feedback group 710 and CQI/PCI type A, and/or CQI/PCI type B report(s)

associated with the second feedback codeword 720 may be performed independently or separately via channel coding unit/function 730 and channel coding unit/function 740. Channel coding may be performed in parallel or sequentially and may be time-multiplexed.

As shown in FIG. 7, output of the two channel coding units/functions 730 and 740 may be concatenated. CQI, CQI/PCI type A, and/or CQI/PCI type B report(s) associated with the first feedback group 750 and CQI, CQI/PCI type A, and/or CQI/PCI type B report(s) associated with the second feedback group 760 may be concatenated via concatenation unit/function 770 form output bits 780. For example if a single HS-DSCH cell may correspond to a given feedback group, and the total number of CQI information bits may be 5, otherwise and the total number of CQI information bits may be 10 bits. For example, CQI, CQI/PCI type A, and/or CQI/PCI type B report(s) associated with the first feedback group 750 may be denoted as $b^1_0, b^1_1, \ldots, b^1_{19}$, and CQI, CQI/PCI type A, and/or CQI/PCI type B report(s) associated with the second feedback codeword 760 may be denoted as $b^2_0, b^2_1, \ldots, b^2_{19}$. Bits $b^1_0, b^1_1, \ldots, b^1_{19}$ and $b^2_0, b^2_1, \ldots, b^2_{19}$ may be concatenated to form $b_0, b_1, \ldots, b_{39}$. As shown, the output bits of the concatenation unit 780 may be fed into physical channel mapping function 790 to be mapped to physical channel 795.

For example, when a feedback codeword carries the feedback information for dual HS-DSCH cells that may not be configured in MIMO mode, input bits 710 may include CQI for the first feedback group or CQI associated with first feedback codeword, and input bits 720 may include CQI for the second feedback group, or CQI associated with a second feedback codeword 720. When a feedback codeword carries the feedback information for dual HS-DSCH cells and both cells are configured in MIMO mode, input bits 710 may include CQI/PCI type A or CQI/PCI type B report(s) for the first feedback group, or CQI/PCI type A or CQI/PCI type B report(s) associated with the first feedback codeword. Input bits 720 may include CQI/PCI type A or CQI/PCI type B report(s) for the second feedback group, or CQI/PCI type A or CQI/PCI type B report(s) associated with the second feedback codeword. When the feedback channel carries the feedback information for dual HS-DSCH cells with one being configured in MIMO mode, input bits 710 may include CQI/PCI type A or CQI/PCI type B report(s) for the feedback group configured with MIMO, and input bits 720 may include CQI for the feedback group not configured with MIMO.

When HS-DPCCH operates with two feedback codewords, the HS-DPCCH concatenation function may concatenate the outputs of the channel coding functions from the two feedback codewords, $w^1_k$, $w^2_k$ for HARQ-ACK, and, $b^1_k, b^2_k$ for CQI/PCI. For example, the outputs of the channel coding functions may be concatenated as follows:

$w_0, w_1, \ldots, w_9, w_{10}, w_{11}, \ldots, w_{19} = w^1_0, w^1_1, \ldots, w^1_9, w^2_0, w^2_1, \ldots, w^2_9$ $b_1, \ldots, b_9, b_{10}, \ldots, b_{19}, b_{20}, \ldots, b_{29}, b_{30}, \ldots, b_{39} = b^1_0, b^1_1, \ldots, b^1_{19}, b^2_0, b^2_1, \ldots, b^2_{19}$.

After the concatenation function, the HS-DPCCH physical channel mapping function may map the input bits $w_k$ directly to the physical channel such that the bits may be transmitted over the air in ascending order or in descending order with respect to k. The HS-DPCCH physical channel mapping function may map the input bits $b_k$ directly to the physical channel such that bits may be transmitted over the air in ascending order or in descending order with respect to k.

In an embodiment, the feedback information for the multiple carriers/cells may be grouped into multiple feedback groups. For example, feedback information may be grouped into two feedback groups. Each feedback group may be assigned to a corresponding the feedback codeword. If a feedback codeword includes feedback information for no more to than two carriers/cells, the standard coding schemes for either HARQ-ACK or CQI/PCI may be reused. Table 3 lists example coding schemes that may be reused.

TABLE 3

| 3GPP Release | Release 6 | Release 7 | Release 8 | Release 9 |
|---|---|---|---|---|
| Carrier Configuration | SC | SC + MIMO | DC | DC + MIMO |
| Max. Number of Transport blocks | 1 | 2 | 2 | 4 |
| Num of carriers | 1 | 1 | 2 | 2 |
| HARQ-ACK | A/N(4) | A/N(8) | A/N(10) | A/N(50) |
| CQI/PCI | CQI(20, 5) | CQI(20, 7/10) | CQI(20, 10) | CQI(20, 7/10) |

As shown in Table 3, the Release 8 (dual carrier) and Release 9 (dual carrier with MIMO) coding schemes may provide feedback for two carriers simultaneously. The feedback resource for the dual carrier or dual carrier with MIMO coding schemes may be referred to as feedback slot herein.

As the amount of feedback information may depend on the number of transport blocks in each of the carrier configurations, the coding schemes in Table 3 may have different coding rates and therefore may result in different coding performances.

In an embodiment, feedback information for the carrier(s) may be mapped to a first feedback codeword. Feedback information may be first mapped to the first codeword. If the first feedback codeword is fully occupied with data, feedback information for the remaining carrier(s) may be mapped to a second feedback codeword. If the second feedback codeword has the capacity to carry more feedback information, feedback information mapped to the first feedback codeword, or a portion thereof, may be repeated in the second feedback codeword.

For example, when the WTRU is configured with one or two active serving cells, the feedback information for the active serving cells may be repeated to fill a subframe. For example, feedback information for active carriers may fit into the first feedback codeword. The feedback information can be duplicated into second feedback codeword such that the feedback information for active carriers may be repeated. This may improve transmission reliability.

For example, when there are two active carriers (e.g., C1 and C3, or C1 and C2, or any other combinations), the feedback information for the two activated carriers may fit into the first feedback codeword. The feedback information for the two activated carriers may be repeated to fill the second feedback codeword.

Figure 8:
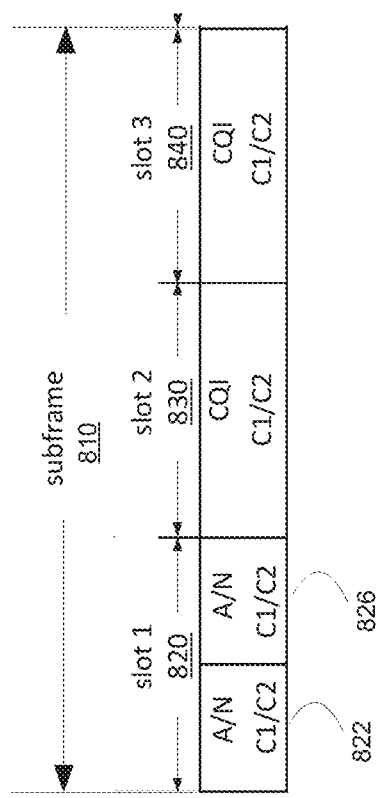
FIGS. 8 and 9 illustrate example HS-DPCCH subframe formats.

FIG. 8 illustrates an example HS-DPCCH frame format. As shown, subframe 810 may include time slot 1 820, time slot 2 830 and time slot 3 840. Time slot 1 820 may be mapped to HARQ-ACK field of the feedback information, and time slot 2 830 and time slot 3 840 may be mapped to CQI field of feedback information. For example, two carriers or two serving cells such as a serving HS-DPCCH cell, and a secondary serving HS-DPCCH cell may be active. The two cells may be denoted as C1 and C2. In an embodiment, the two active carriers/cells such as C1 and C2 may be grouped in a feedback group, and feedback information for the two carriers/cells may be contained in a feedback codeword. HARQ-ACK information for C1 and C2 may be jointly encoded and repeated to fill the whole HARQ-ACK slot such as slot 1 820 of the HS-DPCCH subframe. As shown in FIG. 8, HARQ-ACK information for C1 and C2 mapped to portion 822 of time slot 1 820 may be repeated in portion 826 of time slot 1 820. CQI information for C1 and C2 may be repeated to fill the two slot CQI field that may include time slot 2 830 and time slot 3 840 of the HS-DPCCH subframe. As shown in FIG. 8, CQI information for C1 and C2 mapped to time slot 2 830 may be repeated in time slot 3 840 of the HS-DPCCH subframe.

For example, the WTRU may be configured with three serving cells, such as a primary serving cell and two configured secondary serving cells. The two enabled secondary serving cells may include an active secondary serving cell and a deactivated secondary serving cell. The WTRU may be configured with four serving cells, such as a primary serving cell and three configured secondary serving cells. The three configured secondary serving cells may include an active secondary serving cell and two deactivated secondary serving cells. The HARQ-ACK information for the primary serving cell and the HARQ-ACK information for the active secondary serving cell may be jointly encoded. For example, jointly coded HARQ feedback information may be formed. The jointly coded HARQ feedback information may be transmitted in a portion of a time slot allocated for HARQ feedback transmission, for example, portion 822 of time slot 1 820. The jointly coded HARQ feedback information may be repeated in a second portion of the time slot allocated for HARQ feedback transmission, for example, portion 826 of time slot 1 820. For example, the jointly coded HARQ feedback information may be repeated to fill the whole HARQ field of a subframe such as subframe 810.

For example, the WTRU may be configured with three or four serving cells, such as a primary serving cell and two or three configured secondary serving cells. The configured secondary serving cells may include at least one deactivated secondary serving cell. The CQI information for each active cell may be repeated to fill the time slots allocated for CQI transmission. For example, the CQI information for each active cell may be repeated such that the two time slot PCI/CQI field in the HS-DPCCH sub-frame may be filled.

In an embodiment, the carrier or cell to feedback group mapping may be adjusted when carrier activation status changes such that feedback information for active carriers may be repeated to fill the HS-DCSH subframe. For example, C1 and C2 may be activated initially, and the two carriers may be grouped in a feedback group. Subsequently, C2 may be deactivated and C3 may be activated. C2 may be taken off the feedback group, and C3 may be grouped with C1. In other words, feedback information for C1 and C3 may be remapped to be on the same feedback codeword that may be repeated to fill the HS-DCSH subframe.

For example, the WTRU may be configured with two or three secondary serving HS-DSCH cells. When there is one active secondary cell, feedback information for serving HS-DSCH cell and the active secondary serving HS-DSCH cell may be jointly encoded and repeated to fill the whole slot that may carry the corresponding feedback information in a HS-DSCH subframe.

In an embodiment, the WTRU may be configured with two secondary serving HS-DSCH cells, or three serving HS-DSCH cells. The CQI or PCI/CQI field for a deactivated cell may be DTXed. For example, when a secondary serving cell is deactivated, the CQI report for the cell may not be transmitted.

Figure 9:
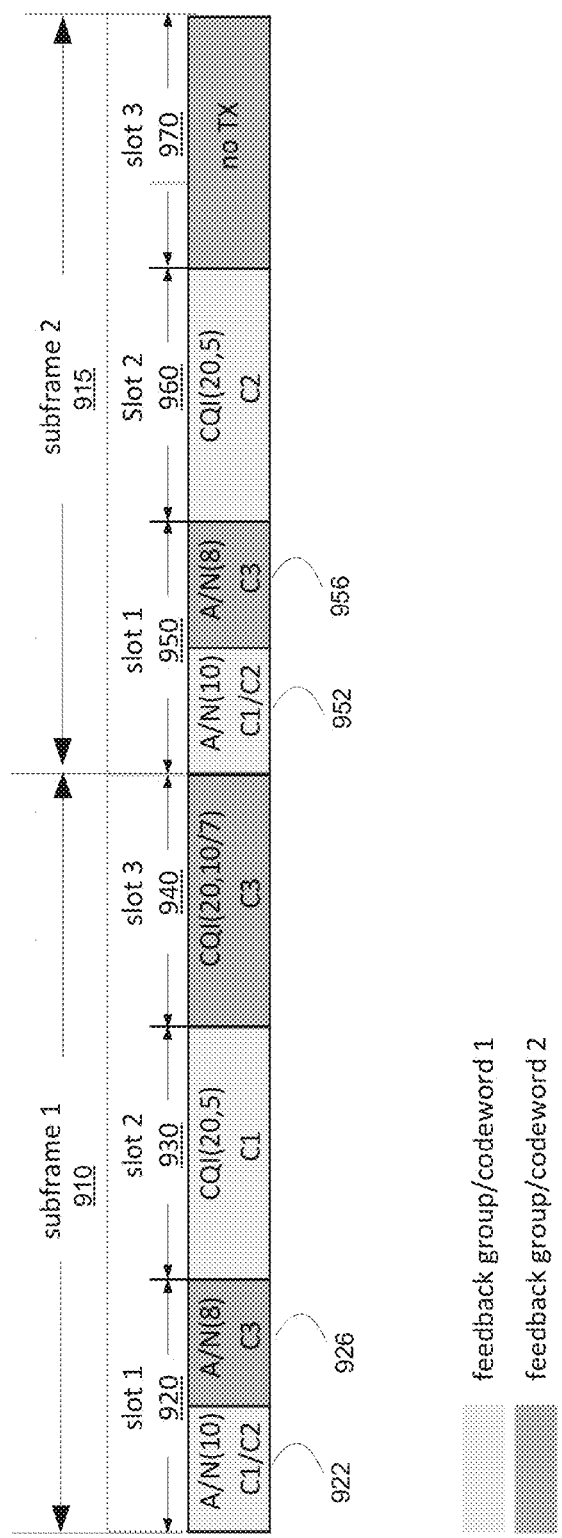

FIG. 9 illustrates an example HS-DPCCH frame format. As shown, a first subframe 910 may include time slot 1 920, time slot 2 930 and time slot 3 940. And a second subframe 915 may include time slot 1 950, time slot 2 960 and time slot 3 970. Time slot 1 920 of subframe 1 910 and time slot 1 950 of may be mapped to HARQ-ACK field of the feedback information. Time slot 2 930 and time slot 3 940 of subframe 1 910, and time slot 2 960 and time slot 3 970 of subframe 2 915 may be mapped to CQI field of feedback information.

For example, three carriers or three serving cells such as a serving HS-DPCCH cell, and two secondary serving HS-DPCCH cells may be active. As shown in FIG. 9, the three cells may be denoted as C1, C2 and C3. In an embodiment, two active carriers/cells such as C1 and C2 may be grouped in a feedback group such as feed back group 1, and C3 may be included in a second feedback group such as feedback group 2. HARQ-ACK information for C1 and C2 may be jointly encoded, and may be mapped to a portion of a HARQ-ACK slot of a subframe. As shown in FIG. 9, HARQ-ACK information for C1 and C2 may be mapped to portion 922 of time slot 1 920 of subframe 1 910 and portion 952 of time slot 1 950 of the subframe 2 915. HARQ-ACK information for C3 may be mapped to portion 926 of time slot 1 920 of subframe 1 910 and portion 956 of time slot 1 950 of the subframe 2 915.

In an embodiment, the cell that is not grouped with another cell, such as C3 may be encoded individually with a (20, 5) or (20, 10/7) Reed-Muller code and may be transmitted in a time slot allocated to a feedback group such as feedback group 2. For example, CQI report for C3 may be transmitted in time slot 3 940. For example, the WTRU may be configured with three secondary cells, or four serving cells, and one serving cell is deactivated. The CQI report for the cell may not be transmitted, or may be DTXed. As shown in FIG. 9, slot 3 970 of subframe 2 915 may be mapped to a deactivated serving cell, and may not transmit any feedback information.

In an embodiment, a CQI feedback cycle may include more than one subframe. For example, the WTRU may be configured with the CQI feedback cycle parameter equal to two or greater than two sub-frames (e.g., >=4 ms). The grouped or paired CQI reports may be transmitted in a time division multiplexing (TDM) fashion. For example, the CQI feedback information for each serving HS-DSCH cell may be encoded individually and may be transmitted in different sub-frames.

In an embodiment, CQI/PCI reports for serving cells may be encoded individually. In an embodiment, when the WTRU is not configured in MIMO mode in any of the serving cells, the WTRU may encode two CQI feedback reports jointly and may transmit the CQI reports in a subframe.

In an embodiment, CQI reporting format may not depend on any MIMO configuration status of the cells. The CQI/PCI reports may be encoded by (20, 7/10) or (20,5) Reed Muller codes depending on the MIMO configuration status of the serving cells in the feedback group. For example, "SC" may indicate (20, 5) Reed Muller code, "DC" may indicate (20,10) code, and SC-MIMO may indicate (20,10) code for Type A CQI report or (20, 7) for type B CQI report.

TABLE 4

| # of activated carriers | # of activated carriers with MIMO configured | CQI type of HS-DPCCH2 CQI slot | Rule applying to HS-DPCCH2 CQI slot | CQI type of HS-DPCCH1 CQI slot | Rule applying to HS-DPCCH1 CQI slot |
|---|---|---|---|---|---|
| 1 | 0 | SC | 3D | SC | 3D |
|   | 1 | SC-MIMO | 1C or 3C | SC-MIMO | 1C or 3C |
| 2 | 0 | DC | 2D | DC | 2D |
|   | 1 | SC | 1C or 3C | SC | 1C or 3C |
|   |   | SC-MIMO |  | SC-MIMO |  |
|   | 2 | SC-MIMO | 1C or 3C | SC-MIMO | 1C or 3C |
|   |   | SC-MIMO |  | SC-MIMO |  |
| 3 | 0 | SC | 3C | SC | 3C |
|   |   |  |  | SC |  |
|   | 1 | SC MIMO | 1C or 3C | SC | 3C |
|   |   |  |  | SC |  |
|   |   | SC | 3C | SC | 1C or 3C |
|   |   |  |  | SC-MIMO |  |
|   | 2 | SC | 3C | SC-MIMO | 1C or 3C |
|   |   |  |  | SC-MIMO |  |
|   |   | SC-MIMO | 1C or 3C | SC | 1C or 3C |
|   |   |  |  | SC-MIMO |  |
|   | 3 | SC-MIMO | 1C or 3C | SC-MIMO | 1C or 3C |
|   |   |  |  | SC-MIMO |  |
| 4 | 0 | DC | 2C | SC | 3C |
|   |   |  |  | SC |  |
|   | 1 | DC | 2C | SC | 1C or 3C |
|   |   |  |  | SC-MIMO |  |
|   |   | SC | 1C or 3C | SC | 3C |
|   |   | SC-MIMO |  | SC |  |
|   | 2 | DC | 2C | SC-MIMO | 1C or 3C |
|   |   |  |  | SC-MIMO |  |
|   |   | SC | 1C or 3C | SC | 1C or 3C |
|   |   | SC-MIMO |  | SC-MIMO |  |
|   |   | SC-MIMO | 1C or 3C | SC | 3C |
|   |   | SC-MIMO |  | SC |  |
|   | 3 | SC | 1C or 3C | SC-MIMO | 1C or 3C |
|   |   | SC-MIMO |  | SC-MIMO |  |
|   |   | SC-MIMO | 1C or 3C | SC | 1C or 3C |
|   |   | SC-MIMO |  | SC-MIMO |  |
|   | 4 | SC-MIMO | 1C or 3C | SC-MIMO | 1C or 3C |
|   |   | SC-MIMO |  | SC-MIMO |  | associated cells. The encoded CQI/PCI reports may be grouped or paired in feedback groups. For example, there may be two feedback codewords in a group, and the feedback codewords may be transmitted in a TDM fashion in time slots allocated for the associated group in different subframes such as consecutive subframes.

For example, as shown in FIG. 9, the CQI feedback cycle may include two subframes such as subframe 1 910 and subframe 2 915. Time slot 2 930 and time slot 3 940 of subframe 1 910, and time slot 2 960 and time slot 3 970 of subframe 2 915 may be mapped to the CQI field of feedback information. As shown, CQI reports for C1 and C2 may be transmitted in subframe 1 910, in time slot 2 930 and time slot 3 940 respectively. CQI report for C3 may be transmitted in subframe 2 915, for example, in time slot 2 960.

In an embodiment, CQI information for each serving cell in a feedback group may be independently encoded.

Table 4 shows channel coding schemes and power offset setting rules for HS-DPCCH CQI slots. In Table 4, the columns showing "CQI type of HS-DPCCH" is related to channel coding schemes for encoding CQI reports. A table cell containing two CQI types may indicate that the CQI/PCI reports may be encoded separately for each of the two Relative power offsets may be applied to different feedback signals in HS-DPCCH such that performance requirements for the HARQ acknowledgement and CQI feedbacks may be balanced. For example, three power offset values, such as $\Delta_{ACK}$, $\Delta_{NACK}$ and $\Delta_{CQI}$, may be configured by the network and applied to ACK, NACK, and CQI feedback signals, respectively. In an embodiment, conventional coding schemes may be reused.

In an embodiment, the network may pre-configure multiple sets of power offset values for multiple feedback groups, with one set of power offset value corresponding to a feedback group. For example, two sets of power offset that may be denoted as $\Delta_{ACK1}$, $\Delta_{NACK1}$, $\Delta_{CQI1}$ and $\Delta_{ACK2}$, $\Delta_{NACK2}$, $\Delta_{CQI2}$ for two feedback groups at the initial radio resource control (RRC) connection. The WTRU may apply the two sets of values to the two feedback groups, respectively, when the HS-DPCCH is transmitted.

In an embodiment, the network may configure one set of power offset values, e.g., $\Delta_{ACK}$, $\Delta_{NACK}$, $\Delta_{CQI}$, at initial RRC connection. When a WTRU applies this set of offset value, the WTRU may add an additional power scaling-down to the feedback channel with the stronger coding performance. The amount of this additional power scaling-down may be pre-defined in the standards or may vary depending on the carrier/MIMO configurations. For example, the power scaling-down may be to step down a few entries in the quantization table that maps the network signaled value of $\Delta_{ACK}$, $\Delta_{NACK}$, and $\Delta_{CQI}$ to the actual power scaling applied at the transmitter.

In an embodiment, the same power offset values may be applied to multiple feedback groups such that changing transmission power in the middle of an uplink slot due to half slot ACK/NACK transmission may be avoided. For example, the WTRU may calculate the power offset of each of the HS-DPCCH fields for the multiple feedback groups independently. The WTRU may apply the highest calculated power set value to the multiple feedback groups. For example, for each HS-DPCCH field, the WTRU may apply the higher value of the two power offsets calculated for two feedback groups. The WTRU may apply the average value of the calculated power set values to the multiple feedback groups. For example, for each field category, the average of the two power offsets calculated for the two feedback groups may be applied.

For example, when feedback information for two feedback groups is transmitted, there may be two HARQ-ACK fields that may be denoted as HARQ-ACK$_1$ and HARQ-ACK$_2$ and two PCI/CQI fields that may be denoted as PCI/CQI$_1$ and PCI/CQI$_2$. The WTRU may calculate the power offset for each of these fields based on the signaled values such as $\Delta_{ACK1}$, $\Delta_{NACK1}$, $\Delta_{CQI1}$, $\Delta_{ACK2}$, $\Delta_{NACK2}$, $\Delta_{CQI2}$ and/or the actual feedback being sent. The resulting power offsets for HARQ-ACK1 and HARQ-ACK2 may be denoted as $\Delta_{H-A1}$ and $\Delta_{H-A2}$, respectively, and the resulting power offsets for the PCI/CQI1 and PCI/CQI2 may be denoted as $\Delta_{PC1}$ and $\Delta_{PC2}$.

The WTRU may determine the maximum of multiple power offset values calculated for the HS-DPCCH fields, and apply the maximum power offset value to the corresponding HS-DPCCH fields for multiple feedback groups. For example, the WTRU may choose the maximum of the two values calculated for HARQ ACK, which may be denoted as $\Delta_{H-A}=\max(\Delta_{H-A1}, \Delta_{H-A2})$, and apply the maximum power offset $\Delta_{H-A}$ to HARQ-ACK fields of the two feedback groups. For example, the WTRU may choose the maximum of the two values calculated for CQI, which may be denoted as $\Delta_{PC}=\max(\Delta_{PC1}, \Delta_{PC2})$, and may apply the selected maximum power offset ($\Delta_{PC}$) to the PCI/CQI fields for the two feedback groups.

In an embodiment, power offsets may be applied to feedback groups. For example, the coding performance for the feedback groups may be unequal, and the transmission quality for the feedback groups in turn may be uneven. The variance may impact the uplink coverage of the multiple carrier operation. Applying different power offsets to different feedback groups may mitigate the impact on the uplink coverage. For example, higher transmit power may be applied on a feedback group with relatively weaker coding performance. For example, power offset for the PCI/CQI field for the first feedback group may differ from the power offset for the PCI/CQI field for the second feedback group.

In an embodiment, the network may configure one set of power offset value that may be denoted as $\Delta_{ACK}$, $\Delta_{NACK}$, and $\Delta_{CQI}$ at the initial RRC connection. When the WTRU applies the set of offset values, the WTRU may add an additional power boost to the feedback channel with the weaker coding performance. The amount of this additional power boost may be pre-defined or may vary depending on the carrier/MIMO configurations. For example, the power boost may be to step up a few entries in the quantization table that maps the network signaled value of $\Delta_{ACK}$, $\Delta_{NACK}$, and $\Delta_{CQI}$ to the actual power scaling applied at the transmitter.

For example, the HARQ ACK power offset setting rule for a feedback group may be implemented as follows. If none of the HS-DSCH cells that correspond to the feedback group is configured in MIMO mode, $A_{hs}$ may equal the quantized amplitude ratio translated from the signaled value $\Delta_{ACK}+1$ if the corresponding HARQ-ACK message contains at least one ACK but no NACK; $A_{hs}$ may equal the quantized amplitude ratio translated from the signaled value $\Delta_{NACK}+1$ if the corresponding HARQ-ACK message contains at least one NACK but no ACK; $A_{hs}$ may equal the quantized amplitude ratio translated from the maximum value of ($\Delta_{ACK}+1$) and ($\Delta_{NACK}+1$) if the corresponding HARQ-ACK message contains both ACK and NACK, or is a PRE or a POST. If at least one HS-DSCH cell that correspond to the feedback group is configured in MIMO mode, $A_{hs}$ may equal the quantized amplitude ratio translated from the signaled value $\Delta_{ACK}+2$ if the corresponding HARQ-ACK message contains at least one ACK but no NACK; $A_{hs}$ may equal the quantized amplitude ratio translated from the signaled value $\Delta_{NACK}+2$ if the corresponding HARQ-ACK message contains at least one NACK but no ACK; $A_{hs}$ may equal the quantized amplitude ratio translated from the maximum value of ($\Delta_{ACK}+2$) and ($\Delta_{NACK}+2$) if the corresponding HARQ-ACK message contains both ACK and NACK, or is a PRE or a POST.

Table 5 shows the quantization of the power offset for HS-DPCCH. As shown in Table 5, when the signaled values for $\Delta_{ACK}$, $\Delta_{NACK}$ and/or $\Delta_{CQI}$ is 10, the Quantized amplitude ratios $A_{hs}=\beta_{hs}/\beta_c$ may be set to 48/15.

TABLE 5

| Signalled values for $\Delta_{ACK}$, $\Delta_{NACK}$ and $\Delta_{CQI}$ | Quantized amplitude ratios $A_{hs} = \beta_{hs}/\beta_c$ | Power offset of HS-DPCCH(dB) | Power offset Step of ($\Delta$ + 1) (dB) | Power offset step of ($\Delta$ + 2) (dB) | Power offset Step of ($\Delta$ + 3) (dB) | Power offset Step of ($\Delta$ + 4) (dB) |
|---|---|---|---|---|---|---|
| 16 | 190/15 | 22.0532468 | | | | |
| 15 | 150/15 | 20 | 2.053247 | | | |
| 14 | 120/15 | 18.0617997 | 1.9382 | 3.991447 | | |
| 13 | 95/15 | 16.0326469 | 2.029153 | 3.967353 | 6.0206 | |
| 12 | 75/15 | 13.9794001 | 2.053247 | 4.0824 | 6.0206 | 8.073847 |
| 11 | 60/15 | 12.0411998 | 1.9382 | 3.991447 | 6.0206 | 7.9588 |
| 10 | 48/15 | 10.1029996 | 1.9382 | 3.876401 | 5.929647 | 7.9588 |
| 9 | 38/15 | 8.07384675 | 2.029153 | 3.967353 | 5.905553 | 7.9588 |
| 8 | 30/15 | 6.02059991 | 2.053247 | 4.0824 | 6.0206 | 7.9588 |
| 7 | 24/15 | 4.08239965 | 1.9382 | 3.991447 | 6.0206 | 7.9588 |
| 6 | 19/15 | 2.05324684 | 2.029153 | 3.967353 | 6.0206 | 8.049753 |

TABLE 5-continued

| Signalled values for $\Delta_{ACK}$, $\Delta_{NACK}$ and $\Delta_{CQI}$ | Quantized amplitude ratios $A_{hs}$ – $\beta_{hs}/\beta_c$ | Power offset of HS-DPCCH(dB) | Power offset Step of ($\Delta$ + 1) (dB) | Power offset step of ($\Delta$ + 2) (dB) | Power offset Step of ($\Delta$ + 3) (dB) | Power offset Step of ($\Delta$ + 4) (dB) |
|---|---|---|---|---|---|---|
| 5 | 15/15 | 0 | 2.053247 | 4.0824 | 6.0206 | 8.073847 |
| 4 | 12/15 | −1.9382003 | 1.9382 | 3.991447 | 6.0206 | 7.9588 |
| 3 | 9/15 | −4.436975 | 2.498775 | 4.436975 | 6.490222 | 8.519375 |
| 2 | 8/15 | −5.4600254 | 1.02305 | 3.521825 | 5.460025 | 7.513272 |
| 1 | 6/15 | −7.9588002 | 2.498775 | 3.521825 | 6.0206 | 7.9588 |
| 0 | 5/15 | −9.5424251 | 1.583625 | 4.0824 | 5.10545 | 7.604225 |
| max | | | 2.498775 | 4.436975 | 6.490222 | 8.519375 |
| min | | | 1.02305 | 3.521825 | 5.10545 | 7.513272 |
| max | | | 2.498775 | 4.436975 | 6.490222 | 8.519375 |
| min | | | 1.02305 | 3.521825 | 5.10545 | 7.513272 |

In an embodiment, PRE or POST codeword for different feedback groups may be transmitted independently. The PRE or POST codeword transmission may be determined based on the content of the HARQ-ACK message associated with a particular feedback group across the neighbouring sub-frames.

For example, a HARQ preamble may be transmitted in a slot allocated to HARQ-ACK in sub-frame n−1, when in sub-frame n, if the information received on HS-SCCH for a cell or cells in a feedback group is not discarded. The HARQ preamble may include PRE for HS-DPCCH slot format 0 or PRE/PRE for HS-DPCCH slot format 1. A PRE/PRE may indicate that PRE is transmitted on a first half of the time slot allocated to HARQ-ACK, and PRE is transmitted on a second half of the time slot allocated to HARQ-ACK in a subframe. For example, a HARQ preamble may be transmitted in a slot allocated to HARQ-ACK in sub-frame n−1, unless an ACK or NACK or any combination of ACK and NACK is to be transmitted in sub-frame n−1. For example, the WTRU may transmit PRE/PRE for the feedback group in sub-frame n−1, unless an ACK or NACK or any combination of ACK and NACK for the feedback group is to be transmitted in sub-frame n−1.

For example, the WTRU may transmit PRE/PRE in a slot allocated to HARQ-ACK in a subframe such as subframe n−1, when a DTX codeword is to be transmitted in the subframe for each serving cell in the subframe, and at least one of ACK and NACK is to be transmitted in a subsequent subframe such as n. The WTRU may transmit PRE/PRE in a subframe such as subframe n−1, when the HARQ-ACK messages for the serving cells are to be DTX'd in subframe n−1, and the HARQ-ACK message for at least one serving cell is not DTX'd in a subsequent subframe such as n.

If ACK or NACK or any combination of ACK and NACK is transmitted for the cell or the pair of cells in a feedback group sub-frame n, the WTRU may transmit a postamble for the feedback group in sub-frame n+2×N_acknack_transmit−1 unless ACK or NACK or PRE or any combination of ACK and NACK is to be transmitted for the feedback group in this sub-frame. Parameter N_acknack_transmit may include a repetition factor of ACK/NACK. Parameter N_acknack_transmit may be a system-configured parameter.

For example, a HARQ postamble may be transmitted in the slot allocated to HARQ-ACK in sub-frame n+2×N_acknack_transmit−2 when HARQ is transmitted a feedback group is transmitted sub-frame n. A HARQ postamble may include as POST for HS-DPCCH slot format 0 or POST/POST for HS-DPCCH slot format 1. POST/POST may indicate that POST is transmitted on a first half of the time slot allocated to HARQ-ACK, and POST is transmitted on a second half of the time slot allocated to HARQ-ACK in a subframe. For example, a HARQ postamble may be transmitted in sub-frame n+2×N_acknack_transmit−2 unless ACK or NACK or PRE or PRE/PRE or any combination of ACK and NACK is to be transmitted in this sub-frame. For example, a HARQ postamble may be transmitted in sub-frame n+2ΔN_acknack_transmit−2, when HARQ is transmitted a feedback group is transmitted sub-frame n and parameter N_acknack_transmit is greater than 1. For example, a POST/POST may be transmitted in a subframe when the HARQ-ACK messages for the serving cells are to be DTX'd. The WTRU may transmit an HARQ postamble POST/POST in a slot allocated to HARQ-ACK in a sub-frame, when a DTX codeword is to be transmitted in the subframe for each of the configured serving cells.

Figure 10:
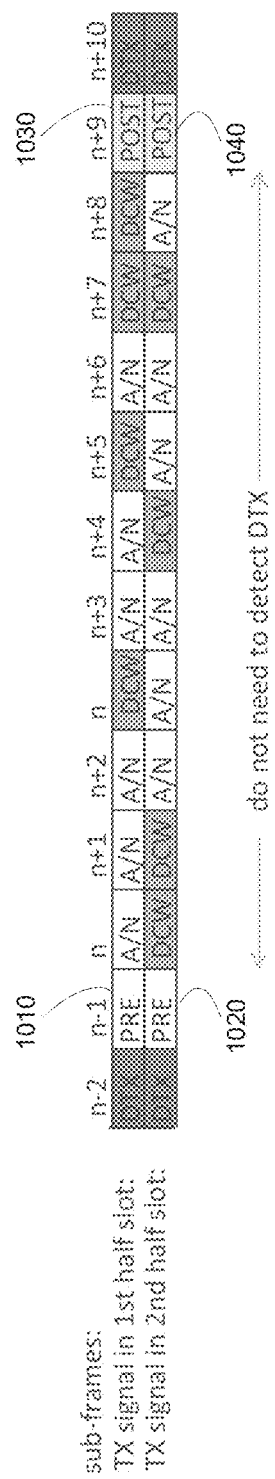
FIGS. 10 and 11 illustrate example transmitted signals with PREs/POSTs being filled.

FIG. 10 illustrates example transmitted signal with PREs/POSTs being filled. As shown, PRE/PRE may be transmitted in subframe n−1. PRE for the first feedback group may be transmitted in the first half slot 1010 of subframe n−1, and PRE for the second feedback group may be transmitted in the second half slot 1020 of subframe n−1. POST for the first feedback group may be transmitted in the first half slot 1030 of sub-frame n+2×N_acknack_transmit−2 such as subframe n+9, and POST for the second feedback group may be transmitted in the second half slot 1040 of sub-frame n+2×N_acknack_transmit−2 such as subframe n+9.

The duration of sub-frames over which discontinuous transmission (DTX) detection can be avoided may be determined. The duration may be determined based on, for example, the location of HARQ preamble such as PRE/PRE and postamble such as POST/POST. As shown in FIG. 10, DTX detection can be avoided between a PRE/PRE and a POST/POST. Detection reliability of PRE and POST at Node B receiver may be improved due to repetition transmission over multiple such as two HARQ-ACK messages.

In an embodiment, PRE/POST may be transmitted on the first HARQ-ACK message. The PRE/POST may be restricted to transmit on a portion of a time slot, such as the first or the second half slot, which may carry the ACK/NACK information for the primary cell. In the remaining portion of the time slot, such as the other half slot, DCW may be transmitted.

Figure 11:
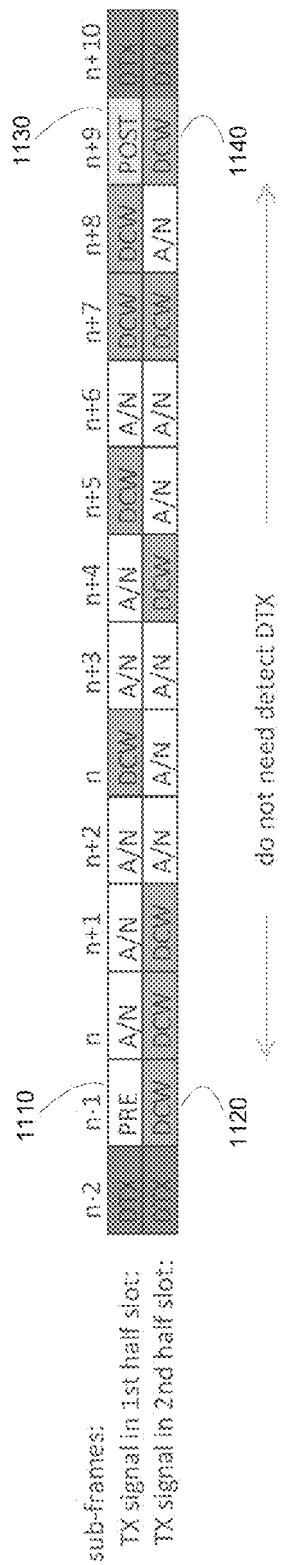

FIG. 11 illustrates another example transmitted signal with PREs/POSTs being filled. As shown, PRE may be transmitted on the first half slot 1110 of subframe n−1, and DTX codeword (DCW) may be transmitted in the second half slot 1120 of subframe n−1. For example, a DCW may be transmitted when one of the feedback codewords is DTXed. The WTRU may transmit DCW when the WTRU has not detected data on the cells/carriers associated with the codeword. For example, DTX may be transmitted when all the feedback codewords are DTXed. POST for the first feedback group may be transmitted in the first half slot 1130 of sub-frame n+2×N_acknack_transmit−2 such as subframe n+9, and DCW may be transmitted in the second half slot 1140 of subframe n+9. As shown in FIG. 11, DTX detection may not be needed between a PRE/DCW and a POST/DCW.

In an embodiment, the CQI or composite PCI/CQI for a feedback group may not be transmitted during a compressed mode gap. For example, if part of the uplink gap overlaps part of the slot that carries a PCI/CQI information report on the HS-DPCCH for a feedback group during a compressed mode gap, the PCI/CQI report over that time slot may not be transmitted. The PCI/CQI information report for the feedback group may be DTXed. In the same subframe, if another time slot that carries PCI/CQI report for a second feedback group does not overlap with the uplink gap, the PCI/CQI report for the second feedback group may be transmitted. In an embodiment, if part of the uplink gap overlaps part of the slot that carries a PCI/CQI information report on the HS-DPCCH for a feedback group during a compressed mode gap, the PCI/CQI report over that subframe may not be transmitted.

For example, during compressed mode on the associated Dedicated Physical Channel (DPCH) or Fractional Dedicated Physical Channel (F-DPCH), the following applies for the WTRU for transmission of HS-DPCCH and reception of HS-SCCH and HS-PDSCH. If in a HS-DPCCH subframe a part of a slot allocated for CQI information overlaps with an uplink transmission gap on the associated DPCH, the WTRU may not transmit the CQI or composite PCI/CQI information in that slot if HS-DPCCH slot format 1 shown in Table 1 is used. For example, if HS-DPCCH slot format 0 shown in Table 1 is used, the WTRU may not transmit the CQI or composite PCI/CQI information in that subframe.

For example, if the WTRU is configured with more than two secondary serving HS-DSCH cells and if in a HS-DPCCH sub-frame a part of the slot allocated for CQI information overlaps with an uplink transmission gap on the associated DPCH, the WTRU may not transmit CQI or composite PCI/CQI information in that time slot. For example, if the WTRU is configured with less than two secondary serving HS-DSCH cells and if in a HS-DPCCH sub-frame a part of the slots allocated for CQI information overlaps with an uplink transmission gap on the associated DPCH, the WTRU may not transmit CQI or composite PCI/CQI information in that sub-frame.

Table 5.1 illustrates example downlink configurations for the HS-DPCCH feedback. Table 5.1 is presented in order in terms of the total number of transport blocks to be transmitted. As shown, the size of the table grows exponentially as a function of the number of transport blocks.

Figure 14:
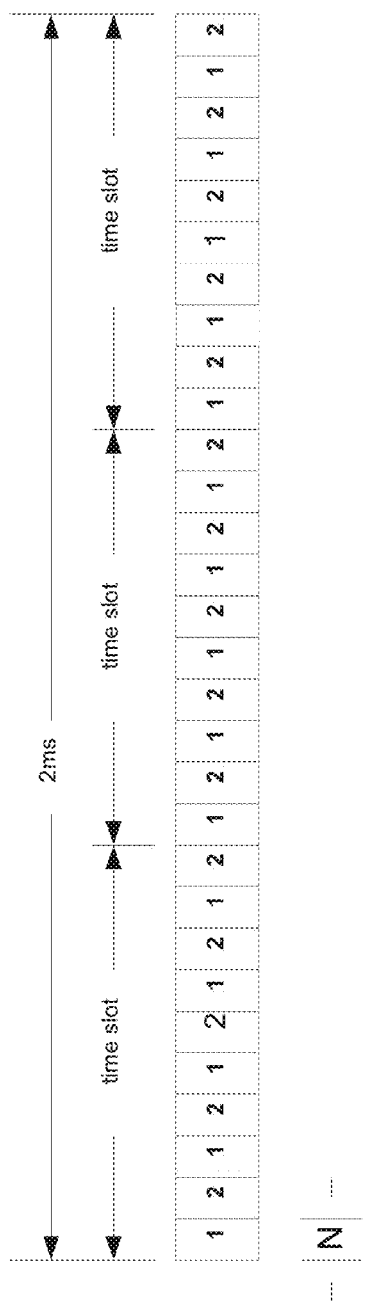

The HS-DPCCH frame format may be split via interleaved splitting as shown in FIG. 14. The feedback channels may be split by interleaving the bits. The 60 total bits of the HS-DPCCH with spreading factor 128 may be evenly divided into blocks of N bits, and the two feedback channels may then be allocated in an interleaved fashion. In this approach, the HARQ-ACK/NACK field of the two HS-DPCCHs may be mapped to feedback channel 1 and feedback channel 2 symbols during the first time slot, and the CQI/PCI for the HS-DPCCHs may be mapped to channel 1 and channel 2 in the second and third time slots, respectively.

Figure 15:
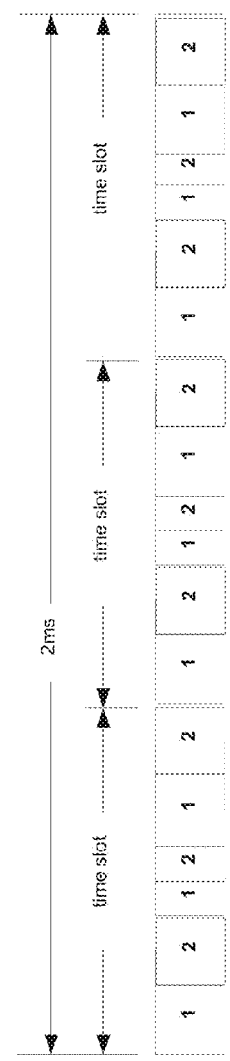

In an embodiment, total number of 60 bits of the HS-DPCCH may be unevenly divided into multiple blocks. An example interleaved splitting is shown in FIG. 15. Here the size of each block may be pre-defined, signaled, or the uneven pattern may be periodic, such as, per slot. Optionally the uneven pattern may not be periodic.

Figure 16:
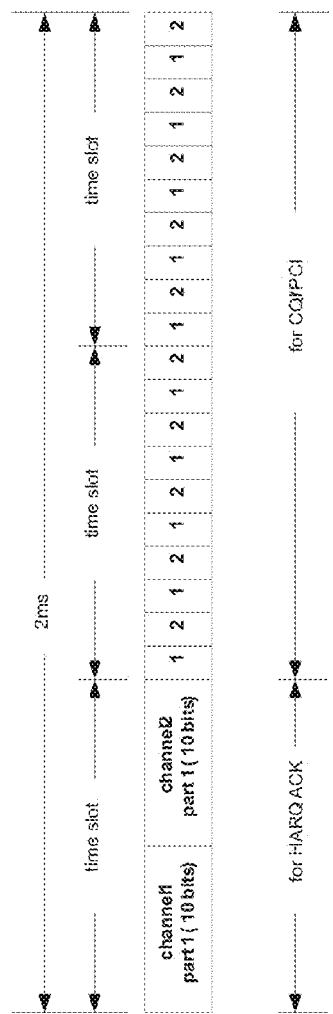
Figure 17:
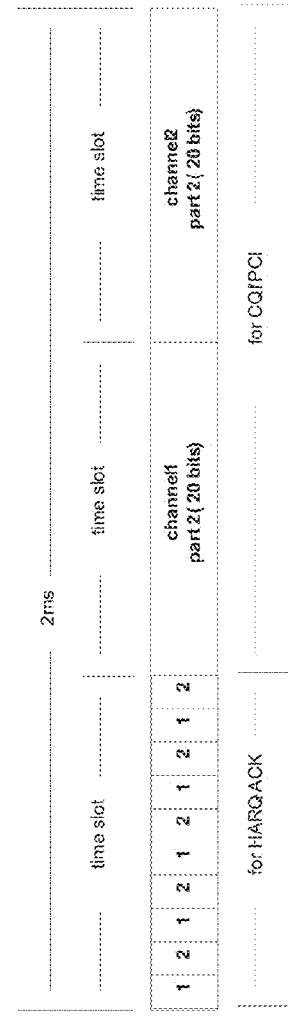

The HS-DPCCH frame format may be split using hybrid methods. The HARQ-ACK/NACK and CQI/PCI fields may be split using the different implementations described above. For example, the HARQ-ACK/NACK field may be transmitted in accordance with the per-timeslot split implementation and the CQI/PCI field may be transmitted in accordance with the interleaving split implementation. FIG. 16 shows a mixed use of the described splitting implementations for HARQ-ACK and CQI/PCI fields. Another example implementation is shown in FIG. 17, where the HARQ-ACK field uses the interleaving split implementation and the CQI/PCI field uses the per-field implementation.

Figure 18:
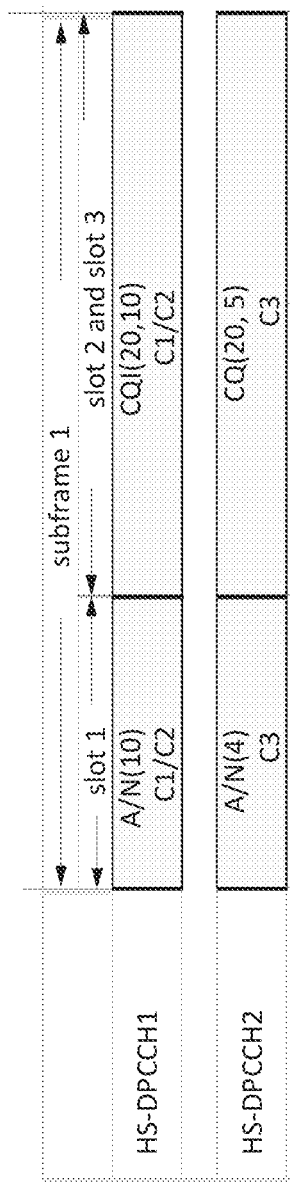

FIG. 18 shows an example HS-DPCCH layout for 3 carriers without MIMO. In an example, three carriers may be configured simultaneously for downlink data transmission and none of the carriers may be configured with MIMO. As shown in FIG. 18, the feedback of two carriers may be combined and transmitted in a feedback channel such as HS-DPCCH1 and the third carrier may be allocated to another feedback channel such as HS-DPCCH2. For example, feedback information may be transmitted for every carrier on every subframe. The CQI feedback cycle may equal to 1 subframe, e.g., 2 ms.

Figure 19:
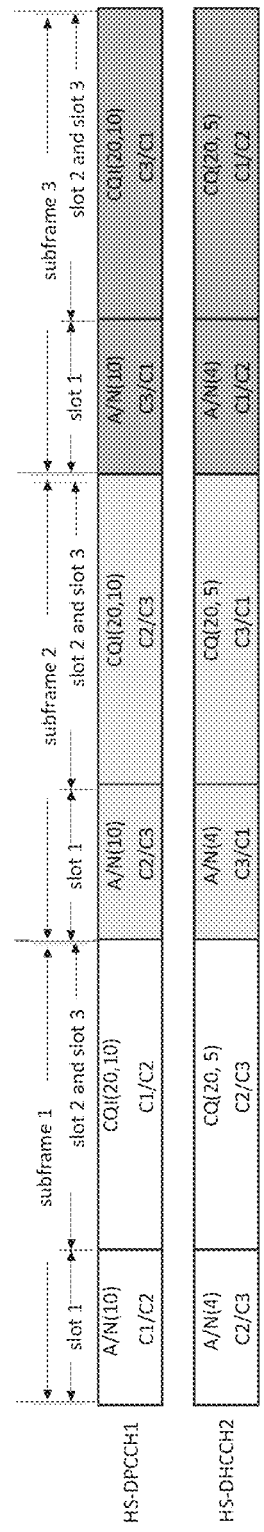

FIG. 19 shows an example HS-DPCCH layout for 3 carriers without MIMO with redundancy. With redundancy, the feedback information for a certain carrier may be transmitted on more than one feedback channels.

The feedback slot or resource for carrier C1 may be associated with the serving HS-DSCH cell, while the feedback slots for carrier C2 and carrier C3 may be associated with the secondary serving HS-DSCH cells in the order by which they are listed in the configuration message obtained by higher layers (RRC signaling).

TABLE 5.1

| Configuration case # | Number of transport blocks | Number of HSDPA Carriers | Number of carriers with MIMO | ACK/NACK codebook size (number of codes) | Max CQI/PCI size (bits) |
| --- | --- | --- | --- | --- | --- |
| 1 | 3 | 3 | 0 | 3 × 3 × 3 − 1 = 26 | 5 + 5 + 5 = 15 |
| 2 | 4 | 3 | 1 | 3 × 3 × 7 − 1 = 62 | 5 + 5 + 10 = 20 |
| 3 | 4 | 4 | 0 | 3 × 3 × 3 × 3 − 1 = 80 | 5 + 5 + 5 + 5 = 20 |
| 4 | 5 | 3 | 2 | 3 × 7 × 7 − 1 = 146 | 5 + 10 + 10 = 25 |
| 5 | 5 | 4 | 1 | 3 × 3 × 3 × 7 − 1 = 188 | 5 + 5 + 5 + 10 = 25 |
| 6 | 6 | 3 | 3 | 7 × 7 × 7 − 1 = 342 | 10 + 10 + 10 = 30 |
| 7 | 6 | 4 | 2 | 3 × 3 × 7 × 7 − 1 = 440 | 5 + 5 + 10 + 10 = 30 |
| 8 | 7 | 4 | 3 | 3 × 7 × 7 × 7 − 1 = 1028 | 5 + 10 + 10 + 10 = 35 |

Figure 20:
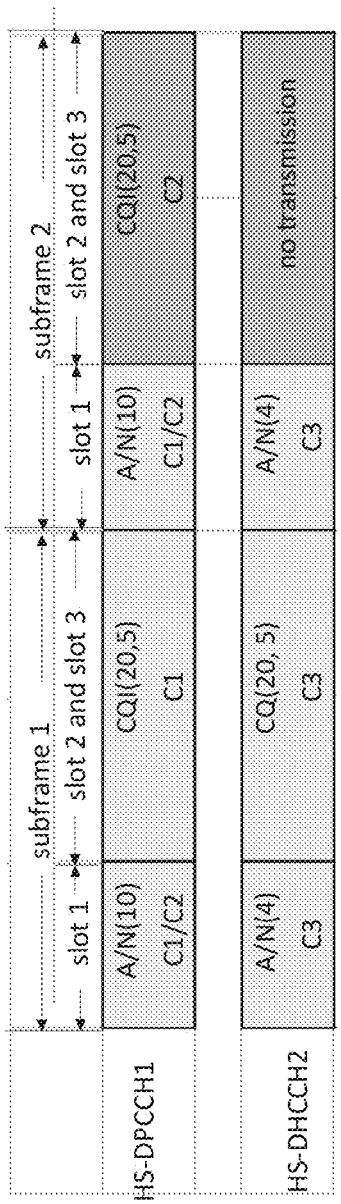

In an embodiment, the CQI/PCI field may be arranged in a time division multiplexing (TDM) fashion as shown in FIG. 20. The feedbacks from the two carriers may be coded independently by a (20,5) Reed Miller code and may be mapped in multiple, for example consecutive, sub-frames. The CQI feedback cycle may be 2 sub-frames. In an embodiment, the CQI report for carrier C3 may not transmitted in the second sub-frame. In an embodiment, the CQI report for C3 may be repeated in the second sub-frame.

Figure 21:
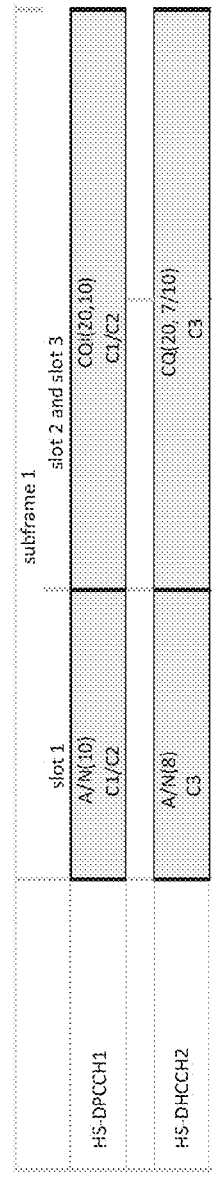

FIG. 21 shows an example HS-DPCCH layout for 3 carriers with one carrier configured in MIMO mode. For example, three carriers may be configured simultaneously for downlink data transmission, and one carrier may be configured with MIMO. For example, carrier C3 may be the MIMO carrier. The feedback slot for carrier C1 may be associated to the serving HS-DSCH cell, and the feedback slots for carrier C2 and carrier C3 may be associated to the secondary serving HS-DSCH cells for which MIMO is not configured and for which MIMO may be configured, respectively.

Figures 22, 23:
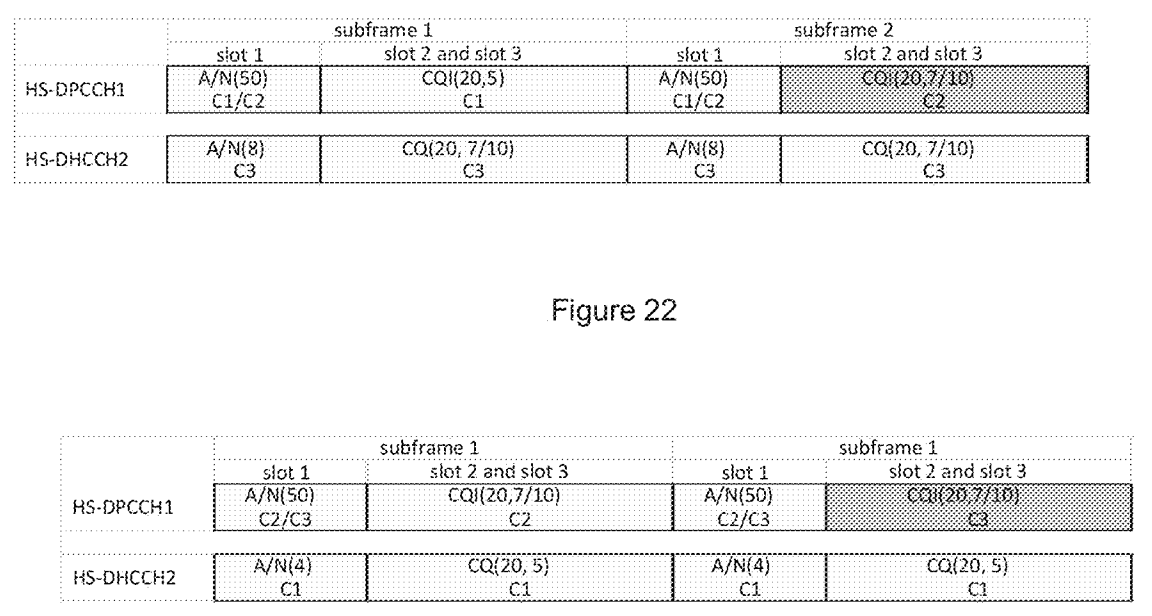

FIG. 22 shows an example HS-DPCCH layout with balanced loading for 3 carriers with two MIMO carriers. For example, three carriers may be configured simultaneously for downlink data transmission, with MIMO configured in two carriers. For example, carrier C2 and carrier C3 may be the MIMO carriers.

FIG. 23 shows an example HS-DPCCH layout with unbalanced loading for 3 carriers with two MIMO carriers.

Figure 24:
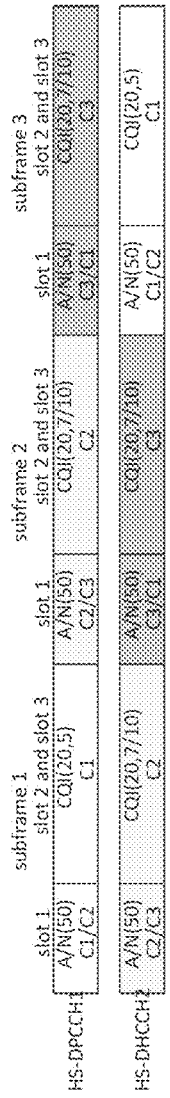

FIG. 24 shows an example HS-DPCCH layout with redundant loading for 3 carriers with two MIMO carriers. Carrier C1 may be associated to the serving HS-DSCH cell whereas carrier C2 and carrier C3 may be associated to the secondary serving HS-DSCH in the order by which they are configured. The order may be indicated, e.g., in the radio resource control (RRC) message.

Figure 25:
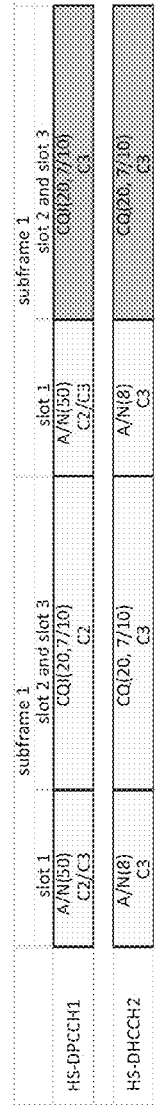

FIG. 25 shows an example HS-DPCCH layout for 3 carriers configured in MIMO. For example, three carriers may be configured simultaneously for downlink data transmission, and the three carriers may be configured in MIMO.

Figure 26:
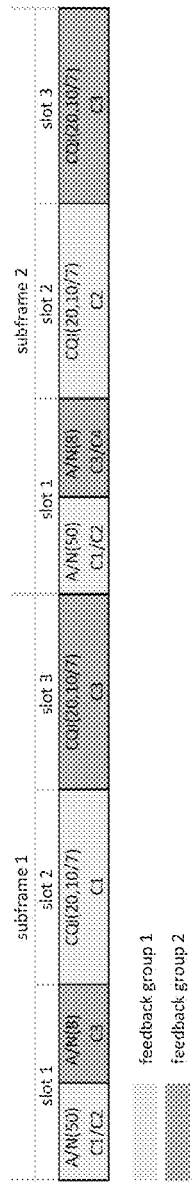

FIG. 26 shows an example HS-DPCCH layout with redundant loading for 3 carriers with all configured in MIMO with spread factor of 128. As shown, the two feedback channels/or groups are marked in different shades, with light shade for feedback group 1 and dark shade for feedback group 2.

Figure 27:
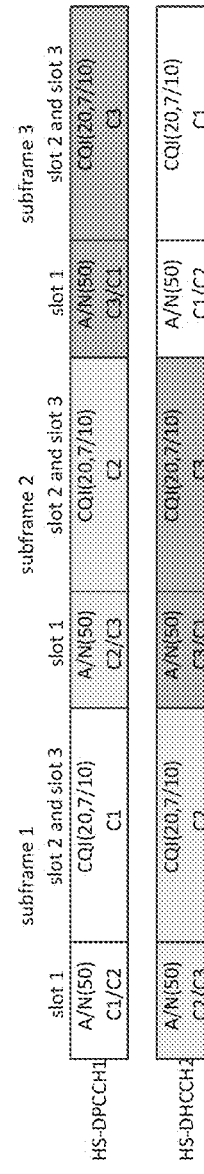

FIG. 27 shows an example HS-DPCCH layout with redundant loading for 3 carriers with all configured in MIMO. C1 may be associated with the serving HS-DSCH cell, whereas C2 and C3 may be associated with the secondary serving HS-DSCH in the order by which they are configured (e.g., in the RRC message). Under the context that the spreading factor is set to 128 to include two feedback channels/groups, for example, taking the frame format as shown in FIG. 9, the carrier mapping for 3 carriers with MIMO configured is shown in FIG. 27. As shown, the two feedback channels/or groups are marked in different shades, with light shade for feedback group 1 and dark shade for feedback group 2. For example, the minimum CQI feedback cycle may be 4 ms. CQI reporting for the four carriers may not be completed in less than 2 sub-frames.

Figure 28:
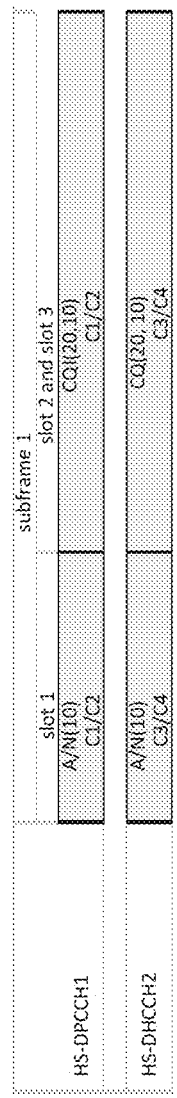

FIG. 28 shows an example HS-DPCCH layout for 4 carriers without MIMO. Four carriers may be configured and none of them may be configured with MIMO. Denote the four carriers as C1, C2, C3, and C4. For example, C1 may be associated to the serving HS-DSCH cell, and C2, C3 and C4 may be associated to the secondary serving HS-DSCH cells in the order by which they are configured, e.g., in the RRC message.

Figure 29:
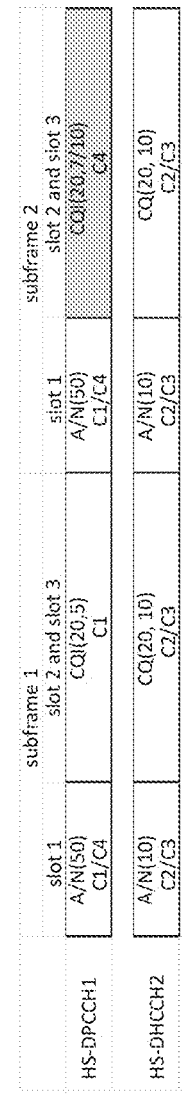

FIG. 29 shows an example HS-DPCCH layout for 4 carriers with one MIMO carrier. Four carriers may be configured, and MIMO may be configured with one of the four carriers. For example, carrier C4 may be the carrier configured with MIMO.

Figure 30:
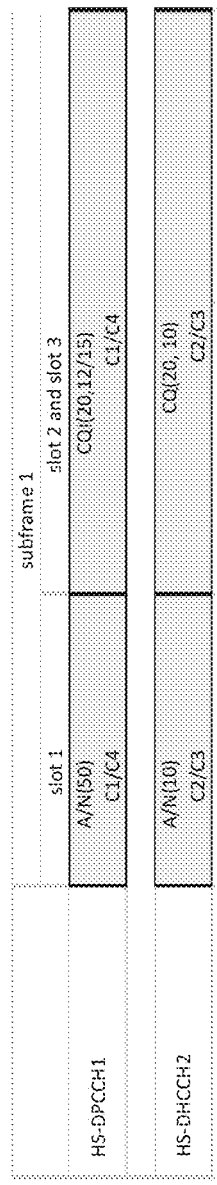

FIG. 30 shows an example HS-DPCCH layout for 4 carriers with one MIMO carrier. For example, a coding rate of (20, 15) may be applied for type A CQI or (20,12) for type B CQI. Denote this coding scheme as CQI(20, 12/15). This coding scheme may reduce the CQI feedback cycle for minimizing the impact to downlink transmission. Carrier C1 may be associated with the serving HS-DSCH cell, carrier C4 with the secondary serving HS-DSCH cell which is configured in MIMO mode and carrier C2 and carrier C3 may be associated with the other two secondary serving HS-DSCH cells, for example, in order by which they are configured in the RRC message. In an example, the serving HS-DSCH cell may be the one configured with MIMO, the serving HS-DSCH cell may be associated with C4 while C1, C2, and C3 may be associated with the secondary serving HS-DSCH cells, for example, in order by which they are configured in the RRC message.

Figure 31:
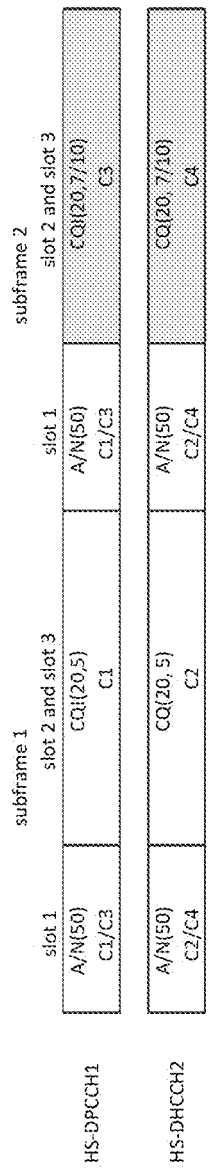

FIG. 31 shows an example HS-DPCCH layout with balanced loading for 4 carriers with two carriers in MIMO. For example, carriers C3 and C4 may be MIMO carriers.

Figure 32:
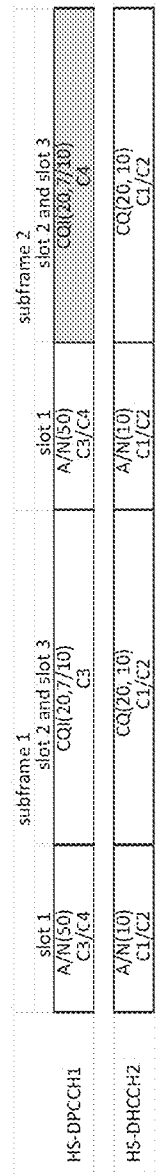

FIG. 32 shows an example HS-DPCCH layout with unbalanced loading for 4 carriers with two carriers in MIMO.

Figure 33:
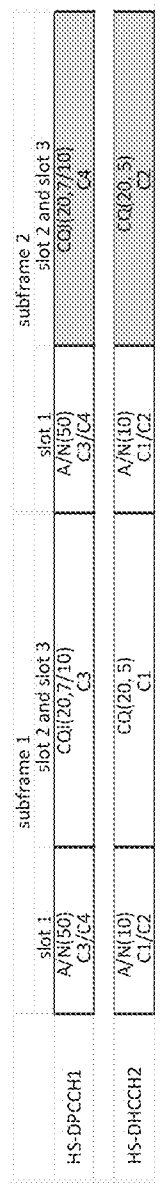

FIG. 33 shows an example HS-DPCCH layout with unbalanced loading for 4 carriers with two carriers in MIMO. As shown CQI feedback cycle may be equal for the carriers.

Figure 34:
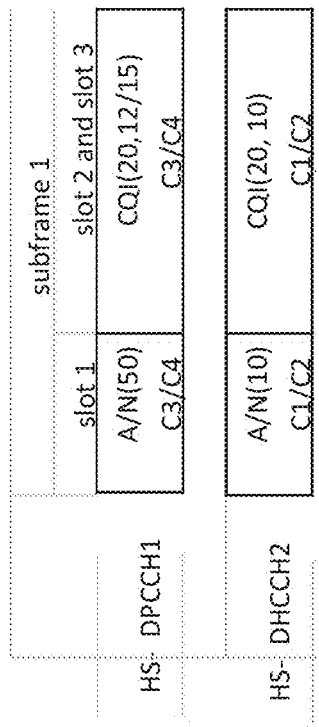

FIG. 34 shows an example HS-DPCCH layout for 4 carriers with two carriers in MIMO with a single CQI feedback cycle. For example, a coding rate of (20, 15) may be applied for type A CQI or (20,12) for type B CQI. Denote this coding scheme as CQI(20, 12/15).

If the serving HS-DSCH cell is not configured in MIMO, then it may be associated to C1 and C2 may be associated to the other HS-DSCH cell not configured in MIMO. C3 and C4 may be associated to the secondary serving HS-DSCH cells, for example, in order by which they are configured by the higher layers. If the serving HS-DSCH cell is configured in MIMO mode, it may be associated with C3. C1 and C2 may then be associated to the first two secondary HS-DSCH cells not configured in MIMO (e.g., in order by which they are configured) and C4 may be associated with the secondary serving HS-DSCH cell configured in MIMO.

Figure 35:
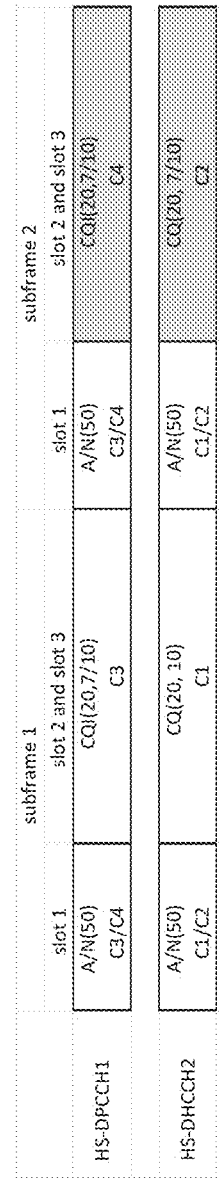

FIG. 35 shows an example HS-DPCCH layout for 4 carriers with three carriers in MIMO. For example, C2, C3, C4 may be the MIMO carriers and C1 may be the non-MIMO carrier. In this case if the serving HS-DSCH cell is not configured in MIMO, it may be associated with C1. Carriers C2, C3 and C4 may be associated to the secondary serving HS-DSCH cell, for example, in order by which they are configured by the higher layers. If the serving HS-DSCH cell is configured in MIMO mode, the serving HS-DSCH cell may be associated with C2. C1 may then be associated to the secondary HS-DSCH cell not configured in MIMO mode. Carriers C3 and C4 may be associated to the secondary serving HS-DSCH cells configured in MIMO, for example, in order by which they are configured in the RRC message.

Figures 36, 37:
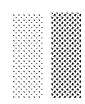

FIG. 36 shows an example HS-DPCCH layout for 4 carriers with all carriers in MIMO.

FIG. 37 shows an example HS-DPCCH layout for 4 carriers with all carriers in MIMO.

For example, the spreading factor is set to 128 to include two feedback channels. The frame format shown in FIG. 9, the carrier mapping for 4 carriers with MIMO configured in all carriers may be illustrated in FIG. 37. As shown, the two feedback channels/groups may be marked in different shades, with the light shade for feedback channel 1 and dark shade for feedback channel 2, for example. For example, CQI reporting for the four carriers may not be completed in less than 2 sub-frames. The minimum CQI feedback cycle may be 4 ms.

Although the feedback layouts disclosed in the above examples are described under the context of dual channel/dual group format generated by reducing the spreading factor, other mechanisms may be implemented to generate the additional feedback channel(s) including, but not limited to, using an additional channelization code to create the second feedback channel in the same uplink transmission; using two feedback channels over uplinks on two carriers; or using two feedback channels over in phase and quadrature signals of the same uplink while using the same channelization code. C1 may be associated with a serving high speed-downlink shared channel (HS-DSCH) cell and carrier C2, C3, and C4 may be associated with the secondary serving HS-DSCH cells in order by which they are configured by the higher layers or RRC signaling.

In an embodiment, legacy codebook codes may be reused. In an embodiment, a codeword for the discontinuous transmission (DTX) state, where the WTRU may not detect transport blocks from the carriers, may not exist in legacy codebooks. The HARQ-ACK/NACK slot may be in DTX mode (DTX'd).

For example, a POST codeword may be transmitted to indicate DTX. The HARQ-ACK slot may DTX'd if there is DTX for a full slot. For example, new codewords generated may be generated by combining two more legacy codebooks. For example, for a configuration such as case 8 shown in Table 5.1, there may be 1028 allowed states while the combination of two Release 9 DC-HSDPA MIMO codebooks may support up to 48×48=2304 different codewords. Combining legacy codebooks may reduce decoding complexity.

Some of the codewords may not be valid codewords for use in generating 4C-HSDPA codewords. Using case 8 shown in Table 5.1 as an example, the Release 9 codeword table may be split into multiple small tables as shown below. Table 6 shows a codebook mapping of HARQ-ACK when the WTRU is configured in MIMO mode and Secondary_Cell_Active is not 0. Tables 6-14 show codeword mapping tables A-H. For a carrier-pair in which one of the carriers is configured without MIMO, Tables E, G, H (or the other way around Tables D, F, H) have a total of 28 entries that may include invalid codewords that may not participate in the coding for 4C-HSDPA before re-labeling them. In an embodiment, a subset of the 4C-HSDPA codewords may not need re-labeling. For example, 48×(48−28)=960 4C-HSDPA codewords may not be relabeled. In an embodiment, a subset of the 4C-HSDPA codewords may be re-interpreted. For example, 1028−960=68 codewords are needed by re-interpreting the meaning of the legacy codewords. Codewords for 4C-HSDPA may be constructed to indicate DTX by re-labeling some of the legacy codewords.

One of the benefits of identifying these unused codewords is that it significantly reduces decoding complexity if a design rule is defined such that both the base station and WTRU know the invalid codewords that are common to both the base station and WTRU. This may be done by preventing both the base station and WTRU from using a common set of invalid codewords. For example, in the example above with case 8 shown in Table 5.1, use of Tables E, G, H may be disallowed (after taking 68 4C-HSDPA code words based on them) at both the base station and WTRU.

TABLE 6

| Number of detected transport blocks on one serving HS-DSCH cell | Number of detected transport blocks on the other serving HS-DSCH cell | | |
|---|---|---|---|
| | 0 | 1 | 2 |
| 0 | N/A | B | E |
| 1 | A | C | G |
| 2 | D | F | H |

TABLE 7

| A/D | 1 | 1 | 1 | 1 | 1 | 1 | 1 | 1 | 1 | 1 |
|---|---|---|---|---|---|---|---|---|---|---|
| N/D | 0 | 0 | 0 | 0 | 0 | 0 | 0 | 0 | 0 | 0 |

TABLE 8

| D/A | 0 | 0 | 0 | 0 | 0 | 0 | 1 | 1 | 1 | 1 |
|---|---|---|---|---|---|---|---|---|---|---|
| D/N | 1 | 1 | 1 | 1 | 1 | 1 | 0 | 0 | 0 | 0 |

TABLE 9

| A/A | 1 | 1 | 0 | 1 | 0 | 0 | 0 | 0 | 1 | 1 |
|---|---|---|---|---|---|---|---|---|---|---|
| A/N | 0 | 0 | 1 | 1 | 1 | 0 | 1 | 0 | 0 | 1 |
| N/A | 1 | 0 | 0 | 1 | 0 | 1 | 1 | 1 | 0 | 0 |
| N/N | 0 | 1 | 1 | 0 | 0 | 1 | 0 | 1 | 0 | 1 |

TABLE 10

| AA/D | 1 | 0 | 1 | 0 | 1 | 1 | 1 | 1 | 0 | 1 |
|---|---|---|---|---|---|---|---|---|---|---|
| AN/D | 1 | 1 | 0 | 1 | 0 | 1 | 0 | 1 | 1 | 1 |
| NA/D | 0 | 1 | 1 | 1 | 1 | 0 | 1 | 0 | 1 | 1 |
| NN/D | 1 | 0 | 0 | 1 | 0 | 0 | 1 | 0 | 0 | 0 |

TABLE 11

| D/AA | 1 | 0 | 0 | 0 | 1 | 0 | 0 | 0 | 1 | 1 |
|---|---|---|---|---|---|---|---|---|---|---|
| D/AN | 0 | 1 | 0 | 0 | 0 | 0 | 1 | 1 | 0 | 1 |
| D/NA | 0 | 0 | 0 | 1 | 1 | 1 | 1 | 1 | 1 | 0 |
| D/NN | 1 | 1 | 1 | 1 | 1 | 0 | 0 | 1 | 0 | 0 |

TABLE 12

| AA/A | 0 | 1 | 1 | 0 | 0 | 0 | 0 | 1 | 0 | 0 |
|---|---|---|---|---|---|---|---|---|---|---|
| AA/N | 1 | 1 | 1 | 0 | 0 | 1 | 1 | 0 | 1 | 0 |
| AN/A | 1 | 0 | 1 | 1 | 1 | 0 | 0 | 1 | 1 | 0 |
| AN/N | 0 | 0 | 1 | 1 | 0 | 1 | 0 | 0 | 0 | 1 |
| NA/A | 0 | 1 | 0 | 1 | 1 | 1 | 1 | 1 | 0 | 0 |
| NA/N | 1 | 1 | 0 | 0 | 1 | 0 | 0 | 0 | 0 | 1 |
| NN/A | 0 | 0 | 0 | 0 | 1 | 1 | 0 | 0 | 1 | 0 |
| NN/N | 0 | 1 | 0 | 0 | 0 | 1 | 1 | 0 | 0 | 1 |

TABLE 13

| | | | | | | | | | | |
|---|---|---|---|---|---|---|---|---|---|---|
| A/AA | 1 | 0 | 1 | 0 | 0 | 1 | 1 | 0 | 0 | 0 |
| A/AN | 1 | 0 | 0 | 1 | 0 | 1 | 0 | 1 | 0 | 1 |
| A/NA | 0 | 0 | 1 | 1 | 1 | 0 | 1 | 0 | 0 | 1 |
| A/NN | 0 | 1 | 1 | 0 | 1 | 0 | 0 | 1 | 1 |
| N/AA | 1 | 1 | 0 | 1 | 0 | 0 | 1 | 0 | 1 | 0 |
| N/AN | 1 | 1 | 0 | 0 | 0 | 1 | 0 | 1 | 1 | 0 |
| N/NA | 0 | 1 | 1 | 0 | 1 | 0 | 1 | 0 | 1 | 0 |
| N/NN | 0 | 0 | 1 | 0 | 1 | 1 | 0 | 1 | 0 | 1 |

TABLE 14

| | | | | | | | | | | |
|---|---|---|---|---|---|---|---|---|---|---|
| AA/AA | 0 | 1 | 1 | 0 | 1 | 1 | 0 | 1 | 1 | 1 |
| AA/AN | 1 | 0 | 1 | 1 | 0 | 0 | 1 | 1 | 1 | 1 |
| AA/NA | 1 | 1 | 0 | 1 | 1 | 1 | 1 | 0 | 0 | 1 |
| AA/NN | 0 | 1 | 1 | 0 | 1 | 1 | 1 | 0 | 0 |
| AN/AA | 0 | 0 | 0 | 1 | 1 | 0 | 0 | 1 | 0 | 1 |
| AN/AN | 1 | 1 | 1 | 0 | 0 | 0 | 0 | 0 | 0 | 1 |
| AN/NA | 1 | 0 | 0 | 0 | 0 | 1 | 0 | 1 | 0 | 0 |
| AN/NN | 0 | 0 | 1 | 1 | 0 | 1 | 0 | 0 | 0 | 1 |
| NA/AA | 1 | 1 | 0 | 0 | 1 | 0 | 1 | 1 | 1 | 0 |
| NA/AN | 0 | 0 | 1 | 0 | 1 | 0 | 1 | 0 | 0 | 0 |
| NA/NA | 1 | 0 | 1 | 1 | 1 | 1 | 0 | 0 | 1 | 0 |
| NA/NN | 1 | 1 | 1 | 0 | 0 | 1 | 1 | 0 | 1 | 0 |
| NN/AA | 0 | 1 | 0 | 1 | 0 | 0 | 0 | 0 | 1 | 0 |
| NN/AN | 0 | 0 | 1 | 0 | 0 | 0 | 0 | 1 | 1 | 0 |
| NN/NA | 0 | 1 | 0 | 0 | 1 | 1 | 0 | 0 | 0 | 0 |
| NN/NN | 0 | 0 | 0 | 0 | 0 | 1 | 1 | 0 | 1 | 1 |

Figure 38:
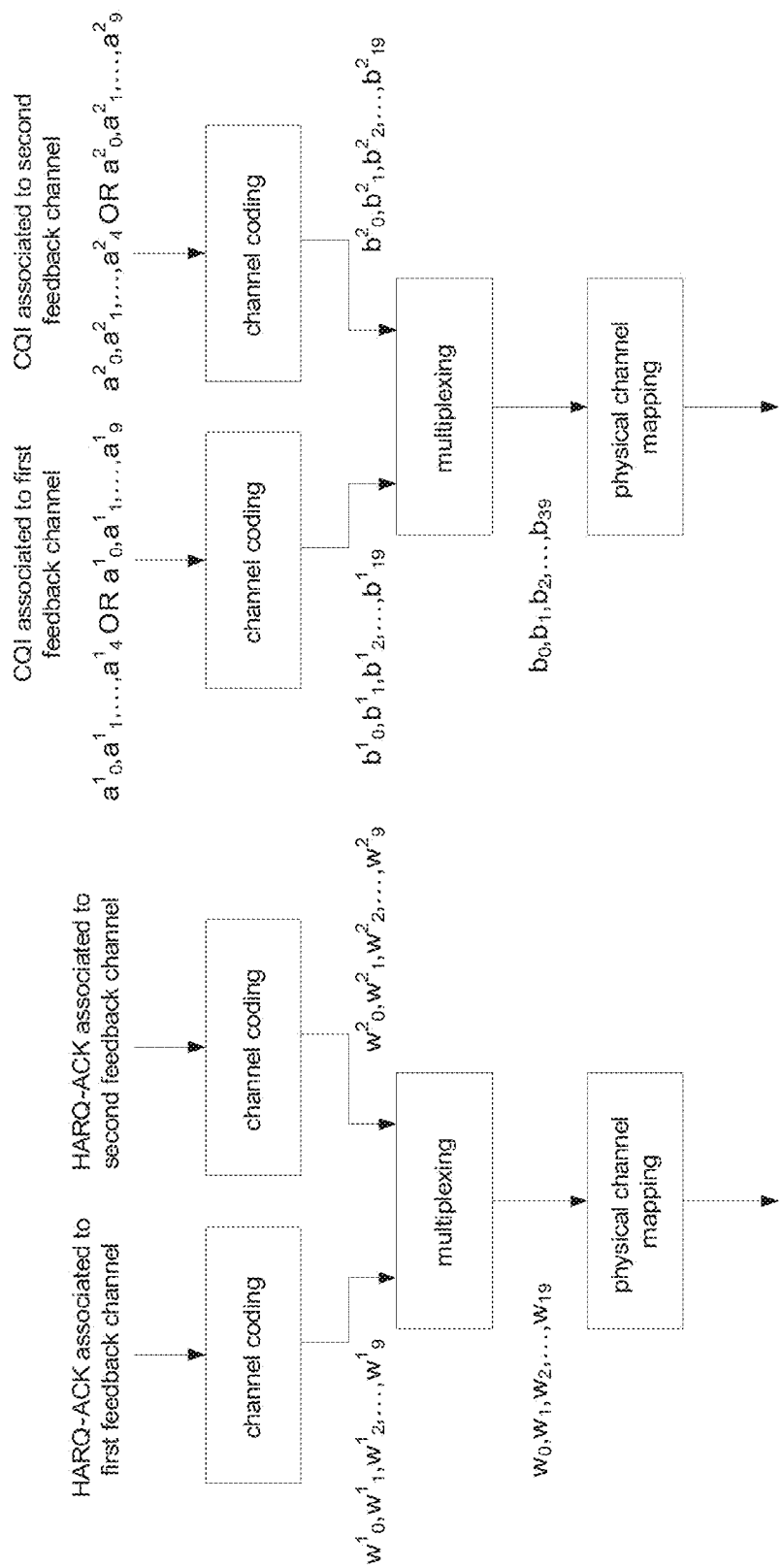
FIGS. 38-41 illustrate example coding flows of feedback information.

FIG. 38 shows an example coding flow where none of the active HS-DSCH cells is configured in MIMO mode. Channel coding may be performed in parallel or sequentially. The feedback information may be separately coded and may be time-multiplexed. For example, if a single HS-DSCH cell is allocated to a given feedback channel/group, the total number of CQI information bits may be 5. If two HS-DSCH cells are allocated to a given feedback channel/group, the total number of CQI information bits may be 10 bits. After the channel coding, both HARQ-ACK and CQI data from first and secondary feedback channels may be multiplexed and fed into the physical channel mapping function respectively.

Figure 39:
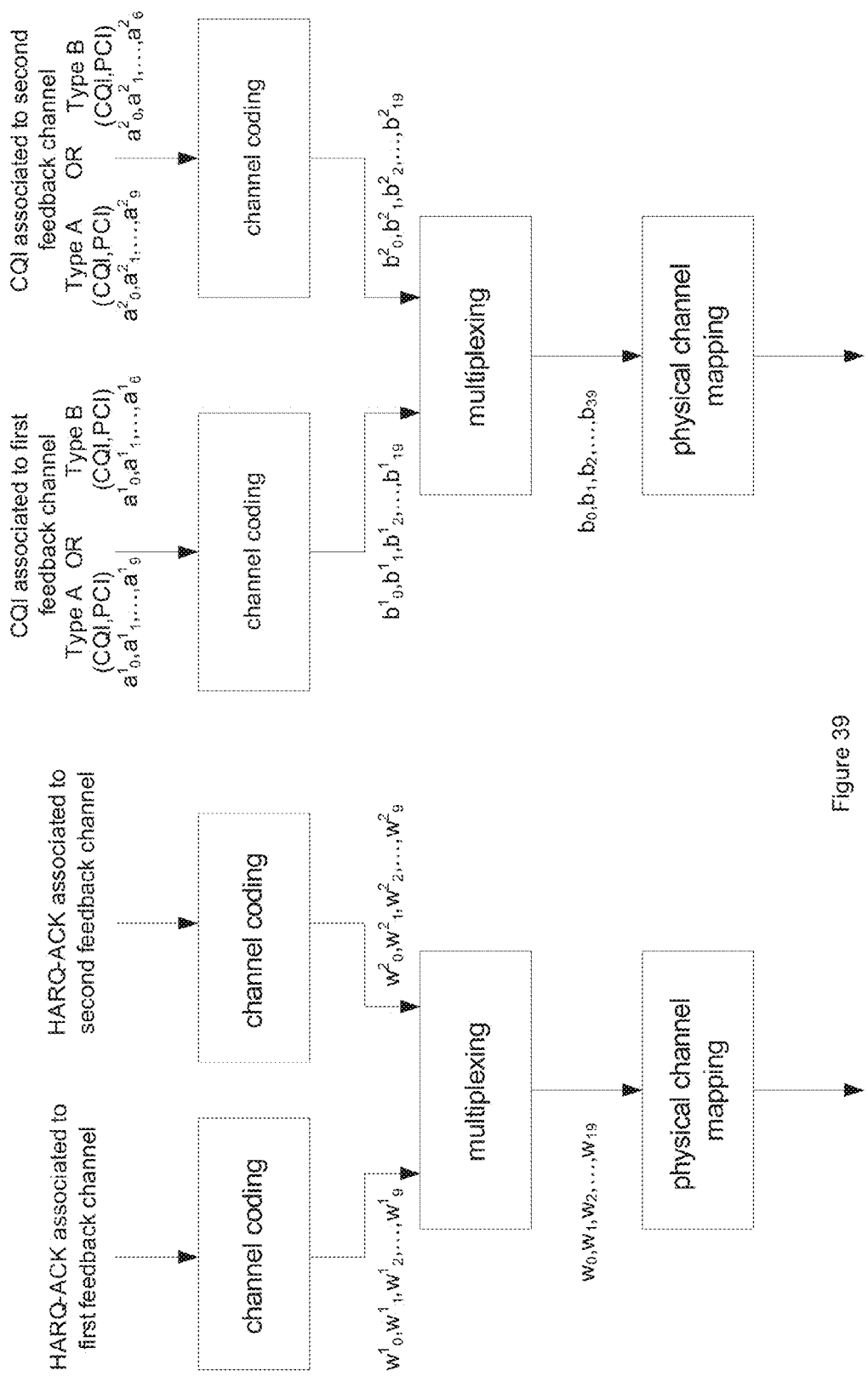
Figure 40:
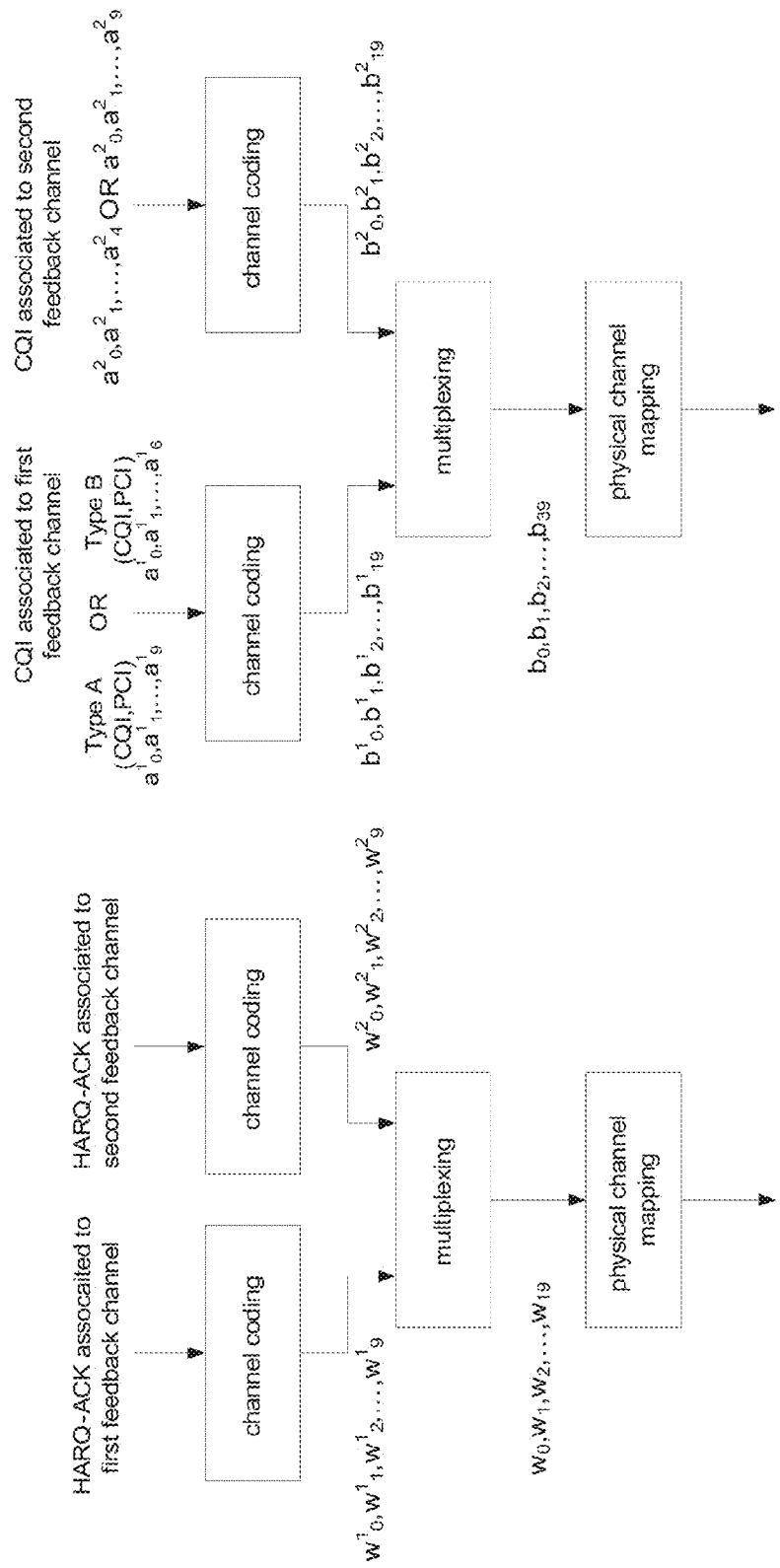

In an example, a feedback channel may carry the feedback information for at least one HS-DSCH cell that may be configured in MIMO mode, the measurement indication on that feedback channel may include precoding control indication (PCI) and channel quality indication (CQI). An example coding flow when both feedback channels include at least one HS-DSCH cell that in MIMO mode is shown in FIG. 39. FIG. 40 shows an example coding flow where one feedback channel supports the HS-DSCH cells that are configured in MIMO mode.

Figure 41:
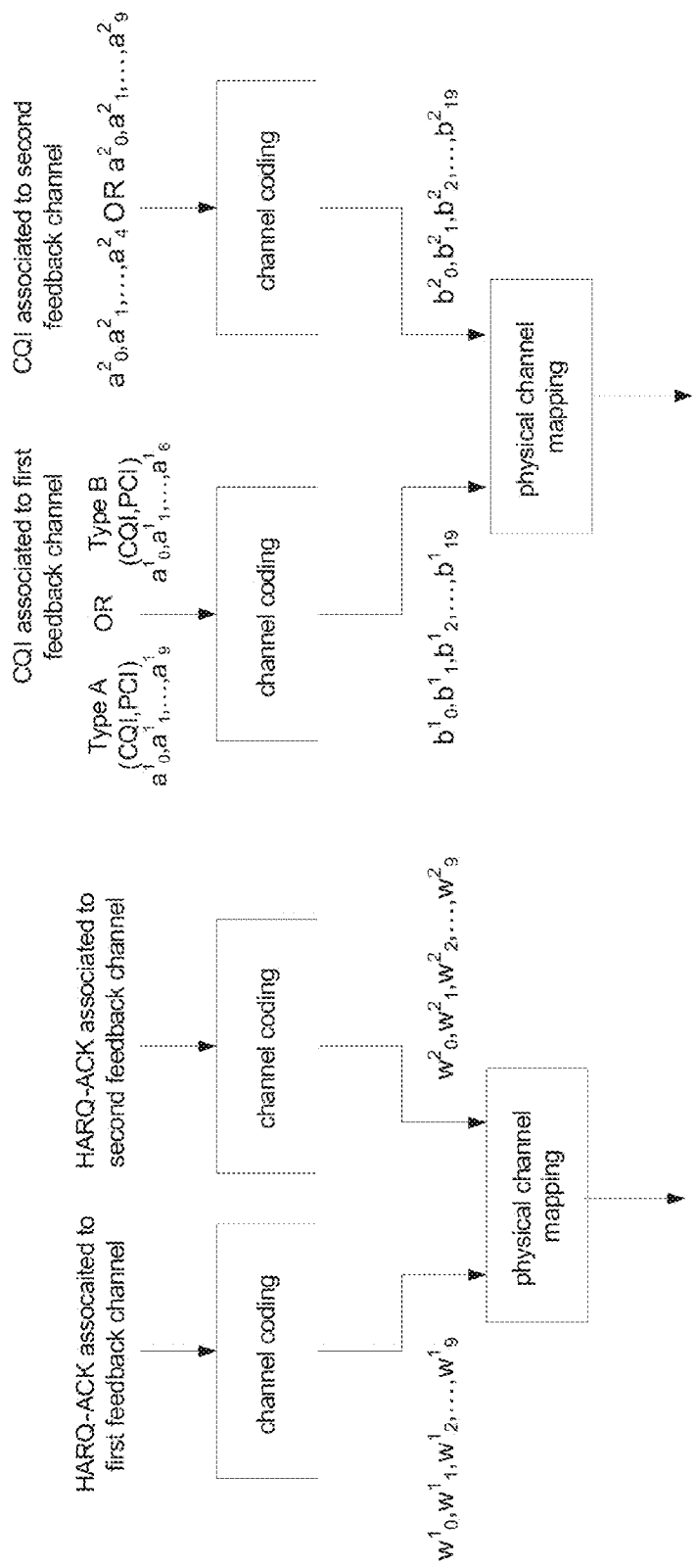

In an embodiment, multiplexing may not be included. For example, the illustrated multiplexing block or entity show in FIGS. 38-40 may not be included, if the physical channel mapping block or entity ensures that proper channel mapping is performed. FIG. 41 illustrates the multiplexing-less equivalent structure for the case illustrated in FIG. 33. The same approach may be used for the other cases illustrated in FIGS. 38-40.

Channel coding for each individual feedback channel may be performed independently. Channel coding may reuse the same encoding schemes as specified in the standards specifications (see 3GPP TS 25.212 v9.0.0, "Multiplexing and Channel Coding (FDD)") (3GPP TS 25.212), which is incorporated by reference herein), respectively, for the different cases specified herein.

Tables 15-17 show example channel coding schemes. In Table 15-17, channel coding case "A" may indicate that, when the feedback channel carries the feedback information for a single HS-DSCH cell which is not configured in MIMO mode, the channel coding may be performed according to subclause 4.7.2 of 3GPP TS 25.212. Channel coding case "B" may indicate that, when the feedback channel carries the feedback information for a single HS-DSCH cell configured in MIMO mode, the channel coding may be performed according to subclause 4.7.3 of 3GPP TS 25.212. Channel coding case "C" may indicate that, when the feedback channel carries the feedback information for dual HS-DSCH cells with none configured in MIMO mode, the channel coding may be performed according to subclause 4.7.3A of 3GPP TS 25.212. Channel coding case "D" may indicate that, when the feedback channel carries the feedback information for dual HS-DSCH cells with at least one being configured in MIMO mode, the channel coding may be performed according to subclause 4.7.3B of 3GPP TS 25.212.

The channel coding schemes used in the feedback channels may be associated with a specific configuration of the multiple cell transmission according to Table 15 if the balanced design principle described herein is applied.

TABLE 15

| Configuration case # | Num_of_Active_Cells | Number of cells configured in MIMO mode | Channel coding case for $1^{st}$ feedback channel | Channel coding case for $2^{nd}$ feedback channel |
|---|---|---|---|---|
| 1 | 3 | 0 | C | A |
| 2 | 3 | 1 | C | B |
| 3 | 4 | 0 | C | C |
| 4 | 3 | 2 | D | B |
| 5 | 4 | 1 | D | C |
| 6 | 3 | 3 | D | B |
| 7 | 4 | 2 | D | D |
| 8 | 4 | 3 | D | D |
| 9 | 4 | 4 | D | D |

The channel coding schemes used in the feedback channels may be associated to a specific configuration of the multiple cell transmission according to Table 16 if the unbalanced design principle described herein is applied.

TABLE 16

| Configuration case # | Num_of_Active_Cells | Number of cells configured in MIMO mode | Channel coding case for $1^{st}$ feedback channel | Channel coding case for $2^{nd}$ feedback channel |
| --- | --- | --- | --- | --- |
| 1 | 3 | 0 | C | A |
| 2 | 3 | 1 | D | A |
| 3 | 4 | 0 | C | C |
| 4 | 3 | 2 | D | A |
| 5 | 4 | 1 | D | C |
| 6 | 3 | 3 | D | B |
| 7 | 4 | 2 | D | C |
| 8 | 4 | 3 | D | D |
| 9 | 4 | 4 | D | D |

The coding schemes from previous standard releases may be used. For example, a coding scheme may be used for the configuration cases where none of the carriers in the feedback channel are configured in MIMO mode, and a coding scheme may be used for configuration cases where at least one carrier in the feedback channel is configured in MIMO mode. If the actual number of codewords in some configurations is smaller than that in the codebook used, the Node-B may consider to decode a subset of the codebook for better decoding performance. Example use of the two coding schemes is shown in Table 17. Note that there is no difference between the feedback channels due to their labels, and therefore they are interchangeable on any row when associating them with the coding schemes. Table 17 may be applied to HARQ-ACK codebook if the CQI/PCI coding scheme takes another form of encoding. Table 17 shows channel coding schemes associated with the cell configurations by using two codebooks.

TABLE 17

| Configuration case # | Num_of_Active_Cells | Number of cells configured in MIMO mode | Channel coding case for $1^{st}$ feedback channel | Channel coding case for $2^{nd}$ feedback channel |
| --- | --- | --- | --- | --- |
| 1 | 3 | 0 | C | C |
| 2 | 3 | 1 | D | C |
| 3 | 4 | 0 | C | C |
| 4 | 3 | 2 | D | C |
| 5 | 4 | 1 | D | C |
| 6 | 3 | 3 | D | D |
| 7 | 4 | 2 | D | C |
| 8 | 4 | 3 | D | D |
| 9 | 4 | 4 | D | D |

In an embodiment, power offset may be determined for the HARQ ACK slot. For a 4C-HSDPA system where three or four carriers are activated, power offsetting for HS-DPCCH1 and HS-DPCCH2 HARQ ACK slot may follow the rules shown in Table 18. Power offset setting may depend on the ACK/NACK codebooks used in HS-DPCCH1 and HS-DPCCH2.

For example, power offset setting rules shown in Table 18 may be applied to determine power offset Ahs1 for HS-DPCCH1 HARQ ACK slot. The rules in Table 18 may be applied to determine power offset Ahs2 for HS-DPCCH2 HARQ ACK slot. The power offset Ahs=max (Ahs1, Ahs2) may be determined. The WTRU may apply Ahs to HS-DPCCH HARQ ACK slot that may be a concatenation of HS-DPCCH1 and HS-DPCCH2 for SPREADING FACTOR 128. The WTRU may apply Ahs to HS-DPCCH HARQ ACK slot that may be a superposition of HS-DPCCH1 and HS-DPCCH2 for SF256. In an embodiment, different power offsets may be applied independently to the two feedback channels.

Power offset rules may be applied independently to the two HARQ-ACK codewords or the HARQ-ACK of HS-DPCCH1 and HS-DPCCH2. The maximum power offset of the two may be used for transmission in the timeslot. The rules in Tables 18 and 19 are the example rules for setting the power offset of the HARQ-ACK field in the HS-DPCCH. This may prevent the WTRU from changing transmission power at the half slot, in the case two different power offset would be used for the first and second HARQ-ACK codeword (or the HARQ-ACK of HS-DPCCH1 and HS-DPCCH2).

In an embodiment, the power offset setting may be dynamically adjusted. For example, the use of the rules may be based upon the carrier activation/deactivation. The power offset setting may be selected based on the MIMO configuration status of the active cells associated with a feedback channel. For example, when one carrier with MIMO is deactivated in a feedback channel, and the remaining carrier in the same feedback channel is not configured with MIMO, the power offset setting of this feedback channel may be altered to a lower value regardless of whether the other carriers at the WTRU are configured in MIMO mode or not. Using the maximum value as a common setting may avoid abrupt power change in the middle of a time slot.

TABLE 18

| # of activated carriers | # of activated carriers with MIMO configured | HARQ ACK Codebook of HS-DPCCH2 ACK slot | Rule applying to HS-DPCCH2 ACK slot | Codebook of HS-DPCCH1 ACK slot | Rule applying to HS-DPCCH1 ACK slot |
|---|---|---|---|---|---|
| 1 | 0 | SC | 1B | SC | 1B |
|   | 1 | SC-MIMO | 1B | SC-MIMO | 1B |
| 2 | 0 | DC | 2B | DC | 2B |
|   | 1 | Dc-MIMO | 3B | DC-MIMO | 3B |
|   | 2 | DC-MIMO | 3B | DC-MIMO | 3B |
| 3 | 0 | SC | 1A | DC | 2A |
|   | 1 | SC MIMO | 1A | DC | 2A |
|   |   | SC | 1A | DC-MIMO | 3A |
|   | 2 | SC | 1A | DC-MIMO | 3A |
|   |   | SC-MIMO | 1A | DC-MIMO | 3A |
|   | 3 | SC-MIMO | 1A | DC-MIMO | 3A |
| 4 | 0 | DC | 2A | DC | 2A |
|   | 1 | DC | 2A | DC-MIMO | 3A |
|   |   | DC-MIMO | 3A | DC | 2A |
|   | 2 | DC | 2A | DC-MIMO | 3A |
|   |   | DC-MIMO | 3A | DC-MIMO | 3A |
|   |   | DC-MIMO | 3A | DC | 2A |
|   | 3 | DC-MIMO | 3A | DC-MIMO | 3A |
|   | 4 | DC-MIMO | 3A | DC-MIMO | 3A |

In Table 18, rules for 1A, 2A, and 3A are specified in Table 19, and rules for 1B, 2B, 3B are specified in Table 20.

In an embodiment, the feedback information from first feedback channel/group may be duplicated to second feedback channel if one or two carriers are activated. Less power may be required to maintain the same level of HS-DPCCH transmission reliability.

In one embodiment, the rules in Table 18 may be used when the WTRU is configured to repeat the HARQ-ACK over the two half-slots. This may happen, for example, when the WTRU has one or two activated cells, or zero or one secondary serving HS-DSCH cell. The power offset may be reduced by 1 step down in the quantization table. The step down may compensate for the use of repetition that may require less transmission power from the WTRU side.

TABLE 19

| Rule | Cases applied to | Description |
|---|---|---|
| Rule 1A | non-MIMO single carrier (SC) WTRUs, MIMO SC WTRUs | $A_{hs}$ may equal the quantized amplitude ratio translated from the signalled value $\Delta_{ACK}$ if the corresponding HARQ-ACK message is ACK; $A_{hs}$ may equal the quantized amplitude ratio translated from the signalled value $\Delta_{NACK}$ if the corresponding HARQ-ACK message is NACK; $A_{hs}$ may equal the quantized amplitude ratio translated from the greatest of the signalled values $\Delta_{ACK}$ and $\Delta_{NACK}$ if the corresponding HARQ-ACK message is PRE before a single transport block or POST after a single transport block. $A_{hs}$ may equal the quantized amplitude ratio translated from the signalled value $\Delta_{ACK} + 1$ if the corresponding HARQ-ACK message is ACK/ACK; $A_{hs}$ may equal the quantized amplitude ratio translated from the signalled value $\Delta_{NACK} + 1$ if the corresponding HARQ-ACK message is NACK/NACK; $A_{hs}$ may equal the quantized amplitude ratio translated from the greatest of $(\Delta_{ACK} + 1)$ and $(\Delta_{NACK} + 1)$ if the corresponding HARQ-ACK message is ACK/NACK, NACK/ACK, PRE before a dual transport block or POST after a dual transport block. |
| Rule 2A | non-MIMO dual carrier (DC) WTRUs | $A_{hs}$ may equal the quantized amplitude ratio translated from the signalled value $\Delta_{ACK} + 1$ if the corresponding HARQ-ACK message contains at least one ACK but no NACK; $A_{hs}$ may equal the quantized amplitude ratio translated from the signalled value $\Delta_{NACK} + 1$ if the corresponding HARQ-ACK message contains at least one NACK but no ACK; $A_{hs}$ may equal the quantized amplitude ratio translated from the greatest of $(\Delta_{ACK} + 1)$ and $(\Delta_{NACK} + 1)$ if the corresponding HARQ-ACK message contains both ACK and NACK, or is a PRE or a POST. |
| Rule 3A | MIMO DC WTRUs | $A_{hs}$ may equal the quantized amplitude ratio translated from the signalled value $\Delta_{ACK} + 1$ if the corresponding HARQ-ACK message contains at least one ACK but no NACK; $A_{hs}$ may equal the quantized amplitude ratio translated from the signalled value $\Delta_{NACK} + 1$ if the corresponding HARQ-ACK |

TABLE 19-continued

| Rule | Cases applied to | Description |
|---|---|---|
| | | message contains at least one NACK but no ACK;<br>$A_{hs}$ may equal the quantized amplitude ratio translated from the greatest of $(\Delta_{ACK} + 1)$ and $(\Delta_{NACK} + 1)$ if the corresponding HARQ-ACK message contains both ACK and NACK, or is a PRE or a POST. |

TABLE 20

| Rule | Cases applied to | Description |
|---|---|---|
| Rule 1B | non-MIMO single carrier (SC) UEs, MIMO SC UEs | $A_{hs}$ may equal the quantized amplitude ratio translated from the signalled value $\Delta_{ACK} - 1$ if the corresponding HARQ-ACK message is ACK;<br>$A_{hs}$ may equal the quantized amplitude ratio translated from the signalled value $\Delta_{NACK} - 1$ if the corresponding HARQ-ACK message is NACK;<br>$A_{hs}$ may equal the quantized amplitude ratio translated from the greatest of the signalled values $\Delta_{ACK} - 1$ and $\Delta_{NACK} - 1$ if the corresponding HARQ-ACK message is PRE before a single transport block or POST after a single transport block.<br>$A_{hs}$ may equal the quantized amplitude ratio translated from the signalled value $\Delta_{ACK}$ if the corresponding HARQ-ACK message is ACK/ACK;<br>$A_{hs}$ may equal the quantized amplitude ratio translated from the signalled value $\Delta_{NACK}$ if the corresponding HARQ-ACK message is NACK/NACK;<br>$A_{hs}$ may equal the quantized amplitude ratio translated from the greatest of $\Delta_{ACK}$ and $\Delta_{NACK}$ if the corresponding HARQ-ACK message is ACK/NACK, NACK/ACK, PRE before a dual transport block or POST after a dual transport block. |
| Rule 2B | non-MIMO dual carrier (DC) UEs | $A_{hs}$ may equal the quantized amplitude ratio translated from the signalled value $\Delta_{ACK}$ if the corresponding HARQ-ACK message contains at least one ACK but no NACK;<br>$A_{hs}$ may equal the quantized amplitude ratio translated from the signalled value $\Delta_{NACK}$ if the corresponding HARQ-ACK message contains at least one NACK but no ACK;<br>$A_{hs}$ may equal the quantized amplitude ratio translated from the greatest of $\Delta_{ACK}$ and $\Delta_{NACK}$ if the corresponding HARQ-ACK message contains both ACK and NACK, or is a PRE or a POST. |
| Rule 3B | MIMO DC UEs | $A_{hs}$ may equal the quantized amplitude ratio translated from the signalled value $\Delta_{ACK}$ if the corresponding HARQ-ACK message contains at least one ACK but no NACK;<br>$A_{hs}$ may equal the quantized amplitude ratio translated from the signalled value $\Delta_{NACK}$ if the corresponding HARQ-ACK message contains at least one NACK but no ACK;<br>$A_{hs}$ may equal the quantized amplitude ratio translated from the greatest of $\Delta_{ACK}$ and $\Delta_{NACK}$ if the corresponding HARQ-ACK message contains both ACK and NACK, or is a PRE or a POST. |

Rules 1B, 2B, and 3B may be derived by adjusting a fixed amount of power (for example reducing 3 dB) from the $A_{hs}$ after it is calculated from 1A, 2A, 3A respectively in Table 19 with corresponding conditions.

When the WTRU is configured to apply repetition, the rules 1B, 2B and 3B may be implemented by reducing the resulting $A_{hs}$ by 3 dB, or by a fixed number of steps down from the quantization table. For example, if the WTRU has less than 2 secondary serving HS-DSCH cell active, then $A_{hs}$ may be reduced by a fixed value which could be a fixed X dB (e.g., 3 dB), or by deriving the value from N (e.g., 1 or 2) step(s) down the quantization table.

In an embodiment, more than two cells may be activated. If the WTRU is not configured in MIMO mode in any of the active cells in a feedback channel/group, then the power offset setting for HARQ-ACK associated with a feedback group that supports two active cells may be calculated according to rule 2A, and the power offset setting for HARQ-ACK associated with a feedback group that supports one active cell may be calculated according to rule 1A. If the WTRU is configured in MIMO mode in any one of the cells in a group, the power offset setting for HARQ-ACK associated with a feedback group that supports two active cells may be calculated according to rule 3A, and the power offset setting for HARQ-ACK associated with a feedback group that supports one active cell may be calculated according to rule 1A.

In an embodiment, two or less than two cells may be activated. If the WTRU is not configured in MIMO mode in any of the active cells in a feedback channel/group, the power offset setting for HARQ-ACK associated with a feedback group that supports two active cells may be calculated according to rule 2B, and the power offset setting for HARQ-ACK associated with a feedback group that supports one active cell may be calculated according to rule 1B. If there is two and less than two cells that are activated, and the WTRU is configured in MIMO mode in any one of the cells in a group then the power offset setting for HARQ-ACK associated with a feedback group that supports two active cells may be calculated according to rule 3B, and the power offset setting for HARQ-ACK associated with a feedback group that supports one active cell may be calculated according to rule 1B.

A common setting for the two feedback channels may be calculated. For example, the maximum power offset value of two feedback channels may be applied to the time slot allocated to HARQ-ACK transmission (e.g. the 1st slot in a sub-frame as shown FIG. 9). The maximum value may be calculated on a per sub-frame basis. The maximum value may be pre-calculated with a set of valued store in a table. This set of power setting values can be applied by means of table lookup to the HARQ-ACK slot.

For example, HARQ ACK power offset may be determined as follows. For the feedback group that includes the primary carrier/serving cell, denote $A_{hs1}$ as the $A_{hs}$ value for the HS-DPCCH slots carrying HARQ Acknowledgement. If Secondary_Cell_Active is 0, $A_{hs1}$ may equal the quantized amplitude ratio translated from the signaled value $\Delta_{ACK}$ if the corresponding HARQ-ACK message is ACK; $A_{hs1}$ may equal the quantized amplitude ratio translated from the signaled value $\Delta_{NACK}$ if the corresponding HARQ-ACK message is NACK; $A_{hs1}$ may equal the quantized amplitude ratio translated from the greatest of the signaled values $\Delta_{ACK}$ and $\Delta_{NACK}$ if the corresponding HARQ-ACK message is PRE before a single transport block or POST after a single transport block. $A_{hs1}$ may equal the quantized amplitude ratio translated from the signaled value $\Delta_{ACK}+1$ if the corresponding HARQ-ACK message is ACK/ACK; $A_{hs1}$ may equal the quantized amplitude ratio translated from the signaled value $\Delta_{NACK}+1$ if the corresponding HARQ-ACK message is NACK/NACK; $A_{hs1}$ may equal the quantized amplitude ratio translated from the greatest of ($\Delta_{ACK}+1$) and ($\Delta_{NACK}+1$) if the corresponding HARQ-ACK message is ACK/NACK, NACK/ACK, PRE before a dual transport block or POST after a dual transport block.

If Secondary_Cell1_Active is not 0, and if the WTRU is not configured in MIMO mode, $A_{hs1}$ may equal the quantized amplitude ratio translated from the signalled value $\Delta_{ACK}+1$ if the corresponding HARQ-ACK message contains at least one ACK but no NACK; $A_{hs1}$ may equal the quantized amplitude ratio translated from the signalled value $\Delta_{NACK}+1$ if the corresponding HARQ-ACK message contains at least one NACK but no ACK; $A_{hs1}$ may equal the quantized amplitude ratio translated from the greatest of ($\Delta_{ACK}+1$) and ($\Delta_{NACK}+1$) if the corresponding HARQ-ACK message contains both ACK and NACK, or is a PRE or a POST.

If Secondary_Cell1_Active is not 0, and if the WTRU is configured in MIMO mode, $A_{hs1}$ may equal the quantized amplitude ratio translated from the signalled value $\Delta_{ACK}+1$ if the corresponding HARQ-ACK message contains at least one ACK but no NACK; $A_{hs1}$ may equal the quantized amplitude ratio translated from the signalled value $\Delta_{NACK}+1$ if the corresponding HARQ-ACK message contains at least one NACK but no ACK; $A_{hs1}$ may equal the quantized amplitude ratio translated from the greatest of ($\Delta_{ACK}+1$) and ($\Delta_{NACK}+1$) if the corresponding HARQ-ACK message contains both ACK and NACK, or is a PRE or a POST.

For the feedback group that does not include the primary carrier/serving cell, denote $A_{hs2}$ as the $A_{hs}$ value for the HS-DPCCH slots carrying HARQ Acknowledgement. If Secondary_Cell2_Active or Secondary_Cell3_Active is 0, $A_{hs2}$ may equal the quantized amplitude ratio translated from the signaled value $\Delta_{ACK}$ if the corresponding HARQ-ACK message is ACK; $A_{hs2}$ may equal the quantized amplitude ratio translated from the signaled value $\Delta_{NACK}$ if the corresponding HARQ-ACK message is NACK; $A_{hs2}$ may equal the quantized amplitude ratio translated from the greatest of the signaled values $\Delta_{ACK}$ and $\Delta_{NACK}$ if the corresponding HARQ-ACK message is PRE before a single transport block or POST after a single transport block. $A_{hs2}$ may equal the quantized amplitude ratio translated from the signaled value $\Delta_{ACK}+1$ if the corresponding HARQ-ACK message is ACK/ACK; $A_{hs2}$ may equal the quantized amplitude ratio translated from the signaled value $\Delta_{NACK}+1$ if the corresponding HARQ-ACK message is NACK/NACK; $A_{hs2}$ may equal the quantized amplitude ratio translated from the greatest of ($\Delta_{ACK}+1$) and ($\Delta_{NACK}+1$) if the corresponding HARQ-ACK message is ACK/NACK, NACK/ACK, PRE before a dual transport block or POST after a dual transport block.

If Secondary_Cell2_Active or Secondary_Cell3_Active is not 0, and if the WTRU is not configured in MIMO mode, $A_{hs2}$ may equal the quantized amplitude ratio translated from the signalled value $\Delta_{ACK}+1$ if the corresponding HARQ-ACK message contains at least one ACK but no NACK; $A_{hs2}$ may equal the quantized amplitude ratio translated from the signalled value $\Delta_{NACK}+1$ if the corresponding HARQ-ACK message contains at least one NACK but no ACK; $A_{hs2}$ may equal the quantized amplitude ratio translated from the greatest of ($\Delta_{ACK}+1$) and ($\Delta_{NACK}+1$) if the corresponding HARQ-ACK message contains both ACK and NACK, or is a PRE or a POST.

If Secondary_Cell2_Active or Secondary_Cell3_Active is not 0, and if the WTRU is configured in MIMO mode, $A_{hs2}$ may equal the quantized amplitude ratio translated from the signalled value $\Delta_{ACK}+1$ if the corresponding HARQ-ACK message contains at least one ACK but no NACK; $A_{hs2}$ may equal the quantized amplitude ratio translated from the signalled value $\Delta_{NACK}+1$ if the corresponding HARQ-ACK message contains at least one NACK but no ACK; $A_{hs2}$ may equal the quantized amplitude ratio translated from the greatest of ($\Delta_{ACK}+1$) and ($\Delta_{NACK}+1$) if the corresponding HARQ-ACK message contains both ACK and NACK, or is a PRE or a POST.

In an embodiment, $A_{hs}$ may equal the greatest of the calculated values $A_{hs1}$ and $A_{hs2}$.

In an embodiment, power offset setting HARQ ACK may be based on simulation results. In 4C-HSDPA, different HS-DPCCH channel formats may be used based on the number of carriers configured/activated at the WTRU. The power offset may be dependent on the number of carriers that have MIMO configured. To evaluate the power offset for HARQ ACK, misdetection probability for a specific false alarm target which may be on per stream basis denoted as Pe_str, or on per codeword basis denoted as Pe_cw, and RLC retransmission probability denoted as Pr_RLC are used as metrics, the performance target for Pe_str, Pe_cw and Pr_RLC are respectively 1%, 1% and 0.01% when designing the power offset rules for HARQ-ACK.

As different configuration such as the number of carriers activated and the number of carriers that have MIMO configured, the max power offset required to respectively maintain the performance target for the according codebooks are obtained with the simulation running in additive white Gaussian noise (AWGN) channel and summarized in Table 21. The specific false alarm targets used in simulations are respectively 0.01 and 0.1. Table 21 shows max power offset simulation results.

TABLE 21

| Secondary_Cell_Active | conditions | P_fa = 0.01 | | | P_fa = 0.1 | | |
|---|---|---|---|---|---|---|---|
| | | Pe_str | Pe_cw | Pr_RLC | Pe_str | Pe_cw | Pr_RLC |
| 0 | | 0.41 | 0.41 | 0 | 0.62 | 0.64 | 0.86 |
| 1 | | 1.29 | 1.3 | 1.86 | 2.01 | 2.09 | 3.02 |
| 2 | Secondary_Cell_Enabled = 2 and WTRU is not configured in MIMO mode | 1.31 | 1.32 | 2.34 | 2.06 | 2.14 | 3.24 |
| 2 | Otherwise | 2.32 | 2.39 | 5.87 | 3.96 | 4 | 5.9 |
| 3 | | 2.71 | 2.91 | 6.25 | 4.23 | 4.55 | 6.26 |

The HS-DPCCH power settings for HS-DPCCH slots carrying HARQ Acknowledgement may be determined based on the simulation results in Table 21. Power offset setting schemes are described below for HARQ ACK field when Secondary_cell_Active is bigger than 1, e.g., for a 4C-HSDPA system where three or four carriers are activated. As shown in Table 21, the max power offset required for Pe_str and Pe_cw are similar.

In an embodiment, the power offset rule may be determined for HARQ-ACK based on per-stream, Pe_str. For example, the HS-DPCCH channel may carry feedback for multiple DL data streams in 4C-HSDPA, e.g., when 4 carriers are configured with MIMO and the number of stream is 8, the performance target may be met for the streams together.

In an embodiment, HARQ-ACK power offset setting schemes may be based on P_fa=0.01. In an example, the probability of false alarm P_fa=0.01 and performance target Pe_str=1%. To guarantee the HARQ-ACK performance for possible scenario including the worst case scenario which requires most power, the HARQ-ACK power offset may be set such that it is bigger than the required max power offset obtained by simulations, shown in Table 22. Table 22 shows example power offset setting schemes where HARQ-ACK power offset setting when Secondary_Cell_Active is bigger than 1.

TABLE 22

| | | $A_{hs}$ may equal the quantized amplitude ratio translated from HARQ-ACK message sent in one time slot | | |
|---|---|---|---|---|
| Secondary_Cell_Active | Condition | contains at least one ACK but no NACK | contains at least one NACK but no ACK | contains both ACK and NACK or is a PRE or is a POST |
| 2 | Secondary_Cell_Enabled = 2 and WTRU is not configured in MIMO mode | $\Delta_{ACK} + 2$ | $\Delta_{NACK} + 2$ | MAX($\Delta_{ACK} + 2$, $\Delta_{NACK} + 2$) |
| 2 | Otherwise | $\Delta_{ACK} + 2$ | $\Delta_{NACK} + 2$ | MAX($\Delta_{ACK} + 2$, $\Delta_{NACK} + 2$) |
| 3 | | $\Delta_{ACK} + 2$ | $\Delta_{NACK} + 2$ | MAX($\Delta_{ACK} + 2$, $\Delta_{NACK} + 2$) |

In an embodiment, HARQ-ACK power offset setting schemes may be based on probability of false alarm P_fa=0.01 and performance target Pe_str=1%. Table 23 shows example power offset setting schemes where Secondary_Cell_Active is bigger than 1. The HARQ-ACK power offset setting may be chosen to be close enough to the required max power offset obtained by simulations.

TABLE 23

| | | $A_{hs}$ may equal the quantized amplitude ratio translated from HARQ-ACK message sent in one time slot | | |
|---|---|---|---|---|
| Secondary_Cell_Active | Condition | contains at least one ACK but no NACK | contains at least one NACK but no ACK | contains both ACK and NACK or is a PRE or is a POST |
| 2 | Secondary_Cell_Enabled = 2 and WTRU is not configured in MIMO mode | $\Delta_{ACK} + 1$ | $\Delta_{NACK} + 1$ | MAX($\Delta_{ACK} + 1$, $\Delta_{NACK} + 1$) |
| 2 | Otherwise | $\Delta_{ACK} + 2*$ | $\Delta_{NACK} + 2*$ | MAX($\Delta_{ACK} + 2*$, $\Delta_{NACK} + 2*$) |

TABLE 23-continued

| | | $A_{hs}$ may equal the quantized amplitude ratio translated from HARQ-ACK message sent in one time slot | | |
|---|---|---|---|---|
| Secondary_Cell_Active | Condition | contains at least one ACK but no NACK | contains at least one NACK but no ACK | contains both ACK and NACK or is a PRE or is a POST |
| 3 | | $\Delta_{ACK} + 2$ | $\Delta_{NACK} + 2$ | MAX($\Delta_{ACK} + 2$, $\Delta_{NACK} + 2$) |

Notes:
*denotes that power offset setting could be +1 instead of +2 to further reduce the interference at cost of performance degradation.

In an embodiment, HARQ-ACK power offset setting schemes may be based on probability of false alarm P_fa=0.01 and performance target Pr_RLC=0.01%. Table 24 shows example power offset setting schemes where Secondary_Cell_Active is bigger than 1. For example, HARQ-ACK power offset may be set such that the HARQ-ACK performance may be guaranteed. HARQ-ACK power offset may be set such that it is bigger than the required max power offset obtained by simulations.

TABLE 24

| | | $A_{hs}$ may equal the quantized amplitude ratio translated from HARQ-ACK message sent in one time slot | | |
|---|---|---|---|---|
| Secondary_Cell_Active | Condition | contains at least one ACK but no NACK | contains at least one NACK but no ACK | contains both ACK and NACK or is a PRE or is a POST |
| 2 | Secondary_Cell_Enabled = 2 and WTRU is not configured in MIMO mode | $\Delta_{ACK} + 2$ | $\Delta_{NACK} + 2$ | MAX($\Delta_{ACK} + 2$, $\Delta_{NACK} + 2$) |
| 2 | Otherwise | $\Delta_{ACK} + 4$ | $\Delta_{NACK} + 4$ | MAX($\Delta_{ACK} + 4$, $\Delta_{NACK} + 4$) |
| 3 | | $\Delta_{ACK} + 4$ | $\Delta_{NACK} + 4$ | MAX($\Delta_{ACK} + 4$, $\Delta_{NACK} + 4$) |

In an embodiment, HARQ-ACK power offset setting schemes may be based on probability of false alarm P_fa=0.01 and performance target Pr_RLC=0.01%. Table 25 shows example power offset setting schemes where Secondary_Cell_Active is bigger than 1. For example, HARQ-ACK power offset may be set such that the HARQ-ACK performance may be guaranteed, when the interference level may be increased. HARQ-ACK power offset may be set such that it may be chosen to be close enough to the required max power offset obtained by simulations.

TABLE 25

| | | $A_{hs}$ may equal the quantized amplitude ratio translated from HARQ-ACK message sent in one time slot | | |
|---|---|---|---|---|
| Secondary_Cell_Active | Condition | contains at least one ACK but no NACK | contains at least one NACK but no ACK | contains both ACK and NACK or is a PRE or is a POST |
| 2 | Secondary_Cell_Enabled = 2 and WTRU is not configured in MIMO mode | $\Delta_{ACK} + 1$ | $\Delta_{NACK} + 1$ | MAX($\Delta_{ACK} + 1$, $\Delta_{NACK} + 1$) |
| 2 | Otherwise | $\Delta_{ACK} + 3$ | $\Delta_{NACK} + 3$ | MAX($\Delta_{ACK} + 3$, $\Delta_{NACK} + 3$) |
| 3 | | $\Delta_{ACK} + 3$ | $\Delta_{NACK} + 3$ | MAX($\Delta_{ACK} + 3$, $\Delta_{NACK} + 3$) |

In an embodiment, HARQ-ACK power offset setting schemes may be based on probability of false alarm P_fa=0.1, and performance target Pe_str=1%. Table 26 shows example power offset setting schemes where Secondary_Cell_Active is bigger than 1. HARQ-ACK power offset may be set such that it is bigger than the required max power offset obtained by simulations.

TABLE 26

| Secondary_Cell_Active | Condition | $A_{hs}$ may equal the quantized amplitude ratio translated from HARQ-ACK message sent in one time slot | | |
|---|---|---|---|---|
| | | contains at least one ACK but no NACK | contains at least one NACK but no ACK | contains both ACK and NACK or is a PRE or is a POST |
| 2 | Secondary_Cell_Enabled = 2 and WTRU is not configured in MIMO mode | $\Delta_{ACK} + 2$ | $\Delta_{NACK} + 2$ | MAX($\Delta_{ACK} + 2$, $\Delta_{NACK} + 2$) |
| 2 | Otherwise | $\Delta_{ACK} + 3$ | $\Delta_{NACK} + 3$ | MAX($\Delta_{ACK} + 3$, $\Delta_{NACK} + 3$) |
| 3 | | $\Delta_{ACK} + 3$ | $\Delta_{NACK} + 3$ | MAX($\Delta_{ACK} + 3$, $\Delta_{NACK} + 3$) |

In an embodiment, HARQ-ACK power offset setting schemes may be based on probability of false alarm P_fa=0.1 and performance target Pe_str=1%. Table 27 shows example power offset setting schemes where Secondary_Cell_Active is bigger than 1. HARQ-ACK power offset may be set such that it is bigger than the required max power offset obtained by simulations.

TABLE 27

| Secondary_Cell_Active | Condition | $A_{hs}$ may equal the quantized amplitude ratio translated from HARQ-ACK message sent in one time slot | | |
|---|---|---|---|---|
| | | contains at least one ACK but no NACK | contains at least one NACK but no ACK | contains both ACK and NACK or is a PRE or is a POST |
| 2 | Secondary_Cell_Enabled = 2 and WTRU is not configured in MIMO mode | $\Delta_{ACK} + 2$ | $\Delta_{NACK} + 2$ | MAX($\Delta_{ACK} + 2$, $\Delta_{NACK} + 2$) |
| 2 | Otherwise | $\Delta_{ACK} + 2$ | $\Delta_{NACK} + 2$ | MAX($\Delta_{ACK} + 2$, $\Delta_{NACK} + 2$) |
| 3 | | $\Delta_{ACK} + 3$ | $\Delta_{NACK} + 3$ | MAX($\Delta_{ACK} + 3$, $\Delta_{NACK} + 3$) |

In an embodiment, HARQ-ACK power offset setting schemes may be based on probability of false alarm P_fa=0.1 and performance target Pe_str=1%. Table 28 shows example power offset setting schemes where Secondary_Cell_Active is bigger than 1. For example, HARQ-ACK power offset may be set such that the HARQ-ACK performance may be guaranteed, when the interference level may be increased. HARQ-ACK power offset may be set such that it is close enough to the required max power offset obtained by simulations.

TABLE 28

| Secondary_Cell_Active | Condition | $A_{hs}$ may equal the quantized amplitude ratio translated from HARQ-ACK message sent in one time slot | | |
|---|---|---|---|---|
| | | contains at least one ACK but no NACK | contains at least one NACK but no ACK | contains both ACK and NACK or is a PRE or is a POST |
| 2 | Secondary_Cell_Enabled = 2 and WTRU is not configured in MIMO mode | $\Delta_{ACK} + 1$ | $\Delta_{NACK} + 1$ | MAX($\Delta_{ACK} + 1$, $\Delta_{NACK} + 1$) |
| 2 | Otherwise | $\Delta_{ACK} + 2^*$ | $\Delta_{NACK} + 2^*$ | MAX($\Delta_{ACK} + 2^*$, $\Delta_{NACK} + 2^*$) |
| 3 | | $\Delta_{ACK} + 2$ | $\Delta_{NACK} + 2$ | MAX($\Delta_{ACK} + 2$, $\Delta_{NACK} + 2$) |

Notes:
*denotes that optionally, power offset setting could be +1 instead of +2 to further reduce the interference at cost of performance degradation.

In an embodiment, HARQ-ACK power offset setting schemes may be based on probability of false alarm P_fa=0.1 and performance target Pr_RLC=0.01%. Table 29 shows example power offset setting schemes where Secondary_Cell_Active is bigger than 1. For example, HARQ-ACK power offset may be set such that the HARQ-ACK performance may be guaranteed, when the most power is required. HARQ-ACK power offset may be set such that it may be is bigger than the required max power offset obtained by simulations.

TABLE 29

| Secondary_Cell_Active | Condition | $A_{hs}$ may equal the quantized amplitude ratio translated from HARQ-ACK message sent in one time slot | | |
|---|---|---|---|---|
| | | contains at least one ACK but no NACK | contains at least one NACK but no ACK | contains both ACK and NACK or is a PRE or is a POST |
| 2 | Secondary_Cell_Enabled = 2 and WTRU is not configured in MIMO mode | $\Delta_{ACK}$ + 2 | $\Delta_{NACK}$ + 2 | MAX($\Delta_{ACK}$ + 2, $\Delta_{NACK}$ + 2) |
| 2 | Otherwise | $\Delta_{ACK}$ + 4 | $\Delta_{NACK}$ + 4 | MAX($\Delta_{ACK}$ + 4, $\Delta_{NACK}$ + 4) |
| 3 | | $\Delta_{ACK}$ + 4 | $\Delta_{NACK}$ + 4 | MAX($\Delta_{ACK}$ + 4, $\Delta_{NACK}$ + 4) |

In an embodiment, HARQ-ACK power offset setting schemes may be based on probability of false alarm P_fa=0.1 and performance target Pr_RLC=0.01%. Table 30 shows example power offset setting schemes where Secondary_Cell_Active is bigger than 1. For example, HARQ-ACK power offset may be set such that the HARQ-ACK performance may be guaranteed, when the most power is required. HARQ-ACK power offset may be set such that it may be is bigger than the required max power offset obtained by simulations.

TABLE 30

| Secondary_Cell_Active | Condition | $A_{hs}$ may equal the quantized amplitude ratio translated from HARQ-ACK message sent in one time slot | | |
|---|---|---|---|---|
| | | contains at least one ACK but no NACK | contains at least one NACK but no ACK | contains both ACK and NACK or is a PRE or is a POST |
| 2 | Secondary_Cell_Enabled = 2 and WTRU is not configured in MIMO mode | $\Delta_{ACK}$ + 2 | $\Delta_{NACK}$ + 2 | MAX($\Delta_{ACK}$ + 2, $\Delta_{NACK}$ + 2) |
| 2 | Otherwise | $\Delta_{ACK}$ + 3 | $\Delta_{NACK}$ + 3 | MAX($\Delta_{ACK}$ + 3, $\Delta_{NACK}$ + 3) |
| 3 | | $\Delta_{ACK}$ + 4 | $\Delta_{NACK}$ + 4 | MAX($\Delta_{ACK}$ + 4, $\Delta_{NACK}$ + 4) |

In an embodiment, HARQ-ACK power offset setting schemes may be based on probability of false alarm P_fa=0.1 and performance target Pr_RLC=0.01%. Table 31 shows example power offset setting schemes where Secondary_Cell_Active is bigger than 1. For example, HARQ-ACK power offset may be set such that the HARQ-ACK performance may be guaranteed, when the interference level is increased. HARQ-ACK power offset may be set such that it may be close enough to the required max power offset obtained by simulations.

TABLE 31

| Secondary_Cell_Active | Condition | $A_{hs}$ may equal the quantized amplitude ratio translated from HARQ-ACK message sent in one time slot | | |
|---|---|---|---|---|
| | | contains at least one ACK but no NACK | contains at least one NACK but no ACK | contains both ACK and NACK or is a PRE or is a POST |
| 2 | Secondary_Cell_Enabled = 2 and WTRU is not configured in MIMO mode | $\Delta_{ACK}$ + 2 | $\Delta_{NACK}$ + 2 | MAX($\Delta_{ACK}$ + 2, $\Delta_{NACK}$ + 2) |

TABLE 31-continued

| | | $A_{hs}$ may equal the quantized amplitude ratio translated from HARQ-ACK message sent in one time slot | | |
|---|---|---|---|---|
| Secondary_Cell_Active | Condition | contains at least one ACK but no NACK | contains at least one NACK but no ACK | contains both ACK and NACK or is a PRE or is a POST |
| 2 | Otherwise | $\Delta_{ACK}$ + 3 | $\Delta_{NACK}$ + 3 | MAX($\Delta_{ACK}$ + 3, $\Delta_{NACK}$ + 3) |
| 3 | | $\Delta_{ACK}$ + 3 | $\Delta_{NACK}$ + 3 | MAX($\Delta_{ACK}$ + 3, $\Delta_{NACK}$ + 3) |

For a 4C-HSDPA system where three or four carriers are activated, power offsetting for HS-DPCCH1 and HS-DPCCH2 CQI slot may follow the rules described in Table 31. Power offsetting may depend on the CQI types carried on HS-DPCCH1 and HS-DPCCH2. Power offsetting may be related to the encoding schemes applied to the CQI reporting.

In an embodiment, power offset for HS-DPCCH CQI slot may be determined as follows. The power offset $A_{hs1}$ for HS-DPCCH1 CQI slot may be determined in accordance with the rules described in Table 32. The power offset $A_{hs2}$ for HS-DPCCH2 CQI slot may be determined in accordance with the rules described in Table 32. The greater between the $A_{hs1}$ and $A_{hs2}$ may be used as the power offset $A_{hs}$ for HS-DPCCH CQI slot, e.g., $A_{hs}$=max($A_{hs1}$, $A_{hs2}$). The HS-DPCCH CQI slot may include a concatenation of HS-DPCCH1 and HS-DPCCH2 for SPREADING FACTOR 128, or a superposition of HS-DPCCH1 and HS-DPCCH2 for SF256.

In an embodiment, different power offsets are applied independently to the two feedback channels. For example, the power offset $A_{hs1}$ may be determined and may apply to HS-DPCCH1 PCI/CQI field, and the power offset $A_{hs2}$ may be determined and may apply to HS-DPCCH2 PCI/CQI field.

In an embodiment, the power offset setting may be dynamically adjusted. For example, the use of the rules may be based upon the carrier activation/deactivation. For example, the use of the rules may be based upon the channel coding schemes used for each of cells. The use of the maximum power offset value among the feedback groups/channels as a common setting may keep uniform power setting on the feedback channels.

TABLE 32

| # of activated carriers | # of activated carriers with MIMO configured | CQI type of HS-DPCCH2 CQI slot | Rule applying to HS-DPCCH2 CQI slot | CQI type of HS-DPCCH1 CQI slot | Rule applying to HS-DPCCH1 CQI slot |
|---|---|---|---|---|---|
| 1 | 0 | SC | 3D | SC | 3D |
|   | 1 | SC-MIMO | 1C or 3C | SC-MIMO | 1C or 3C |
| 2 | 0 | DC | 2D | DC | 2D |
|   | 1 | SC SC-MIMO | 1C or 3C | SC SC-MIMO | 1C or 3C |
|   | 2 | SC-MIMO SC-MIMO | 1C or 3C | SC-MIMO SC-MIMO | 1C or 3C |
| 3 | 0 | SC | 3C | DC | 2C |
|   | 1 | SC MIMO | 1C or 3C | DC | 2C |
|   |   | SC | 3C | SC SC-MIMO | 1C or 3C |
|   | 2 | SC | 3C | SC-MIMO SC-MIMO | 1C or 3C |
|   |   | SC-MIMO | 1C or 3C | SC SC-MIMO | 1C or 3C |
|   | 3 | SC-MIMO | 1C or 3C | SC-MIMO SC-MIMO | 1C or 3C |
| 4 | 0 | DC | 2C | DC | 2C |
|   | 1 | DC | 2C | SC SC-MIMO | 1C or 3C |
|   |   | SC SC-MIMO | 1C or 3C | DC | 2C |
|   | 2 | DC | 2C | SC-MIMO SC-MIMO | 1C or 3C |
|   |   | SC SC-MIMO | 1C or 3C | SC SC-MIMO | 1C or 3C |
|   |   | SC-MIMO SC-MIMO | 1C or 3C | DC | 2C |

TABLE 32-continued

| # of activated carriers | # of activated carriers with MIMO configured | CQI | | | |
|---|---|---|---|---|---|
| | | CQI type of HS-DPCCH2 CQI slot | Rule applying to HS-DPCCH2 CQI slot | CQI type of HS-DPCCH1 CQI slot | Rule applying to HS-DPCCH1 CQI slot |
| | 3 | SC SC-MIMO | 1C or 3C | SC-MIMO SC-MIMO | 1C or 3C |
| | | SC-MIMO SC-MIMO | 1C or 3C | SC SC-MIMO | 1C or 3C |
| | 4 | SC-MIMO SC-MIMO | 1C or 3C | SC-MIMO SC-MIMO | 1C or 3C |

For example, power offset may be determined independently for each serving cell. Power offset may be determined independently for in a feedback group or in a feedback channel. In Table 32, a table cell containing two CQI types may indicate that the power offset for CQI/PCI reports may be determined separately for each of the two serving cells in the feedback group. For example, a table cell containing "1C or 3C" may indicate that that rule 1C may be applied to a CQI report of Type A, and rule 3C may applied to a CQI report of either Type B if the cell is configured in MIMO mode, or a regular CQI type if the cell is not configured in MIMO mode.

In Table 32, rules 1C, 2C, and 3C are described in Table 33, and rules 1D, 2D, and 3D are described in Table 34. Rules 1D, 2D, and 3D may be applied when less than three carriers are active, repeated transmission is performed on the second feedback channel.

For example, the rules in Table 34 may be used when the WTRU is configured to repeat the PCI/CQI over the two slots of the HS-DPCCH. For example, when the WTRU has one or two activated cells, or zero or one secondary serving HS-DSCH cell, the PCI/CQI report may be repeated over the two slots. In an embodiment, the power offset may be reduced, for example, by 1 step down in the table to compensate for the use of repetition that may require less transmission power from the WTRU side.

TABLE 33

| Rule | Cases applied to | Description |
|---|---|---|
| Rule 1C | MIMO dual stream SC WTRUs, MIMO dual stream DC WTRUs (for example whenever type A CQI is transmitted) | $A_{hs}$ may equal the quantized amplitude ratio translated from the signalled value $\Delta_{CQI}$ + 1 |
| Rule 2C | non-MIMO DC WTRUs | $A_{hs}$ may equal the quantized amplitude ratio translated from the signaled value $\Delta_{CQI}$ + 1 |
| Rule 3C | non-MIMO SC WTRUs, MIMO single stream SC WTRUs, MIMO single stream DC WTRUs. | $A_{hs}$ may equal the quantized amplitude ratio translated from the signaled value $\Delta_{CQI}$ |

TABLE 34

| Rule | Cases applied to | Description |
|---|---|---|
| Rule 1D | MIMO dual stream SC UEs, MIMO dual stream DC UEs (for example whenever type A CQI is transmitted) | $A_{hs}$ may equal the quantized amplitude ratio translated from the signalled value $\Delta_{CQI}$ |
| Rule 2D | non-MIMO DC UEs | $A_{hs}$ may equal the quantized amplitude ratio translated from the signaled value $\Delta_{CQI}$ |
| Rule 3D | non-MIMO SC UEs, MIMO single stream SC UEs, MIMO single stream DC UEs. | $A_{hs}$ may equal the quantized amplitude ratio translated from the signaled value $\Delta_{CQI}$ − 1 |

Rules 1D, 2D, and 3D may be derived by adjusting a fixed amount of power (for example reducing 3 dB) from the $A_{hs}$ after it is calculated from 1C, 2C, 3C respectively in Table 33 with corresponding conditions.

When the WTRU is configured to apply repetition, the rules 1D, 2D and 3D may be implemented by reducing the resulting $A_{hs}$ by X dB, or by a fixed number of steps down from the quantization table. For example, if the WTRU has less than 2 secondary serving HS-DSCH cell active, then $A_{hs}$ may be reduced by a fixed value which could be a fixed X dB (e.g., 3 dB), or by deriving the value from N (e.g., 1 or 2) step(s) down the quantization table.

In an embodiment, more than two cells may be activated. If the WTRU is not configured in MIMO mode in any of the active cells in a feedback channel/group, then the power offset setting for CQI associated with a feedback group that supports two active cells may be calculated according to rule 2C; the power offset setting for CQI associated with a feedback group that supports one active cell may be calculated by rule 3C. If the WTRU is configured in MIMO mode in any one of the cells in a group, the power offset setting for CQI/PCI slot for this group may be calculated according to rule 1C when a CQI of type A is transmitted; the power offset setting for CQI/PCI slot for this group may be calculated by rule 3C when a CQI of type B is transmitted.

In an embodiment, two or less cells may be activated. If the WTRU is not configured in MIMO mode in any of the active cells, the power offset setting for CQI associated with a feedback group that supports two active cells may be calculated according to rule 2D; the power offset setting for CQI associated with a feedback group that supports one active cell may be calculated according to calculated by rule 3D. If the WTRU is configured in MIMO mode in any one of the cells then the power offset setting for CQI/PCI slot for this group may be calculated according to rule 1D when a CQI of type A is transmitted; the power offset setting for CQI/PCI slot for this group may be calculated according to rule 3D when a CQI of type B is transmitted.

Table 35 illustrates an example implementation of the CQI power offset setting.

TABLE 35

| # of activated carriers | # of activated carriers with MIMO configured | CQI type of HS-DPCCH2 CQI slot | Rule applying to HS-DPCCH2 CQI slot | CQI type of HS-DPCCH1 CQI slot | Rule applying to HS-DPCCH1 CQI slot |
|---|---|---|---|---|---|
| 1 | 0 | SC | 3D | SC | 3D |
|  | 1 | SC-MIMO | 1C or 3C | SC-MIMO | 1C or 3C |
| 2 | 0 | DC | 2D | DC | 2D |
|  | 1 | SC | 1C or 3C | SC | 1C or 3C |
|  |  | SC-MIMO |  | SC-MIMO |  |
|  | 2 | SC-MIMO | 1C or 3C | SC-MIMO | 1C or 3C |
|  |  | SC-MIMO |  | SC-MIMO |  |
| 3 | 0 | SC | 3C | DC | 2C |
|  | 1 | SC MIMO | 1C or 3C | SC | 3C |
|  |  |  |  | SC |  |
|  |  | SC | 3C | SC | 1C or 3C |
|  |  |  |  | SC-MIMO |  |
|  | 2 | SC | 3C | SC-MIMO | 1C or 3C |
|  |  |  |  | SC-MIMO |  |
|  |  | SC-MIMO | 1C or 3C | SC | 1C or 3C |
|  |  |  |  | SC-MIMO |  |
|  | 3 | SC-MIMO | 1C or 3C | SC-MIMO | 1C or 3C |
|  |  |  |  | SC-MIMO |  |
| 4 | 0 | DC | 2C | DC | 2C |
|  | 1 | DC | 2C | SC | 1C or 3C |
|  |  |  |  | SC-MIMO |  |
|  |  | SC | 1C or 3C | SC | 3C |
|  |  | SC-MIMO |  | SC |  |
|  | 2 | DC | 2C | SC-MIMO | 1C or 3C |
|  |  |  |  | SC-MIMO |  |
|  |  | SC | 1C or 3C | SC | 1C or 3C |
|  |  | SC-MIMO |  | SC-MIMO |  |
|  |  | SC-MIMO | 1C or 3C | SC | 3C |
|  |  | SC-MIMO |  | SC |  |
|  | 3 | SC | 1C or 3C | SC-MIMO | 1C or 3C |
|  |  | SC-MIMO |  | SC-MIMO |  |
|  |  | SC-MIMO | 1C or 3C | SC | 1C or 3C |
|  |  | SC-MIMO |  | SC-MIMO |  |
|  | 4 | SC-MIMO | 1C or 3C | SC-MIMO | 1C or 3C |
|  |  | SC-MIMO |  | SC-MIMO |  |

A cell containing two CQI types in Table 35 may indicate that the CQI/PCI reports may be encoded and transmitted separately for each of the two cells. For example, a cell containing "1C or 3C" may indicate that rule 1C may be applied to a CQI report of Type A, and rule 3C may be applied to a CQI report of Type B if the cell is configured in MIMO mode, or a regular CQI type if the cell is not configured in MIMO mode.

For example, more than two cells may be activated. If the WTRU is not configured in MIMO mode in any of the active cells, the power offset setting for CQI associated with a feedback group that supports two active cells may be calculated according to rule 2C; the power offset setting for CQI associated with a feedback group that supports one active cell may be calculated according to rule 3C. If the WTRU is configured in MIMO mode in any one of the cells in a group then the power offset setting for CQI/PCI slot for this group may be calculated according to rule 1C when a CQI of type A is transmitted; the power offset setting for CQI/PCI slot for this group may be calculated according to rule 3C when a CQI of type B is transmitted.

For example, two or less cells may be activated. If the WTRU is not configured in MIMO mode in any of the active cells, then the power offset setting for CQI associated with a feedback group that supports two active cells may be calculated according to rule 2D; the power offset setting for HARQ-ACK associated with a feedback group that supports one active cell may be calculated according to rule 3D. If the WTRU is configured in MIMO mode in any one of the cells, then the power offset setting for CQI/PCI slot for this group may be calculated according to rule 1D when a CQI of type A is transmitted; the power offset setting for CQI/PCI slot for this group may be calculated according to rule 3D when a CQI of type B is transmitted.

Table 36 illustrates an example implementation of the CQI power offset setting. The CQI/PCI reports for the cells may be individually encoded and transmitted in a TDM fashion when more than two carriers are activated.

TABLE 36

| # of activated carriers | # of activated carriers with MIMO configured | CQI type of HS-DPCCH2 CQI slot | Rule applying to HS-DPCCH2 CQI slot | CQI type of HS-DPCCH1 CQI slot | Rule applying to HS-DPCCH1 CQI slot |
|---|---|---|---|---|---|
| 1 | 0 | SC | 3D | SC | 3D |
|  | 1 | SC-MIMO | 1C or 3C | SC-MIMO | 1C or 3C |

TABLE 36-continued

| # of activated carriers | # of activated carriers with MIMO configured | CQI type of HS-DPCCH2 CQI slot | Rule applying to HS-DPCCH2 CQI slot | CQI type of HS-DPCCH1 CQI slot | Rule applying to HS-DPCCH1 CQI slot |
|---|---|---|---|---|---|
| 2 | 0 | DC | 2D | DC | 2D |
|   | 1 | SC | 1C or 3C | SC | 1C or 3C |
|   |   | SC-MIMO |  | SC-MIMO |  |
|   | 2 | SC-MIMO | 1C or 3C | SC-MIMO | 1C or 3C |
|   |   | SC-MIMO |  | SC-MIMO |  |
| 3 | 0 | SC | 3C | SC | 3C |
|   |   |  |  | SC |  |
|   | 1 | SC MIMO | 1C or 3C | SC | 3C |
|   |   |  |  | SC |  |
|   |   | SC | 3C | SC | 1C or 3C |
|   |   |  |  | SC-MIMO |  |
|   | 2 | SC | 3C | SC-MIMO | 1C or 3C |
|   |   |  |  | SC-MIMO |  |
|   |   | SC-MIMO | 1C or 3C | SC | 1C or 3C |
|   |   |  |  | SC-MIMO |  |
|   | 3 | SC-MIMO | 1C or 3C | SC-MIMO | 1C or 3C |
|   |   |  |  | SC-MIMO |  |
| 4 | 0 | DC | 2C | SC | 3C |
|   |   |  |  | SC |  |
|   | 1 | DC | 2C | SC | 1C or 3C |
|   |   |  |  | SC-MIMO |  |
|   |   | SC | 1C or 3C | SC | 3C |
|   |   | SC-MIMO |  | SC |  |
|   | 2 | DC | 2C | SC-MIMO | 1C or 3C |
|   |   |  |  | SC-MIMO |  |
|   |   | SC | 1C or 3C | SC | 1C or 3C |
|   |   | SC-MIMO |  | SC-MIMO |  |
|   |   | SC-MIMO | 1C or 3C | SC | 3C |
|   |   | SC-MIMO |  | SC |  |
|   | 3 | SC | 1C or 3C | SC-MIMO | 1C or 3C |
|   |   | SC-MIMO |  | SC-MIMO |  |
|   |   | SC-MIMO | 1C or 3C | SC | 1C or 3C |
|   |   | SC-MIMO |  | SC-MIMO |  |
|   | 4 | SC-MIMO | 1C or 3C | SC-MIMO | 1C or 3C |
|   |   | SC-MIMO |  | SC-MIMO |  |

A cell containing two CQI types in Table 36 may indicate that the CQI/PCI reports may be encoded and transmitted separately for each of the two cells. For example, a cell containing "1C or 3C" may indicate that rule 1C may be applied to a CQI report of Type A, and rule 3C may be applied to a CQI report of Type B if the cell is configured in MIMO mode, or a regular CQI type if the cell is not configured in MIMO mode.

Table 37 illustrates an example implementation of the CQI power offset setting. For example, 3 non-MIMO carriers may be configured.

TABLE 37

| # of activated carriers | # of activated carriers with MIMO configured | CQI type of HS-DPCCH2 CQI slot | Rule applying to HS-DPCCH2 CQI slot | CQI type of HS-DPCCH1 CQI slot | Rule applying to HS-DPCCH1 CQI slot |
|---|---|---|---|---|---|
| 1 | 0 | SC | 3D | SC | 3D |
|   | 1 | SC-MIMO | 1C or 3C | SC-MIMO | 1C or 3C |
| 2 | 0 | DC | 2D | DC | 2D |
|   | 1 | SC | 1C or 3C | SC | 1C or 3C |
|   |   | SC-MIMO |  | SC-MIMO |  |
|   | 2 | SC-MIMO | 1C or 3C | SC-MIMO | 1C or 3C |
|   |   | SC-MIMO |  | SC-MIMO |  |
| 3 | 0 | SC | 3C | DC | 2C |
|   |   | DC | 2C | SC | 3C |
|   | 1 | SC MIMO | 1C or 3C | SC | 3C |
|   |   |  |  | SC |  |
|   |   | SC | 3C | SC | 1C or 3C |
|   |   |  |  | SC-MIMO |  |
|   | 2 | SC | 3C | SC-MIMO | 1C or 3C |
|   |   |  |  | SC-MIMO |  |

TABLE 37-continued

| # of activated carriers | # of activated carriers with MIMO configured | CQI type of HS-DPCCH2 CQI slot | Rule applying to HS-DPCCH2 CQI slot | CQI type of HS-DPCCH1 CQI slot | Rule applying to HS-DPCCH1 CQI slot |
|---|---|---|---|---|---|
| | | SC-MIMO | 1C or 3C | SC<br>SC-MIMO | 1C or 3C |
| | 3 | SC-MIMO | 1C or 3C | SC-MIMO<br>SC-MIMO | 1C or 3C |
| 4 | 0 | SC<br>SC | 3C | SC<br>SC | 3C |
| | 1 | SC<br>SC | 3C | SC<br>SC-MIMO | 1C or 3C |
| | | SC<br>SC-MIMO | 1C or 3C | SC<br>SC | 3C |
| | 2 | SC<br>SC | 3C | SC-MIMO<br>SC-MIMO | 1C or 3C |
| | | SC<br>SC-MIMO | 1C or 3C | SC<br>SC-MIMO | 1C or 3C |
| | | SC-MIMO<br>SC-MIMO | 1C or 3C | SC<br>SC | 3C |
| | 3 | SC<br>SC-MIMO | 1C or 3C | SC-MIMO<br>SC-MIMO | 1C or 3C |
| | | SC-MIMO<br>SC-MIMO | 1C or 3C | SC<br>SC-MIMO | 1C or 3C |
| | 4 | SC-MIMO<br>SC-MIMO | 1C or 3C | SC-MIMO<br>SC-MIMO | 1C or 3C |

The columns showing "CQI type of HS-DPCCH" may relate to the channel coding schemes used to encoding the CQI reports. For example, SC may be related to (20, 5) Reed Muller code, DC may be related to (20,10) code, and SC-MIMO may be related to (20, 10) code for Type A CQI or (20,7) code for Type B CQI reports.

In an embodiment, HS-DPCCH CQI transmission may be on a per carrier basis in 4C-HSDPA with a minimum feedback cycle of 4 ms and different processing gain. For example, spreading factor 256 may be used for 3C without MIMO configured, and spreading factor 128 may be used for the rest configuration in 4C-HSDPA. The HS-DPCCH power offset for HS-DPCCH slots carrying CQI may be determined as shown in Table 38.

TABLE 38

| | | $A_{hs}$ may equal the quantized amplitude ratio translated from | | |
|---|---|---|---|---|
| | | WTRU not configured in MIMO mode in a cell | WTRU configured in MIMO mode in a cell | |
| Secondary_Cell_Active | Condition | | CQI of Type A | CQI of Type B |
| 2 (Note 2) | Secondary_Cell_Enabled = 2 and WTRU is not configured in MIMO mode | $\Delta_{CQI}$ | N/A | N/A |
| 2 (Note 1) | | $\Delta_{CQI} + 1$ | N/A | N/A |
| 2 | Otherwise | $\Delta_{CQI} + 1$ | $\Delta_{CQI} + 2$ | $\Delta_{CQI} + 1$ |
| 3 | | $\Delta_{CQI} + 1$ | $\Delta_{CQI} + 2$ | $\Delta_{CQI} + 1$ |

Note 1:
WTRU may transmit composite CQI report for two cells in a subframe.

Note 2:
WTRU may transmit CQI report for a single serving HS-DSCH cell in a subframe.

For example, if the (primary) HS-DSCH serving cell and the 1st secondary serving HS-DSCH cell are jointly coded by R8 CQI codebook and the composite CQI report for these two cells is in a subframe, then power offset setting in this row may be used for the 2nd secondary serving HS-DSCH cell. Another example is: if the 1st and 2nd secondary serving HS-DSCH cells are jointly coded by R8 CQI codebook and the composite CQI report for these two cells is in a subframe, the power offset setting in this row may be used for the (primary) HS-DSCH serving cell.

To conservatively compensate the loss of processing gain due to SPREADING FACTOR 128, scheme 2 may be implemented by adding 1 to power offset step for the third and fourth rows of scheme 1: the HS-DPCCH power setting for HS-DPCCH slots carrying CQI as shown in Table 39. Table 39 shows Scheme 2: CQI power offset setting.

TABLE 39

| | | $A_{hs}$ may equal the quantized amplitude ratio translated from | | |
|---|---|---|---|---|
| | | WTRU not configured in | WTRU configured in MIMO mode in a cell | |
| Secondary_Cell_Active | Condition | MIMO mode in a cell | CQI of Type A | CQI of Type B |
| 2 (Note 2) | Secondary_Cell_Enabled = 2 and WTRU is not configured in MIMO mode | $\Delta_{CQI}$ | N/A | N/A |
| 2 (Note 1) | | $\Delta_{CQI} + 1$ | N/A | N/A |
| 2 | Otherwise | $\Delta_{CQI} + 2$ | $\Delta_{CQI} + 3$ | $\Delta_{CQI} + 2$ |
| 3 | | $\Delta_{CQI} + 2$ | $\Delta_{CQI} + 3$ | $\Delta_{CQI} + 2$ |

Note 1:
WTRU may transmit composite CQI report for two cells in a subframe.
Note 2:
WTRU may transmit CQI report for a single serving HS-DSCH cell in a subframe.
For example, if the (primary) HS-DSCH serving cell and the 1st secondary serving HS-DSCH cell are jointly coded by R8 CQI codebook and the composite CQI report for these two cells is in a subframe, then power offset setting in this row may be used for the 2nd secondary serving HS-DSCH cell. Another example is: if the 1st and 2nd secondary serving HS-DSCH cells are jointly coded by R8 CQI codebook and the composite CQI report for these two cells is in a subframe, then the power offset setting in this row may be used for the (primary) HS-DSCH serving cell.

In an embodiment, the power offset for CQI/PCI may be performed as follows. For example, more than two cells may be activated. If the WTRU is not configured in MIMO mode in any of the active cells in a group, the power offset setting for CQI for all cells may be calculated according to rule 3C. If the WTRU is configured in MIMO mode in any one of the cells in a group then the power offset setting for CQI/PCI slot for this group may be calculated according to rule 1C when a CQI of type A is transmitted; the power offset setting for CQI/PCI slot for this group may be calculated according to rule 3C when a CQI of type B is transmitted.

For example, two or less cells may be activated. If the WTRU is not configured in MIMO mode in any of the active cells, the power offset setting for CQI associated with a feedback group that supports two active may be calculated according to rule 2D; the power offset setting for CQI associated with a feedback group that supports one active cell may be calculated according to rule 3D. If the WTRU is configured in MIMO mode in any one of the cells, then the power offset setting for CQI/PCI slot for this group may be calculated according to rule 1D when a CQI of type A is transmitted; the power offset setting for CQI/PCI slot for this group is calculated by rule 3D when a CQI of type B is transmitted.

For example, the pair of DL carriers may include the primary carrier. The $A_{hs}$ for HS-DPCCH slots carrying CQI may be determined as follows. When a CQI of type A is transmitted, $A_{hs1}$ may equal the quantized amplitude ratio translated from the signaled value $\Delta_{CQI}+1$. Otherwise, if the WTRU is not configured in MIMO mode and Secondary_Cell_Active is not 0, $A_{hs1}$ may equal the quantized amplitude ratio translated from the signaled value $\Delta_{CQI}+1$. Otherwise, $A_{hs1}$ may equal the quantized amplitude ratio translated from the signaled value $\Delta_{CQI}$.

For the rest of the pair of DL carriers, The $A_{hs}$ for HS-DPCCH slots carrying CQI may be determined as follows. When a CQI of type A is transmitted, $A_{hs2}$ may equal the quantized amplitude ratio translated from the signaled value $\Delta_{CQI}+1$ Otherwise, if the WTRU is not configured in MIMO mode and Secondary_Cell2_Active is not 0 and Secondary_Cell3_Active is not 0, $A_{hs2}$ may equal the quantized amplitude ratio translated from the signaled value $\Delta_{CQI}+1$. Otherwise, $A_{hs2}$ may equal the quantized amplitude ratio translated from the signaled value $\Delta_{CQI}$.

In an embodiment, $A_{hs}$ may equal the greatest of the calculated values $A_{hs1}$ and $A_{hs2}$.

Static spreading factor switching means that the spreading factor of HS-DPCCH is based on the number of the carriers configured. For example, spreading factor 128 may be used when three or four carriers are configured and spreading factor 256 may be used when less than three carries are configured.

If spreading factor 128 is used for all cases of three or four carriers configured, power setting rule when three or four carriers are activated may follow as described above.

For example, two or three carriers may be deactivated. Codeword repetition may be performed before the power offset setting is applied. In an embodiment, the power offset setting rules in Table 19 and Table 32 may be applied, and a 3 dB power reduction may be applied. In an embodiment, the network may signal two sets of power offset values, such as ($\Delta_{ACK}$, $\Delta_{NACK}$, $\Delta_{CQI}$), one set for spreading factor 128, and one set for spreading factor 256. The power offset setting rules described in Table 19 and Table 32 may be applied using the values of ($\Delta_{ACK}$, $\Delta_{NACK}$, $\Delta_{CQI}$) signaled for spreading factor 256.

If spreading factor 256 is used for cases of less than three carriers configured, power setting rule may follow the rules described in Table 19 and Table 32.

In an embodiment, dynamic spreading factor switching may be configured. For example, the spreading factor of HS-DPCCH may be changed based on the number of the activated carriers. For example, spreading factor 128 may be used when three or four carriers are activated and the WTRU may switch to spreading factor 256 when two or three carries are deactivated, for example, using HS-SCCH orders. When spreading factor 128 is used, the power offset setting rules described above may apply. When spreading factor 256 is used, the rules described in Table 19 and Table 32 may apply. When spreading factor switching happens, a further $\Delta_{SF}$ power boosting or reduction may be used to determine the final value of $A_{hs}$, depending on the switching direction (switching to spreading factor 128 or to spreading factor 256). The value $\Delta_{SF}$ may be signaled by higher layers. The value $\Delta_{SF}$ may be a predetermined or a fixed value, e.g., 3 dB or the like.

In an embodiment, power offset may be determined based on an activation/deactivation order. In a multi-carrier such as MC-HSDPA system, where the WTRU is configured with more than two cells, an HS-SCCH activation/deactivation order may change HS-DPCCH frame format. For example, when the number of active cells is deactivated to two or activated from two to more cells by an HS-SCCH activation/deactivation order, the HS-DPCCH frame format for both HARQ-ACK and CQI/PCI reports may change. The change may be because of the use of the repetition mode. The power offset under the repetition mode in the case of one or two cells are active may be altered accordingly such that the WTRU transmit power usage as described in Table 18 and Table 33 may be optimized.

At the time the change of HS-DPCCH frame format occurs, the WTRU and Node B may be synchronized such that HS-DPCCH may be handled in a consistent manner. For example, when the WTRU receives a correct HS-SCCH order for deactivating to two cells, or to activating from two to more cells, the response of ACK to the order reported in HS-DPCCH is erroneously received by the Node B due to detection error. In this case, the Node B may have difficulty continuing to receive the correct HARQ-ACK and CQI/PCI reports for the active cells because the frame format the Node B uses for decoding may not be in line with what is being used from the transmitter.

To reduce the probability of occurrence of this error event, a boost of transmit power on the signal that carries the ACK response to the activation/deactivation order may be used. For example, boost may be applied to the whole HARQ-ACK slot such that a uniform power setting for the two feedback channels may be maintained. For example, boost may be applied to a first time slot of the sub-frame over which the ACK response is sent.

In an embodiment, power offset for the feedback channel that carries the ACK response to an activation/deactivation order may be set as follows. If the feedback channel supports one cell, $A_{hs}$ may equal the quantized amplitude ratio translated from the signaled value $\Delta_{ACK}+1$ if the corresponding HARQ-ACK message is ACK; $A_{hs}$ may equal the quantized amplitude ratio translated from the signaled value $\Delta_{ACK}+2$ if the corresponding HARQ-ACK message is ACK/ACK; $A_{hs}$ may equal the quantized amplitude ratio translated from the greatest of $(\Delta_{ACK}+2)$ and $(\Delta_{NACK}+1)$ if the corresponding HARQ-ACK message is ACK/NACK, NACK/ACK, PRE before a dual transport block or POST after a dual transport block. Otherwise, if the WTRU is not configured in MIMO mode, $A_{hs}$ may equal the quantized amplitude ratio translated from the signaled value $\Delta_{ACK}+2$ if the corresponding HARQ-ACK message contains at least one ACK but no NACK; $A_{hs}$ may equal the quantized amplitude ratio translated from the greatest of $(\Delta_{ACK}+2)$ and $(\Delta_{NACK}+1)$ if the corresponding HARQ-ACK message contains both ACK and NACK, or is a PRE or a POST. If the WTRU is configured in MIMO mode $A_{hs}$ may equal the quantized amplitude ratio translated from the signaled value $\Delta_{ACK}+2$ if the corresponding HARQ-ACK message contains at least one ACK but no NACK; $A_{hs}$ may equal the quantized amplitude ratio translated from the greatest of $(\Delta_{ACK}+2)$ and $(\Delta_{NACK}+1)$ if the corresponding HARQ-ACK message contains both ACK and NACK, or is a PRE or a POST.

In an embodiment, the $A_{hs}$ value for the feedback channel that carries the ACK response to the order may be calculated as described above. The $A_{hs}$ value for the other feedback channel may be calculated. The greater of the two may be the common power offset setting applied to the HARQ-ACK slot.

This approach may apply to the cases of the ACK response to an HS-SCCH activation/deactivation order, or to these orders that results in the transition between 1C/2C to/from 3C/4C.

In an embodiment, power offset for the feedback channel that carries the ACK response to an activation/deactivation order may be set as follows. $A_{hs}$ for ACK response to a deactivation order to two active cells may be determined as follows. If the feedback channel support one cell, $A_{hs}$ may equal the quantized amplitude ratio translated from the signaled value $\Delta_{ACK}+1$ if the corresponding HARQ-ACK message is ACK; $A_{hs}$ may equal the quantized amplitude ratio translated from the signaled value $\Delta_{ACK}+2$ if the corresponding HARQ-ACK message is ACK/ACK; $A_{hs}$ may equal the quantized amplitude ratio translated from the greatest of $(\Delta_{ACK}+2)$ and $(\Delta_{NACK}+1)$ if the corresponding HARQ-ACK message is ACK/NACK, NACK/ACK, PRE before a dual transport block or POST after a dual transport block. Otherwise, if the WTRU is not configured in MIMO mode, $A_{hs}$ may equal the quantized amplitude ratio translated from the signaled value $\Delta_{ACK}+2$ if the corresponding HARQ-ACK message contains at least one ACK but no NACK; $A_{hs}$ may equal the quantized amplitude ratio translated from the greatest of $(\Delta_{ACK}+2)$ and $(\Delta_{NACK}+1)$ if the corresponding HARQ-ACK message contains both ACK and NACK, or is a PRE or a POST. Otherwise, $A_{hs}$ may equal the quantized amplitude ratio translated from the signaled value $\Delta_{ACK}+2$ if the corresponding HARQ-ACK message contains at least one ACK but no NACK; $A_{hs}$ may equal the quantized amplitude ratio translated from the greatest of $(\Delta_{ACK}+2)$ and $(\Delta_{NACK}+1)$ if the corresponding HARQ-ACK message contains both ACK and NACK, or is a PRE or a POST.

$A_{hs}$ for ACK response to an activation order from one or two to more than two active cells may be determined as follows. If the feedback channel support one cell, $A_{hs}$ may equal the quantized amplitude ratio translated from the signalled value $\Delta_{ACK}$ if the corresponding HARQ-ACK message is ACK; $A_{hs}$ may equal the quantized amplitude ratio translated from the signaled value $\Delta_{ACK}+1$ if the corresponding HARQ-ACK message is ACK/ACK; $A_{hs}$ may equal the quantized amplitude ratio translated from the greater of $(\Delta_{ACK}+1)$ and $\Delta_{NACK}$ if the corresponding HARQ-ACK message is ACK/NACK, NACK/ACK, PRE before a dual transport block or POST after a dual transport block. Otherwise, if the WTRU is not configured in MIMO mode, $A_{hs}$ may equal the quantized amplitude ratio translated from the signaled value $\Delta_{ACK}+1$ if the corresponding HARQ-ACK message contains at least one ACK but no NACK; $A_{hs}$ may equal the quantized amplitude ratio translated from the greatest of $(\Delta_{ACK}+1)$ and $\Delta_{NACK}$, if the corresponding HARQ-ACK message contains both ACK and NACK, or is a PRE or a POST. Otherwise, $A_{hs}$ may equal the quantized amplitude ratio translated from the signaled value $\Delta_{ACK}+1$ if the corresponding HARQ-ACK message contains at least one ACK but no NACK; $A_{hs}$ may equal the quantized amplitude ratio translated from the greatest of $(\Delta_{ACK}+1)$ and $\Delta_{NACK}$ if the corresponding HARQ-ACK message contains both ACK and NACK, or is a PRE or a POST.

For the other ACK responses to an activation/deactivation order, the value $A_{hs}$ may be calculated without power boost.

In an embodiment, $A_{hs}$ for the feedback channel that carries the ACK response to the order may be calculated as described above. The $A_{hs}$ for the other feedback channel may be calculated. The greater of the two may be the common power offset setting applied to the HARQ-ACK slot.

For example, when the ACK response to an HS-SCCH activation/deactivation order or to orders that results in the transition between 1C/2C to/from 3C/4C, the same rules may be applied to calculate power offset setting for the feedback channels. A constant or predetermined power boost (for example, 2 dB) may be applied to the resulting scaling factor $A_{hs}$.

In an embodiment, a power boost may be prolonged for a short of period after deactivation order to two active carriers is received. This may mitigate the impact of the error event described in the previous section, as the HS-DPCCH power may be adjusted downwards already in the repetition mode to optimize the transmit power usage at WTRU. The same power offset setting may be maintained as if there was no deactivation for N sub-frames such that the Node B may be able to decode the HS-DPCCH correctly even if applied frame format is wrong in the case of the error event.

Figure 42:
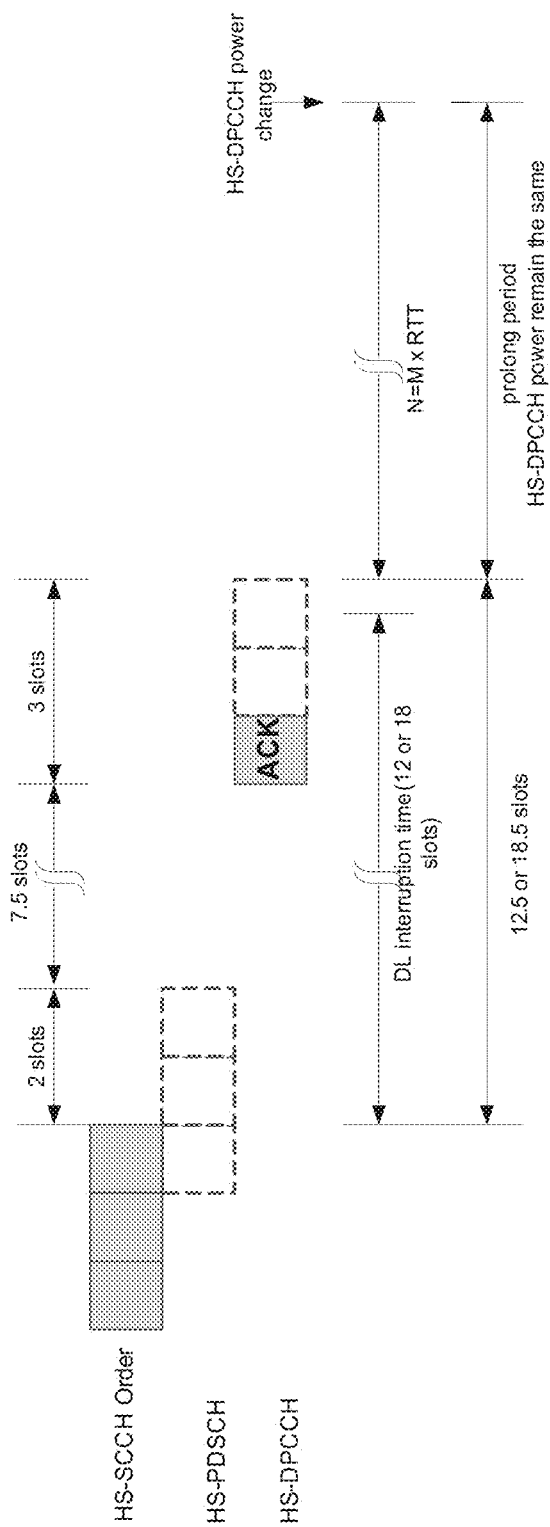
FIG. 42 illustrates a diagram of a prolonged power boost period.

For example, a reference time point may be defined. For example, the reference time could be defined as 12.5 (or 18.5 slots if dual uplink carrier is configured) after receiving the HS-SCCH order. A value N may be chosen as an integer number of round trip time for one reception (RTT expressed in sub-frames): N=M×RRT, targeting to allow Node B to receive the response to M HARQ transmissions. FIG. 42 illustrates a diagram of a prolonged power boost period.

For illustration purposes, $A_{hs,x}$ may denote the quantized amplitude ratio for the HS-DPCCH associated to the feedback channel x, x=1,2. When an HS-DPCCH operates in a dual feedback channel mode, the values for $\Delta_{ACK}$, $\Delta_{NACK}$ and $\Delta_{CQI}$ may be set by higher layers and may be translated to the quantized amplitude ratios $A_{hs,1}$ and $A_{hs,2}$ respectively for the first and second feedback channels/groups.

$A_{hs}$ for HS-DPCCH slots carrying HARQ Acknowledgement and for each feedback channel carrying HARQ Acknowledgement may be determined as follows. If the feedback channel carries HARQ Acknowledgement information for a single HS-DSCH cell, $A_{hs}$ may equal the quantized amplitude ratio translated from the signaled value $\Delta_{ACK}$ if the corresponding HARQ-ACK message is ACK; $A_{hs}$ may equal the quantized amplitude ratio translated from the signaled value $\Delta_{NACK}$ if the corresponding HARQ-ACK message is NACK; $A_{hs}$ may equal the quantized amplitude ratio translated from the greatest of the signaled values $\Delta_{ACK}$ and $\Delta_{NACK}$ if the corresponding HARQ-ACK message is PRE before a single transport block or POST after a single transport block. $A_{hs}$ may equal the quantized amplitude ratio translated from the signaled value $\Delta_{ACK}+1$ if the corresponding HARQ-ACK message is ACK/ACK; $A_{hs}$ may equal the quantized amplitude ratio translated from the signaled value $\Delta_{NACK}+1$ if the corresponding HARQ-ACK message is NACK/NACK; $A_{hs}$ may equal the quantized amplitude ratio translated from the greatest of ($\Delta_{ACK}+1$) and ($\Delta_{NACK}+1$) if the corresponding HARQ-ACK message is ACK/NACK, NACK/ACK, PRE before a dual transport block or POST after a dual transport block. Otherwise, if none of the HS-DSCH cells supported by the feedback channel is configured in MIMO mode, $A_{hs}$ may equal the quantized amplitude ratio translated from the signaled value $\Delta_{ACK}+1$ if the corresponding HARQ-ACK message contains at least one ACK but no NACK; $A_{hs}$ may equal the quantized amplitude ratio translated from the signaled value $\Delta_{NACK}+1$ if the corresponding HARQ-ACK message contains at least one NACK but no ACK; $A_{hs}$ may equal the quantized amplitude ratio translated from the greatest of ($\Delta_{ACK}+1$) and ($\Delta_{NACK}+1$) if the corresponding HARQ-ACK message contains both ACK and NACK, or is a PRE or a POST. Otherwise, $A_{hs}$ may equal the quantized amplitude ratio translated from the signaled value $\Delta_{ACK}+1$ if the corresponding HARQ-ACK message contains at least one ACK but no NACK; $A_{hs}$ may equal the quantized amplitude ratio translated from the signaled value $\Delta_{NACK}+1$ if the corresponding HARQ-ACK message contains at least one NACK but no ACK; $A_{hs}$ may equal the quantized amplitude ratio translated from the greatest of ($\Delta_{ACK}+1$) and ($\Delta_{NACK}+1$) if the corresponding HARQ-ACK message contains both ACK and NACK, or is a PRE or a POST. $A_{hs}$ may equal the quantized amplitude ratio translated from the signaled value $\Delta_{ACK}+2$ if the corresponding HARQ-ACK message contains at least one ACK but no NACK; $A_{hs}$ may equal the quantized amplitude ratio translated from the signaled value $\Delta_{NACK}+2$ if the corresponding HARQ-ACK message contains at least one NACK but no ACK; $A_{hs}$ may equal the quantized amplitude ratio translated from the greatest of $\Delta_{ACK}+2$) and ($\Delta_{NACK}+2$) if the corresponding HARQ-ACK message contains both ACK and NACK, or is a PRE or a POST.

If more than one feedback channel is used and if the translated quantized amplitude ratio is associated to the first feedback channel, $A_{hs,1}$ may equal $A_{hs}$. If more than one feedback channel is used and if the translated quantized amplitude is associated to the second feedback channel, $A_{hs,2}$ may equal $A_{hs}$.

When HS-DPCCH slots carry CQI on each feedback channel, power offset may be determined as follows. When a CQI of type A is transmitted, $A_{hs}$ may equal the quantized amplitude ratio translated from the signaled value $\Delta_{CQI}+1$. Otherwise, if none of the HS-DSCH cells supported by the feedback channel is configured in MIMO mode, $A_{hs}$ may equal the quantized amplitude ratio translated from the signaled value $\Delta_{CQI}+1$. Otherwise, $A_{hs}$ may equal the quantized amplitude ratio translated from the signaled value $\Delta_{CQI}$.

If more than one feedback channel is used and if the translated quantized amplitude ratio is associated to the first feedback channel, $A_{hs,1}$ may equal $A_{hs}$. If more than one feedback channel is used and if the translated quantized amplitude is associated to the second feedback channel, $A_{hs,2}$ may equal $A_{hs}$.

In non-compressed frames, $\beta_{hs,1}$ and $\beta_{hs,2}$, which may be the gain factors for each of individual feedback channels, may be calculated according to $$\beta_{hs,1}=\beta_c \cdot A_{hs,1},$$

$$\beta_{hs,1}=\beta_c \cdot A_{hs,2}$$

where $\beta_c$ value may be signaled by higher layers or calculated, if at least one DPDCH is configured. In case no DPDCH is configured, $\beta_c$ value may be set as described in subclause 5.1.2.5C of 3GPP TS 25.214.

The greater of $A_{hs,1}$ and $A_{hs,2}$ may be applied to calculate the gain factor common for both feedback channels. In non-compressed frames $\beta_{hs}$, which may denote a gain factor that may be calculated according to $$\beta_{hs}=\beta_c \cdot A_{hs},$$

where $A_{hs}$ may be the greater of $A_{hs,1}$ and $A_{hs,1}$ obtained from the two feedback channels, and $\beta_c$ value may be signaled by higher-layer or calculated if at least one DPDCH is configured. In case no DPDCH is configured, $\beta_c$ value may be set as described in subclause 5.1.2.5C of 3GPP TS 25.214.

In an embodiment, the common power offset setting to the HARQ-ACK slot for both feedback channels while keeping separate power settings for CQI/PCI slots for different feedback channels. For example, $A_{hs,1}$ and $A_{hs,2}$ may be individually calculated according to the rules described in the above for the HARQ-ACK feedback. The greater of the two may be selected as the power offset setting $A_{hs}$ for the HARQ-ACK slot. For HS-DPCCH slots allocated to CQI/PCI, the $A_{hs,1}$ and $A_{hs,2}$ may be individually calculated according to the rules described above for the CQI/PCI feedback. The $A_{hs,1}$ and $A_{hs,2}$ may be individually applied to the HS-DPCCH slots allocated to the first and second feedback channels respectively.

When carrier activation status changes, e.g., some carriers or cells are activated or deactivated by an HS-SCCH activation/deactivation order, the power offset setting for each of the HS-DPCCH slots may be recalculated. For example, the number of cells in a feedback channel may be reduced or increased, which may lead to change of the coding schemes being used. Allowing different power settings for each of the feedback channels for CQI reporting may require for dynamic update of the $A_{hs}$, on a per time slot basis.

In an embodiment, $A_{hs,1}$ and $A_{hs,2}$ may be calculated for every time slot, and the maximum value at the WTRU may be identified if the time slot is allocated for HARQ-ACK transmission. In an embodiment, a set of the possible power setting values may be pre-calculated based on the carrier activation status. The pre-calculated values may be stored in a table upon the time the WTRU receives the activation/deactivation order. The set of values is dynamically applied to each time slot via table lookup method in the following sub-frames according to HS-SCCH slot status. The timing for the pre-calculation may the 12 slots, or 18 slots for dual uplink carriers, of interval right after the HS-SCCH activation/deactivation order is delivered to WTRU, during which no downlink transmission activation is assumed.

Feedback fields and or channel slots may be associated with downlink carriers. The WTRU may be configured by the network via RRC signaling with two or three secondary serving HS-DSCH cells. For illustration purposes, the serving HS-DSCH cell may be denoted as Cell1. The secondary serving HS-DSCH cells are labeled according to the position of the associated information element in the RRC message. For example, the first secondary serving HS-DSCH cell configured in the RRC message is labeled Cell2, and the second and third secondary serving HS-DSCH cells configured are labeled Cell3 and Cell4, respectively.

For illustration purposes, the feedback channel slot for the HARQ-ACK fields may be denoted as $F_{fc,n}$ where fc=1,2 is the feedback channel index and n=1,2 is the index of the HARQ-ACK field within the feedback channel. For example, when the secondary serving HS-DSCH cell is active and the WTRU is configured in MIMO mode, there may be two feedback slots for the HARQ-ACK field. The first slot, denoted by index n=1, may be associated with the serving HS-DSCH cell. The second slot may be associated with the secondary serving HS-DSCH cell that may be denoted by index n=2. When one secondary serving HS-DSCH cell is active and the WTRU is configured in MIMO, the feedback channel slot for the serving HS-DSCH cell may be denoted by $F_{1,1}$ and the feedback channel slot for the secondary serving HS-DSCH may be denoted by $F_{1,2}$.

In an embodiment, the association between the configured HS-DSCH cells and the feedback channel slot may be based on the configuration order of the HS-DSCH cells in the RRC message as illustrated in Table 40.

TABLE 40

| Feedback channel slot | Associated HS-DSCH cell |
|---|---|
| $F_{1,1}$ | Cell1 |
| $F_{1,2}$ | Cell2 |
| $F_{2,1}$ | Cell3 |
| $F_{2,2}$ | Cell4 |

In an embodiment, the association may be fixed regardless of the activation/deactivation status of each individual secondary HS-DSCH cell. In an embodiment, the association may be dynamic and depend on the activation/deactivation status of each HS-DSCH cell. For example, the association may depend on the configuration order, such that the entries for the deactivated HS-DSCH cell may be removed from the list while keeping the configuration order. Table 41 shows example associations when one HS-DSCH cell is deactivated.

TABLE 41

| | Associated HS-DSCH cell | | |
|---|---|---|---|
| Feedback channel slot | Cell2 deactivated | Cell3 deactivated | Cell4 deactivated |
| $F_{1,1}$ | Cell1 | Cell1 | Cell1 |
| $F_{1,2}$ | Cell3 | Cell2 | Cell2 |
| $F_{2,1}$ | Cell4 | Cell4 | Cell3 |
| $F_{2,2}$ | — | — | — |

Table 42 shows example associations when two carriers or HS-DSCH cells are deactivated.

TABLE 42

| | Associated HS-DSCH cell | | |
|---|---|---|---|
| Feedback channel slot | Cell2, Cell3 deactivated | Cell2, Cell4 deactivated | Cell3, Cell4 deactivated |
| $F_{1,1}$ | Cell1 | Cell1 | Cell1 |
| $F_{1,2}$ | Cell4 | Cell3 | Cell2 |
| $F_{2,1}$ | — | — | — |
| $F_{2,2}$ | — | — | — |

When two secondary serving HS-DSCH cells are configured, Cell1, Cell2 and Cell3 may be associated with feedback channel slots. Table 43 shows example associations when two secondary serving HS-DSCH cells are configured.

TABLE 43

| | Associated HS-DSCH cell | | |
|---|---|---|---|
| Feedback channel slot | No carrier deactivated | Cell2 deactivated | Cell3 deactivated |
| $F_{1,1}$ | Cell1 | Cell1 | Cell1 |
| $F_{1,2}$ | Cell2 | Cell3 | Cell2 |
| $F_{2,1}$ | Cell3 | — | — |
| $F_{2,2}$ | — | — | — |

In an embodiment, CQI reports may be generated and transmitted based on a CQI transmission pattern on a per transmission time interval (TTI) basis. For example, CQI reports may be generated and transmitted according to the CQI feedback cycle parameter, k, and CQI repetition factor parameter, N_cqi_transmit. The CQI feedback cycle parameter, k and repetition factor parameter, N_cqi_transmit may be configured from higher layers in the WTRU and the Node B.

In an embodiment, the CQI feedback cycle may be configured carrier-specific. The CQI feedback cycle for each of the carriers may be configured independently with different CQI repetition factors. Independent configuration may provide flexibility for specific performance optimization that may be performed on each individual carrier. For example, separate parameters may be configured for each secondary carrier. Denote $k_1$, $k_2$, $k_3$ as the CQI feedback cycle parameter for each respective carrier. Denote N_cqi_transmit_1, N_cqi_transmit_2, N_cqi_transmit_3 as the CQI repetition factor parameter for each respective carrier. The parameters may be configured from higher layers in the WTRU and the Node B.

The carriers may be grouped into pairs. For each pair of carriers that share the same feedback channel, the CQI/PCI feedback may be transmitted with a constant time offset between the two carriers that may equal to the number of TTIs represented by the repetition factor of the first carrier. To illustrate, denote k, N_cqi_transmit, as the parameter setting for the first carrier in the pair, and $k_1$, N_cqi_transmit_1 for the second carrier in the pair. The following formulas may be applied to determine the CQI transmission pattern. CQI/PCI for the first carrier in the group may be transmitted in the sub-frame that may satisfy the following formula:

$$(5 \times CFN + [m \times 256 chip / 7680 chip]) \bmod k' = 0 \text{ with } k' = k/(2 \text{ ms}), \quad \text{Equation (1).}$$

The same CQI/PCI information may be repeated for the next N_cqi_transmit−1 consecutive sub-frames. CQI/PCI for the second carrier in the group may be transmitted in the sub-frame that satisfies the following formula:

$$(5 \times CFN + [m \times 256 chip / 7680 chip]) \bmod k_1' = N\_cqi\_transmit \text{ with } k_1' = k_1/(2 \text{ ms}), \quad \text{Equation (2).}$$

The same CQI/PCI information may be repeated for the next N_cqi_transmit_1−1 consecutive sub-frames.

The following constraint may be imposed on the configuration parameters:

$$\min(k', k_1') \geq (N\_cqi\_transmit + N\_cqi\_transmit\_1), \quad \text{Equation (3)}$$

and $\max(k, k_1)$ is required to be divisible by $\min(k, k_1)$. This may avoid overlap between the CQI/PCI information from the two carriers due to different CQI feedback cycle settings.

The transmission of CQI/PCI in two feedback channels may be made independently according to the rules described in the above, with the use of different feedback cycle and repetition factor parameters specified for each carrier. Because both the WTRU and the eNode B follow the same rule to calculate the location of the CQI/PCI in the transmission, the carrier association to the CQI/PCI information may be uniquely identified.

Figure 43:
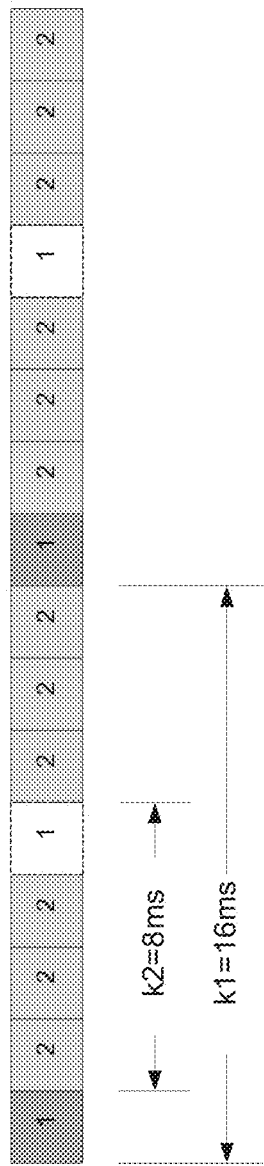
FIG. 43 shows an example carrier specific feedback cycle for one pair of carriers.

FIG. 43 shows an example carrier specific feedback cycle for one pair of carriers. Each block may represent the CQI/PCI information sent in one sub-frame. The parameters used may include k=8 ms, $k_1$=16 ms, N_cqi_transmit=1, and N_cqi_transmit_1=3. The dashed block in FIG. 43 may represent CQI/PCI for the first carrier may not be transmitted due to the longer feedback cycle.

In case of 3 carriers, one feedback channel may contain the information for one carrier. The other feedback channel that supports two carriers may be handled as described above with respect to a feedback channel containing information for two carriers.

In an example, the WTRU may not be configured in MIMO mode. With the exception of the provisions of subclause 6A.3 in 3GPP 25.214 v9.0.0, the CQI/PCI may be reported as follows. The WTRU may derive the CQI value for the serving HS-DSCH cell as defined in subclause 6A.2.1 in 3GPP 25.214 v9.0.0. If Secondary_Cell_Active is 1, the WTRU may derive a CQI value(s) for the secondary serving HS-DSCH cell(s) as defined in subclause 6A.2.1 in 3GPP 25.214 v9.0.0. The CQI report may be constructed from the CQI value(s). The CQI values from the serving HS-DSCH and secondary serving HS-DSCH cells may be grouped into two sets.

Each set of CQI may be transmitted through one of two HS-DPCCH feedback channels. In each of the feedback channels, assuming the CQI feedback cycle and repetition factor for the first HS-DSCH cell are k and N_cqi_transmit respectively, and for the second HS-DSCH cell are $k_1$ and N_cqi_transmit_1 respectively. For example, when k=0, the WTRU may not transmit the CQI report. For k>0 when DTX_DRX_STATUS is not TRUE, the WTRU may transmit the CQI report of the first HS-DSCH cell in each subframe that starts m×256 chips after the start of the associated uplink DPCCH frame with m fulfilling:

$$(5 \times CFN + [m \times 256 chip / 7680 chip]) \bmod k' = 0 \text{ with } k' = k/(2 \text{ ms}),$$

where CFN denotes the connection frame number for the associated DPCH and the set of five possible values of m is calculated. For k>0 when DTX_DRX_STATUS is TRUE, the WTRU may transmit the CQI report of the first HS-DSCH cell based on the CQI transmission pattern. The CQI transmission pattern is the set of HS-DPCCH subframes whose HS-DPCCH discontinuous transmission radio frame number CFN_DRX and subframe number S_DRX, verify:

$$((5^* CFN\_DRX - WTRU\_DTX\_DRX\_\text{Offset} + S\_DRX) \bmod k') = 0, \text{ with } k' = k/(2 \text{ ms}).$$

The WTRU may repeat the transmission of the CQI report of the first HS-DSCH cell derived in 1) over the next (N_cqi_transmit−1) consecutive HS-DPCCH sub frames in the slots respectively allocated to the CQI.

For $k_1$=0, the WTRU may not transmit the CQI report. For $k_1$>0 when DTX_DRX_STATUS is not TRUE, the WTRU may transmit the CQI report of the second HS-DSCH cell in each subframe that starts m×256 chips after the start of the associated uplink DPCCH frame with m fulfilling:

$$(5 \times CFN + [m \times 256 chip / 7680 chip]) \bmod k_1' = N\_cqi\_transmit \text{ with } k_1' = k_1/(2 \text{ ms}),$$

where CFN denotes the connection frame number for the associated DPCH and the set of five possible values of m is calculated. For k>0 when DTX_DRX_STATUS is TRUE, the WTRU may transmit the CQI report of the second HS-DSCH cell based on the CQI transmission pattern. The CQI transmission pattern may be the set of HS-DPCCH subframes whose HS-DPCCH discontinuous transmission radio frame number CFN_DRX and subframe number S_DRX, verify:

$$((5^* CFN\_DRX - UE\_DTX\_DRX\_\text{Offset} + S\_DRX) \bmod k_1') = N\_cqi\_transmit, \text{ with } k_1' = k_1/(2 \text{ ms}).$$

The WTRU may repeat the transmission of the CQI report of the second HS-DSCH cell derived in 1) over the next (N_cqi_transmit_1−1) consecutive HS-DPCCH sub frames in the slots respectively allocated to the CQI. The WTRU may not support the cases that do not satisfy $\min(k', k_1') (N\_cqi\_transmit + N\_cqi\_transmit\_1)$.

In an embodiment, the WTRU may not transmit the CQI in other subframes than the scenarios described above.

The CQI reporting procedure for the other feedback channel may follow the same rules as defined above except that the CQI feedback cycle and repetition factor parameters are defined differently as k2, k3, N_cqi_transmit_2, and N_cqi_transmit_3.

CQI/PCI reporting may be implemented as follows when the WTRU is configured in MIMO mode. In an embodiment, CQI feedback cycle may be group-specific. For example, two sets of CQI configuration parameters may be specified for each of the feedback channels, k, N_cqi_transmit for first feedback channel, and k1, N_cqi_transmit_1 for second feedback channel.

When grouping the carriers for mapping their CQI information into the feedback channels, CQI transmission may be performed as follows. For example, the carriers in the same band may share the same feedback channel. For example, MIMO configured carriers may be grouped in a feedback channel and non-MIMO carriers may be grouped in a feedback channel. For example, carries the data with similar quality of service (QoS) requirement may be grouped into the same feedback channel. Various levels of performance requirements among the carriers may be addressed by different CQI configuration parameters assigned to related feedback channel.

For each feedback channel, CQI/PCI reporting rules may be applied independently to the transmission of the CQI/PCI feedback using the parameter set defined for that feedback channel. The repetition of CQIs for the two carriers in the feedback channel may be implemented in different ways. The CQI of the first carrier may be repeated in N_cqi_transmit (or N_cqi_transmit_1) consecutive sub-frames followed by repeating the CQI of the second carrier in next N_cqi_transmit (or N_cqi_transmit_1) sub-frames. For example, the CQIs of the first and second carriers may be repeated for N_cqi_transmitter N_cqi_transmit_1) times. For example, the CQI of the first carrier may be repeated for N sub-frames where N is pre-configured or pre-defined parameter, and the CQI for the secondary carrier may be repeated for N sub-frames. This procedure may continue until the repetition factor is reached.

For example, the WTRU may not be configured in MIMO mode. With the exception of the provisions of subclause 6A.3 in 3GPP 25.214 v9.0.0, the CQI/PCI may be reported as follows when the WTRU is not configured in MIMO mode. The WTRU may derive the CQI value for the serving HS-DSCH cell. If Secondary_Cell_Active is 1, the WTRU may derive CQI value(s) for the secondary serving HS-DSCH cell(s) as defined in subclause 6A.2.1. The CQI report is constructed from the CQI value(s). The CQI values from the serving HS-DSCH and secondary serving HS-DSCH cells may be grouped into two sets. Each set may be transmitted through one of two HS-DPCCH feedback channels.

For the HS-DSCH cells in first feedback channel, for k=0, the WTRU may not transmit the CQI report. For k>0 when DTX_DRX_STATUS is not TRUE, the WTRU may transmit the CQI report of the first HS-DSCH cell in each subframe that starts m×256 chips after the start of the associated uplink DPCCH frame with m fulfilling:

$$(5 \times CFN+[m \times 256chip/7680chip]) \bmod k'=0 \text{ with } k'=k/(2 \text{ ms}),$$

where CFN denotes the connection frame number for the associated DPCH and the set of five possible values of m may be calculated. For k>0 when DTX_DRX_STATUS is TRUE, the WTRU may transmit the CQI report of the first HS-DSCH cell based on the CQI transmission pattern. The CQI transmission pattern may be the set of HS-DPCCH subframes whose HS-DPCCH discontinuous transmission radio frame number CFN_DRX and subframe number S_DRX, verify:

$$((5*CFN_{DRX}\text{-}UE\_DTX\_DRX\_Offset+S\_DRX) \bmod k')=0, \text{ with } k'=k/(2 \text{ ms}).$$

The WTRU may repeat the transmission of the CQI report of the first HS-DSCH cell derived in over the next (N_cqi_transmit−1) consecutive HS-DPCCH sub frames in the slots respectively allocated to the CQI. The WTRU may repeat the transmission of the CQI report of the second HS-DSCH cell derived in over the next N_cqi_transmit consecutive HS-DPCCH sub frames in the slots respectively allocated to the CQI. The WTRU does not support the case of k'<N_cqi_transmit.

The CQI reporting procedure for the other feedback channel may follow the above described except that the CQI feedback cycle and repetition factor parameters may be configured by $k_1$ and N_cqi_transmit_1. The above described may apply to CQI reporting procedure in case the WTRU is configured in MIMO mode.

In an embodiment, one set of CQI configuration parameters may be set for the carriers. CQIs for the two carriers may be repeated in a feedback channel. For example, CQI of the first carrier may be repeated in N_cqi_transmit (or N_cqi_transmit_1) consecutive sub-frames followed by repeating the CQI of the second carrier in next N_cqi_transmit (or N_cqi_transmit_1) sub-frames. For example, the CQIs of the first and second carriers may be repeated for N_cqi_transmit(or N_cqi_transmit_1) times. For example, the CQI of the first carrier may be repeated for N sub-frames, where N is pre-configured or pre-defined parameter. The CQI for the secondary carrier may be repeated for N sub-frames. The repeating may continue until the required repetition factor is reached.

For example, the WTRU may not be configured in MIMO mode. With the exception of the provisions of subclause 6A.3 in 3GPP 25.214 v9.0.0, the CQI/PCI may be reported as follows when the WTRU is not configured in MIMO mode. The WTRU may derive the CQI value for the serving HS-DSCH cell. If Secondary_Cell_Active is 1, the WTRU may derive a CQI value(s) for the secondary serving HS-DSCH cell(s). The CQI report may be constructed from the CQI value(s). The CQI values from the serving HS-DSCH and secondary serving HS-DSCH cells may be grouped into two sets. Each set may be transmitted through one of two HS-DPCCH feedback channels.

In each of feedback channels, for k=0, the WTRU may not transmit the CQI report. For k>0, when DTX_DRX_STATUS is not TRUE, the WTRU may transmit the CQI report of the first HS-DSCH cell in each subframe that starts m×256 chips after the start of the associated uplink DPCCH frame with m fulfilling:

$$(5 \times CFN+[m \times 256chip/7680chip]) \bmod k'=0 \text{ with } k'=k/(2 \text{ ms}),$$

where CFN denotes the connection frame number for the associated DPCH and the set of five possible values of m is calculated. For k>0 when DTX_DRX_STATUS is TRUE, the WTRU may transmit the CQI report of the first HS-DSCH based on the CQI transmission pattern. The CQI transmission pattern may be the set of HS-DPCCH subframes whose HS-DPCCH discontinuous transmission radio frame number CFN_DRX and subframe number S_DRX, verify:

$$((5*CFN_{DRX}\text{-}UE\_DTX\_DRX\_Offset+S\_DRX) \bmod k')=0, \text{ with } k'=k/(2 \text{ ms}).$$

The WTRU may repeat the transmission of the CQI report of the first HS-DSCH cell derived in 1) over the next (N_cqi_transmit−1) consecutive HS-DPCCH sub frames in the slots respectively allocated to the CQI as defined in [1]. The WTRU may repeat the transmission of the CQI report of the second HS-DSCH cell derived in 1) over the next N_cqi_transmit consecutive HS-DPCCH sub frames in the slots respectively allocated to the CQI. The WTRU does not support the case of k'<N_cqi_transmit.

The above described may apply to CQI reporting procedure in case the WTRU is configured in MIMO mode.

In an embodiment, the CQI feedback cycle may span more than one subframe. When the WTRU is configured with the CQI feedback cycle parameter equal to two or greater than two sub-frames (e.g., >=4 ms), the grouped (or paired) CQI may be reported in a time division multiplexing (TDM) fashion. For example, the CQI feedback for each serving HS-DSCH cell may be encoded individually and transmitted in different sub-frames. For example, where the WTRU is not configured in MIMO mode in any of the cells associated and supported by the same feedback channel, the WTRU may have the two CQI reports encoded jointly and transmitted together in one sub-frame. The next sub-frame may not transmit any CQI.

In an embodiment, the CQI reporting slot format may be based on MIMO configuration status of the WTRU. For example, if the WTRU is not configured in MIMO mode, e.g., none of the configured HS-DSCH cells in the multiple carrier operation is configured in MIMO mode, CQI reports from the cells may be grouped in pairs. Each pair of CQI reports may be jointly encoded by a (20,10) Reed Muller code. The resulting codeword may be transmitted in the time slot allocated to the associated feedback group in terms of the CQI feedback cycle and CQI repetition factor parameters configured by the network. When three cells are configured, one pair of CQI reports may be jointly coded and transmitted in the time slot allocated to a feedback group. The CQI report for the third cell may be encoded individually with a (20,5) Reed-Muller code, and may be transmitted in a time slot allocated to another feedback group.

If the WTRU is configured in MIMO mode, e.g., when any of the configured serving HS-DSCH cells in the multiple carrier operation is configured in MIMO mode, CQI/PCI reports for the cells may be encoded individually by (20, 7/10) or (20,5) Reed Muller codes depending on the MIMO configuration status of the associated cells. The resulting codewords may be grouped in pairs in terms of the cells. The paired codewords may be transmitted in a TDM fashion in two different (possibly consecutive) sub-frames in the time slots allocated to the associated feedback group or feedback channel, in terms of the CQI feedback cycle and CQI repetition factor parameters configured by the network.

FIGS. 44-48 show example HS-DPCCH layouts for various carrier configurations. To illustrate, denote C1 as the primary serving HS-DSCH cell, C2, C3, C4 as the first, second, and third secondary serving HS-DCSCH cells, respectively. The examples shown in FIG. 44-48 are implemented with spreading factor 128. The time slots allocated to the two feedback groups may be concatenated with the slot format defined in table 1.

Figures 44, 45:
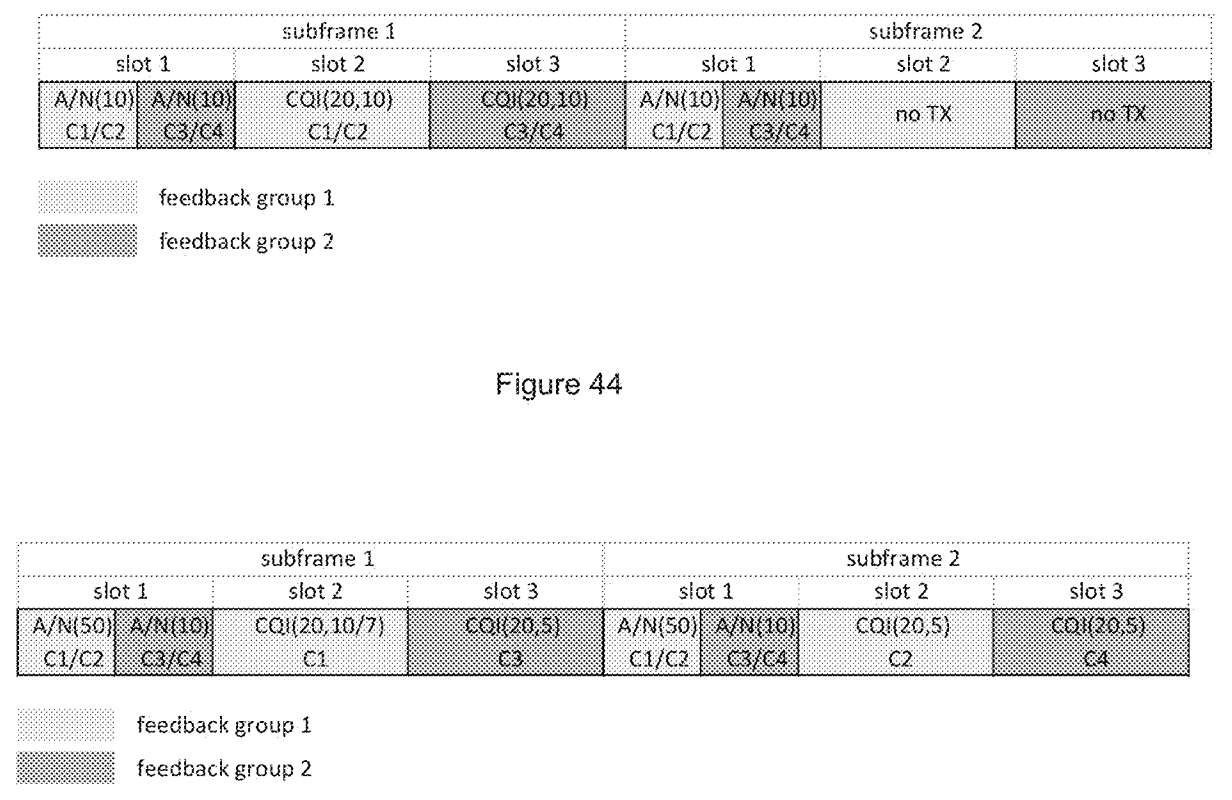

FIG. 44 shows an example of when 4 cells are configured without any being configured in MIMO mode. Slot 2 of sub-frame 1 as shown in light shading may be allocated for the first feedback group. Slot 3 of sub-frame 1 as shown in dark shading may be allocated for the second feedback group. CQI reports for the cells may be jointly encoded. For example, the CQI reports for C1 and C2 are jointly encoded by a (20,10) Reed Muller code to form a common codeword. The C1/C2 codeword may be transmitted in slot 2 of sub-frame 1. The CQI reports for C3 and C4 may be jointly encoded by the same channel coding scheme. The C3/C4 codeword may be transmitted in slot 3 of in the same sub-frame. In an embodiment, the C3/C4 codeword may be transmitted in slot 3 of sub-frame 2 or in other sub-frames in the time slot allocated to the second feedback group.

FIG. 45 illustrates another example of when 4 cells are configured with the primary serving cell being configured in MIMO mode. The WTRU may be considered in MIMO mode. CQI reports for the cells may be encoded individually and may be transmitted in a TDM fashion. The CQI report for C1 may include PCI information. The CQI/PCI report for C1 may be encoded by either (20,10) for type A CQI, or (20,7) code for type B CQI. The CQI reports for the rest of cell are encoded by (20,5) code. The resulting codewords of C1 and C2 may be grouped together and may be transmitted in a TDM manner. For example, codewords of C1 and C2 may be transmitted alternatively in the time slots allocated to the feedback group 1, as marked in light shading in the figure. The resulting codewords of C3 and C4 may be grouped and may be transmitted alternatively in the time slots allocated to the feedback group 2, as marked in dark shading in the figure.

Figure 46:
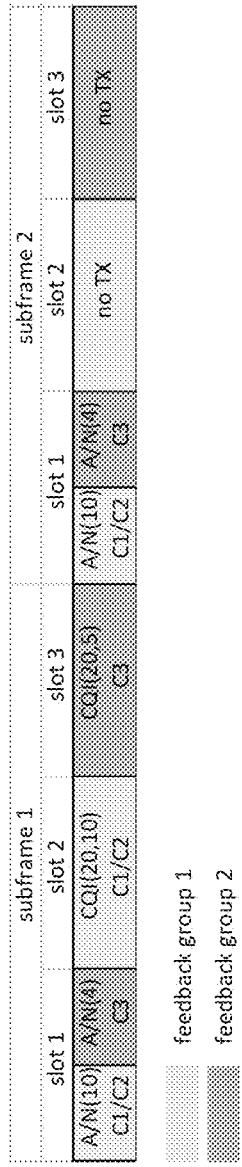
Figure 47:
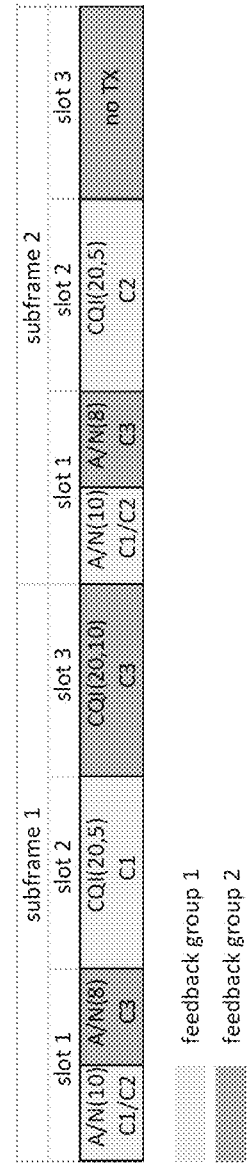
Figure 48:
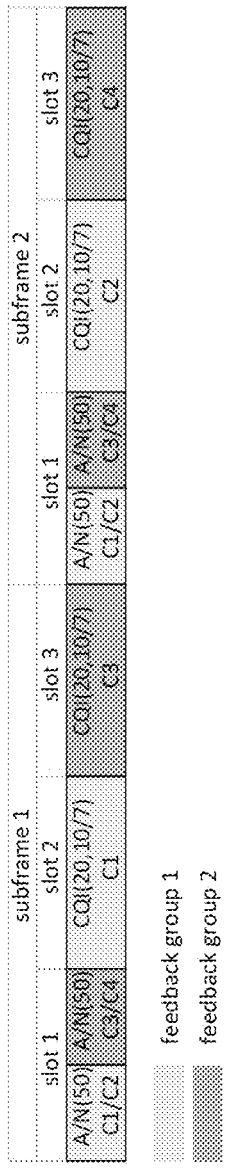

FIG. 46 illustrates an example subframe format when three cells are configured and none of the cells is configured in MIMO mode. FIG. 47 illustrates an example subframe format when three cells are configured and the cell is second secondary cell is configured in MIMO mode. FIG. 48 illustrates an example subframe format when three cells are configured and the three cells are configured in MIMO mode.

In an embodiment, the channel coding for HARQ-ACK may be defined separately for each group. For example, if the WTRU is not configured in MIMO mode in any of cells in a group, the coding for HARQ-ACK associated with the cells that are paired in a group may use the codebook A/N(10) for dual carrier operation. The coding for the HARQ-ACK for the cell that is one in a group may use the codebook A/N(4) for single carrier operation. If the WTRU is configured in MIMO mode in any one of the cells in a group then the coding for HARQ-ACK associated with the cells that are paired in a group uses the codebook A/N(50) used for dual carrier MIMO operation; the coding for HARQ-ACK associated with the cell that is single one in a group may use the codebook A/N(8) used for single carrier MIMO operation.

The channel coding for PCI/CQI for each group is performed as follows. If the WTRU is configured in MIMO mode in any one of the cells, then the coding for the composite PCI/CQI associated with the cell for which the WTRU may use (20,10/7) coding scheme for single carrier MIMO operation; the coding for the CQI associated with the cell for which the WTRU is not configured in MIMO mode may use (20,5) coding scheme for single carrier operation. Otherwise, the coding for CQI associated with the cells that are paired in a group may use (20,10) coding scheme for dual carrier operation; the coding for CQI for the cell that is one in a group is specified may use (20, 5) coding scheme for single carrier operation.

With the exception of the provisions of subclause 6A.3 in 3GPP 25.214 v9.0.0, the CQI/PCI may be reported as follows when the WTRU is not configured in MIMO mode. The WTRU may derive the CQI value for the serving HS-DSCH cell. If Secondary_Cell_Active is 1, the WTRU may derive CQI value(s) for the secondary serving HS-DSCH cell(s). The CQI report is constructed from the CQI value(s).

For k=0, the WTRU may not transmit the CQI report. For k>0 when DTX_DRX_STATUS is not TRUE, the WTRU may transmit the CQI report in each subframe that starts m×256 chips after the start of the associated uplink DPCCH frame with m fulfilling:

$$(5 \times CFN + \lceil m \times 256 chip/7680 chip \rceil) \bmod k' = 0 \text{ with } k' = k/(2 \text{ ms}),$$

where CFN denotes the connection frame number for the associated DPCH and the set of five possible values of m is calculated. For k>0 when DTX_DRX_STATUS is TRUE, the WTRU may transmit the CQI report based on the CQI transmission pattern. The CQI transmission pattern is the set of HS-DPCCH subframes whose HS-DPCCH discontinuous transmission radio frame number CFN_DRX and subframe number S_DRX, verify:

$$((5*CFN\_DRX - UE\_DTX\_DRX\_Offset + S\_DRX) \text{MOD } k')=0, \text{ with } k'=k/(2 \text{ ms}).$$

The WTRU may repeat the transmission of the CQI report derived in over the next (N_cqi_transmit−1) consecutive HS-DPCCH sub frames in the slots respectively allocated to the CQI. WTRU does not support the case of k'<N_cqi_transmit. The WTRU may not transmit the CQI in other subframes.

In an embodiment, composite PCI/CQI reporting may be transmitted when the WTRU is configured in MIMO mode. With the exception of the provisions of subclause 6A.3 in 3GPP 25.214 v9.0.0, the CQI/PCI may be reported as follows when the WTRU is not configured in MIMO mode. The WTRU may derive the PCI value for the serving HS-DSCH cell. When single-stream restriction is not configured, either a type A or a type B CQI value may be reported. When single-stream restriction is configured, type B CQI value for the serving HS-DSCH cell may be reported.

If Secondary_Cell_Active_j is 1, where j may be set to 1, 2, or 3, the WTRU may derive a PCI value for the secondary serving HS-DSCH cell j. When single-stream restriction is not configured, either a type A or a type B CQI value may be reported. When single-stream restriction is configured, type B CQI value for the secondary serving HS-DSCH cell j may be reported.

The WTRU may transmit the composite PCI/CQI value for the serving HS-DSCH cell, and secondary servicing HS_DSCH cell if Secondary_Cell_Active_2 is 1 as follows. For k=0, the WTRU may not transmit a composite PCI/CQI value. For k>0 when DTX_DRX_STATUS is not TRUE (see section 6A.1), the WTRU may transmit a composite PCI/CQI value for the serving HS-DSCH cell in each subframe that starts m×256 chips after the start of the associated uplink DPCCH frame with m fulfilling $$(5 \times CFN + \lceil m \times 256 chip/7680 chip \rceil) \bmod k' = 0 \text{ with } k' = k/(2 \text{ ms}), \quad (x1)$$

where CFN denotes the connection frame number for the associated DPCH and the set of five possible values of m is calculated. When single-stream restriction is not configured and the relation $$\left\lfloor \frac{5 \times CFN + \lceil m \times 256 \text{ chip}/7680 \text{ chip}\rceil}{k'} \right\rfloor \bmod M\_cqi < N\_cqi\_typeA$$

holds, the WTRU may report a type A CQI value. Otherwise the WTRU may report a type B CQI value.

For k>0 when DTX_DRX_STATUS is TRUE, the WTRU may transmit the CQI value for the serving HS-DSCH cell based on the CQI transmission pattern. The CQI transmission pattern is the set of HS-DPCCH subframes whose HS-DPCCH discontinuous transmission radio frame number CFN_DRX and subframe number S_DRX, verify:

$$((5*CFN\_DRX - UE\_DTX\_DRX\_Offset + S\_DRX) \bmod k')=0, \text{ with } k'=k/(2 \text{ ms}).$$

When single-stream restriction is not configured and the relation $$\left\lfloor \frac{5 \times CFN\_DRX - UE\_DTX\_DRX\_Offset + S\_DRX}{k'} \right\rfloor \bmod M\_cqi < N\_cqi\_typeA$$

holds, the WTRU may report a type A CQI value. Otherwise the WTRU may report a type B CQI value.

For k>0, the PCI value derived may be transmitted together with the CQI value as a composite PCI/CQI value. In case that 2560 is not an integer multiple of M_cqi, the sequence of type A and type B CQI reports might not be periodic due to CFN roll-over. The WTRU may repeat the transmission of the composite PCI/CQI value for the serving HS-DSCH cell derived above over the next (N_cqi_transmit−1) consecutive HS-DPCCH sub frames in the slots respectively allocated to CQI. The WTRU may not support the case of k'<N_cqi_transmit. The WTRU may not transmit composite PCI/CQI for the serving HS-DSCH cell in other subframes.

If Secondary_Cell_Active_1 is 1, the WTRU may transmit the composite PCI/CQI value for the secondary serving HS-DSCH cell 1 over the N_cqi_transmit consecutive HS-DPCCH sub frames immediately following the transmission for the serving HS-DSCH cell. If Secondary_Cell_Active_3 is 1, the WTRU may also transmit the composite PCI/CQI value for the secondary serving HS-DSCH cell 3 over the N_cqi_transmit consecutive HS-DPCCH sub frames immediately following the transmission for the secondary serving HS-DSCH cell 2. If any of Secondary_Cell_Enabled_j among j=1, 2, 3 is 1, the WTRU may not support the case of k'<2·N_cqi_transmit.

In an embodiment, the CQI reporting slot format may be based on MIMO configuration status of the feedback group. For example, CQI reports from the serving cells configured for the multiple carrier option may be first paired in feedback groups and CQI reporting format for a particular group depends on MIMO configuration status of the cells in that group.

If none of the configured serving HS-DSCH cells in a feedback group is configured in MIMO mode, the associated CQI reports may be jointly encoded by a (20,10) Reed Muller encoder. The resulting codeword may be transmitted in the time slot allocated to the associated feedback group in terms of the CQI feedback cycle and CQI repetition factor parameters configured by the network.

If any of the configured serving HS-DSCH cells in a feedback group is configured in MIMO mode, CQI/PCI reports for both cells in the group may be encoded individually by (20, 7/10) or (20,5) Reed Muller codes depending on the MIMO configuration status of the associated cells. The resulting codewords may be transmitted in a TDM fashion in two different (e.g. consecutive) sub-frames in the time slots allocated to the associated feedback group, in terms of the CQI feedback cycle and CQI repetition factor parameters configured by the network.

When three cells are configured, the CQI report for the cell that is not grouped may be encoded individually with a (20,5) or (20,10/7) Reed-Muller code and may be transmitted in a time slot allocated to another feedback group solely for this cell.

Figure 49:
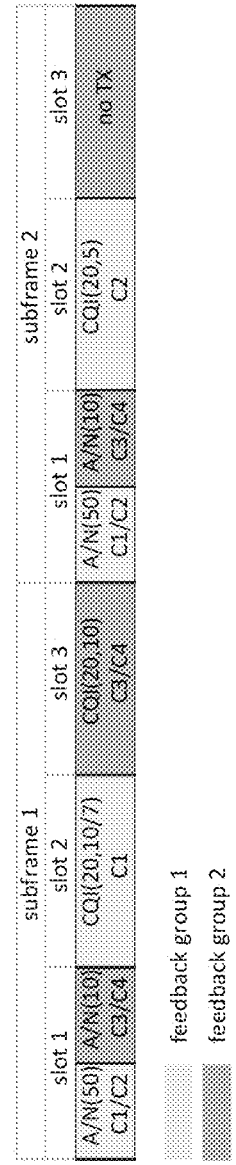
Figure 50:
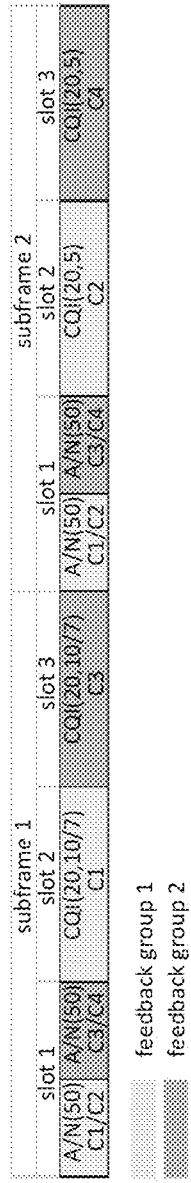
Figure 51:
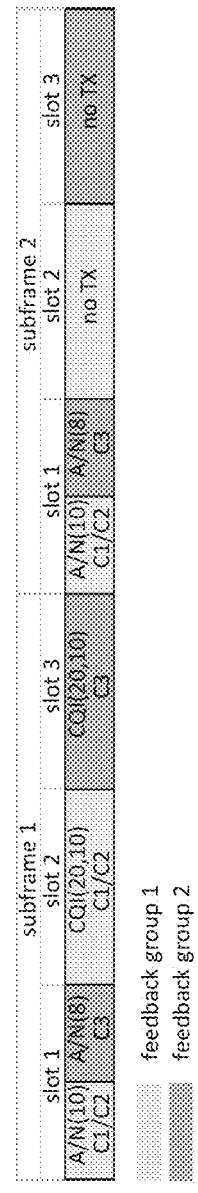

FIGS. 49-51 shows example HS-DPCCH layouts. The example layouts may apply to cases where the spreading factor is set to 128. Two time slots may be available in a sub-frame to carrier the CQI reports for two feedback groups.

FIG. 49 illustrates an example subframe format when four cells are configured and the primary cell is configured in MIMO mode. As shown, CQI for one feedback group may be transmitted in TDM, and the other feedback group may be jointly encoded.

FIG. 50 illustrates an example subframe format when four cells are configured and the primary cell and the second secondary cell are configured in MIMO mode. For example, both feedback groups may include cells with MIMO configured. The CQI reports may be individually encoded and transmitted in TDM.

FIG. 51 illustrates an example subframe format when three cells are configured and the second secondary cell is configured in MIMO mode.

In an embodiment, the CQI reporting format may not depend on any MIMO configuration status of the cells. For example, CQI/PCI reports for the cells may be encoded individually by (20, 7/10) or (20,5) Reed Muller codes depending on the MIMO configuration status of the associated cells. The coded CQI/PCI reports may be paired in feedback groups. The two codewords in a group may be transmitted in a TDM fashion in the time slots allocated for the associated group in different sub-frames. For example, the two codewords may be transmitted in consecutive sub-frames.

In case three cells are configured, the CQI report for the cell that is not grouped may be encoded individually with a (20,5) or (20,10/7) Reed-Muller code and transmitted in a time slot allocated to a feedback group solely for this cell.

Figure 52:
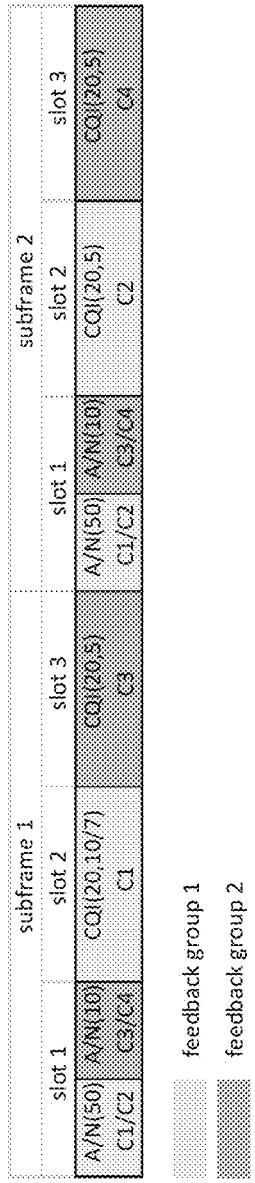
Figure 53:
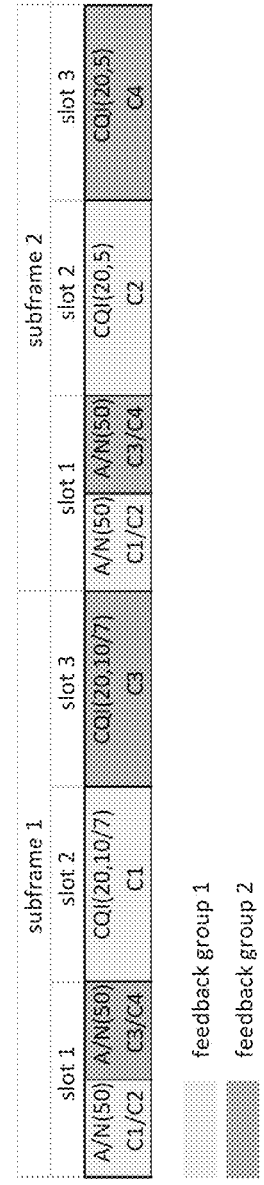
Figure 54:
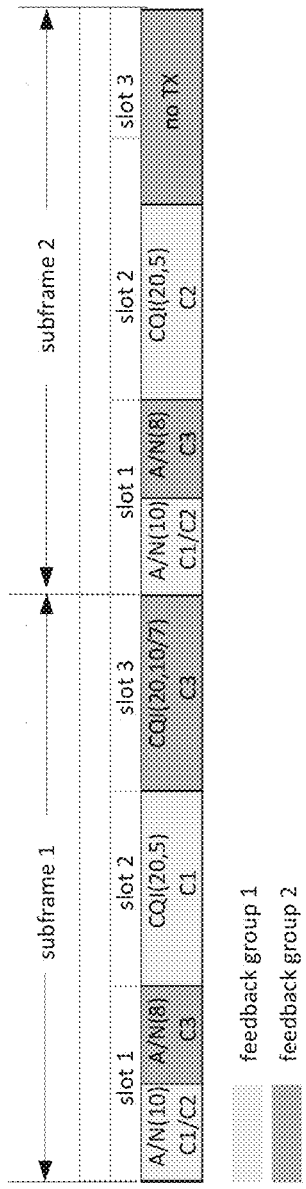

FIGS. 49-51 illustrate example HS-DPCCH layouts. Examples illustrated in FIGS. 52-54 may apply to cases where the spreading factor is 128. Two feedback groups can be mapped in the two slots in a sub-frame for CQI transmission. FIG. 52 illustrates an example subframe format when four cells are configured and the primary cell is configured in MIMO mode. FIG. 53 illustrates an example subframe format when four cells are configured and the primary cell and the second secondary cells are configured in MIMO mode. FIG. 54 illustrates an example subframe format when three cells are configured and the second secondary cell is configured in MIMO mode.

The examples described above are provided for illustration purposes and therefore are not intended to cover an exhaustive list of all possible combinations resulting from different carrier configurations, and for which it is assumed that the related CQI reporting formats are contemplated.

In an embodiment, the feedback reporting may be transmitted during a compressed mode gap. Compressed mode gaps may be used to provide opportunities for measurement (for both uplink and downlink). On the uplink, compressed mode gaps may be defined by the network such that the WTRU may make inter-frequency measurements. During a compressed mode gap, the WTRU may retune the radio frequency (RF) circuit to listen and measure on a different frequency.

In an embodiment, the WTRU may not transmit (DTX) the first slot of the HS-DPCCH (slot carrying the HARQ-ACK) when it overlaps with an uplink transmission gap. When part of the 2 slots allocated to CQI field in the HS-DPCCH overlaps with a compressed mode gap, the WTRU may not transmit the CQI (or composite PCI/CQI information on that subframe).

During compressed mode on the associated DPCH or F-DPCH, the following applies for the WTRU for transmission of HS-DPCCH and/or reception of HS-SCCH and HS-PDSCH. If a part of a HS-DPCCH slot allocated to HARQ-ACK overlaps with an uplink transmission gap on the associated DPCH, the WTRU may use DTX on the HS-DPCCH in that HS-DPCCH slot. If in a HS-DPCCH sub-frame a part of the slots allocated for CQI information overlaps with an uplink transmission gap on the associated DPCH, the WTRU may not transmit CQI or composite PCI/CQI information in that sub-frame.

Figure 55:
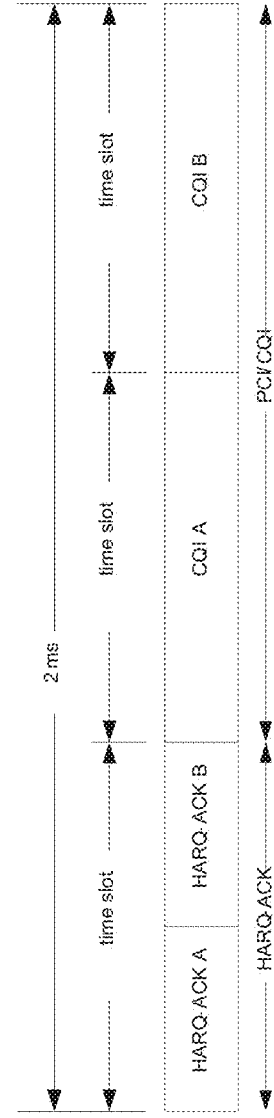

FIG. 55 illustrates example HS-DPCCH structure. For example, the CQI or composite PCI/CQI for each feedback channel may be carried in one slot (e.g., in CQI A or CQI B). In an embodiment, during a compressed mode gap, if part of the uplink gap overlaps part of the slot that carries a single PCI/CQI information report on the HS-DPCCH, the HS-DPCCH over that time slot may not be transmitted (e.g. DTXed). Part of the CQI feedback field may be DTXed when the PCI/CQI is self contained in one slot of the HS-DPCCH. In an embodiment, when there is repetition of the PCI/CQI in the adjacent slot, as the power setting of the CQI field may be adjusted to ensure reliability assuming repetition.

For example, during compressed mode on the associated DPCH or F-DPCH, the following may apply for the WTRU for transmission of HS-DPCCH and reception of HS-SCCH and HS-PDSCH. If the WTRU is configured with less than 2 secondary serving HS-DSCH cells and if in a HS-DPCCH sub-frame a part of the slots allocated for CQI information overlaps with an uplink transmission gap on the associated DPCH, the WTRU may not transmit CQI or composite PCI/CQI information in that sub-frame. If the WTRU is configured with 2 or more secondary serving HS-DSCH cells and if in a HS-DPCCH sub-frame a part of a slot allocated for CQI information overlaps with an uplink transmission gap on the associated DPCH, the WTRU may not transmit carrying CQI or composite PCI/CQI information in that slot.

In an embodiment, the condition may be linked to carrier activation. During compressed mode on the associated DPCH or F-DPCH, the following may apply for the WTRU for transmission of HS-DPCCH and reception of HS-SCCH and HS-PDSCH. If the WTRU has less than 2 secondary serving HS-DSCH cells activated and if in a HS-DPCCH sub-frame a part of the slots allocated for CQI information overlaps with an uplink transmission gap on the associated DPCH, the WTRU may not transmit CQI or composite PCI/CQI information in that sub-frame. If the WTRU has 2 or more secondary serving HS-DSCH cells activated and if in a HS-DPCCH sub-frame a part of a slot allocated for CQI information overlaps with an uplink transmission gap on the associated DPCH, the WTRU may not transmit carrying CQI or composite PCI/CQI information in that slot.

In an embodiment, the PCI/CQI information may be transmitted during the two slots relates to different downlink cells. In the case where the WTRU is repeating the PCI/CQI, the entire PCI/CQI field (e.g. the last two slots of the HS-DPCCH frame format) may be DTXed. This may allow the PCI/CQI to be received with sufficient reliability at the NodeB. For example, during compressed mode on the associated DPCH or F-DPCH, the following applies for the WTRU for transmission of HS-DPCCH and reception of HS-SCCH and HS-PDSCH. If the WTRU has less than 2 secondary serving HS-DSCH cells activated and if in a HS-DPCCH sub-frame a part of the slots allocated for CQI information overlaps with an uplink transmission gap on the associated DPCH, the WTRU may not transmit CQI or composite PCI/CQI information in that sub-frame. If the WTRU has two or more secondary serving HS-DSCH cells activated and if in a HS-DPCCH sub-frame a part of a slot allocated for CQI information overlaps with an uplink transmission gap on the associated DPCH, the WTRU may not transmit carrying CQI or composite PCI/CQI information in that slot.

In an embodiment, when the WTRU is configured with 4 carriers, or when it is configured with 3 carriers with at least one carrier being configured in MIMO mode, the WTRU may transmit CQI individually in each slot of the HS-DPCCH CQI field. During compressed mode on the associated DPCH or F-DPCH, the following may applies for the WTRU for transmission of HS-DPCCH and reception of HS-SCCH and HS-PDSCH. If a part of a HS-DPCCH slot allocated to HARQ-ACK overlaps with an uplink transmission gap on the associated DPCH, the WTRU may use DTX on the HS-DPCCH in that HS-DPCCH slot. If in a HS-DPCCH sub-frame a part of the slots allocated for CQI information overlaps with an uplink transmission gap on the associated DPCH, then if Secondary_Cell_Enable is 3 or Secondary_Cell_Enable is 2 and at least one cell is configured in MIMO mode, and Secondary_Cell_Active is 2 or 3, the WTRU may not transmit CQI or composite PCI/CQI in that slot, otherwise the WTRU may not transmit CQI or composite PCI/CQI information in that sub-frame.

During compressed mode on the associated DPCH or F-DPCH, the following may apply for the WTRU for transmission of HS-DPCCH and reception of HS-SCCH and HS-PDSCH. If a part of a HS-DPCCH slot allocated to HARQ-ACK overlaps with an uplink transmission gap on the associated DPCH, the WTRU may use DTX on the HS-DPCCH in that HS-DPCCH slot.

If in an HS-DPCCH sub-frame, a part of the slots allocated for CQI information overlaps with an uplink transmission gap on the associated DPCH, if the WTRU uses HS-DPCCH slot format 1, and Secondary_Cell_Active is 2 or 3, the WTRU may not transmit CQI or composite PCI/CQI in that slot. Otherwise, the WTRU may not transmit CQI or composite PCI/CQI information in that sub-frame.

When PRE/POST codewords are enabled by the network with HARQ_preamble_mode=1, the Node B may not distinguish ACK/NACKs from DTX (i.e., no transmission of any signals) for the sub-frames after PRE and before POST. The use of the PRE/POST may improve the ACK/NACK detection performance.

In an embodiment, at sub-frame n, if the information received on HS-SCCH is not discarded, the WTRU may transmit PRE at sub-frame n−1, unless an ACK or NACK or any combination of ACK and NACK is to be transmitted in sub-frame n−1. If ACK or NACK or any combination of ACK and NACK is transmitted in sub-frame n, and N_acknack_transmit=1, the WTRU may transmit a POST in sub-frame n+1 unless ACK or NACK or PRE or any combination of ACK and NACK is to be transmitted in this subframe. If ACK or NACK or any combination of ACK and NACK is transmitted in sub-frame n, and N_acknack_transmit>1, the WTRU may transmit a POST in sub-frame n+2×N_acknack_transmit−2 unless ACK or NACK or PRE or any combination of ACK and NACK is to be transmitted in this sub-frame.

In MC-HSDPA, two feedback channels (or two HARQ-ACK messages) may be introduced in one HARQ-ACK slot in a sub-frame to accommodate the need to carry more ACK/NACK information. A DTX codeword, named DCW, may be included in the codebook to avoid half slot transmissions. The true DTX that may transmit no signal in the HARQ-ACK slot, may occur if DTX is reported on both HARQ-ACK message. If one HARQ-ACK message is carrying the DTX state information for the cells support in that feedback channel, the DTX codeword DCW may be sent such that no transmission of signals in the assigned half slot may be avoided.

There may be two parameters that may be related to the PRE/POST transmission, such as HARQ_preamble_mode and N_acknack_transmit. When HARQ_preamble_mode is set to 1 by the network, the WTRU may enter into a mode that allow PRE/POST being transmitted to optimize the ACK/NACK detection performance. N_acknack_transmit may be a parameter that may control the number of sub-frames over which the ACK/NACK messages may be repeated.

In an embodiment, common parameter setting may be used for the cells. Foe example, one set of the above parameters may be configured by the network and all the cells may follow the same settings. The repetition of ACK/NACK information according to N_acknack_transmit may start at the same time (e.g., in the same sub-frame) for both of HARQ-ACK messages. A number of sub-frames may be offset when starting the repetition for different HARQ-ACK messages, or for difference cells.

In an example embodiment, N_acknack_transmit may be configured per pair of cells that are supported in the same feedback channel (or HARQ-ACK message), or it may be configured per cell. This may provide different level of protection on the ACK/NACK transmission.

In an embodiment, transmission of PRE or POST in a feedback channel may be independent from the other feedback channel and may be determined based on the content of the HARQ ACK message sent on this feedback channel across the neighbouring sub-frames. The related rules may be defined as follows.

At sub-frame n, if the information received on HS-SCCH for the cell or the pair of cells that are supported by the same feedback channel is not discarded, the WTRU may transmit PRE on this feedback channel at sub-frame n−1, unless an ACK or NACK or any combination of ACK and NACK is to be transmitted in this feedback channel in sub-frame n−1.

If ACK or NACK or any combination of ACK and NACK is transmitted for the cell or the pair of cells that are supported by the same feedback channel in sub-frame n, and N_acknack_transmit=1, the WTRU may transmit a POST on this feedback channel in sub-frame n+1 unless ACK or NACK or PRE or any combination of ACK and NACK is to be transmitted on this feedback channel in this sub-frame.

If ACK or NACK or any combination of ACK and NACK is transmitted for the cell or the pair of cells that are supported by the same feedback channel in sub-frame n, and N_acknack_transmit>1, the WTRU may transmit a POST on this feedback channel in sub-frame n+2×N_acknack_transmit−2 unless ACK or NACK or PRE or any combination of ACK and NACK is to be transmitted on this feedback channel in this sub-frame.

Figure 56:
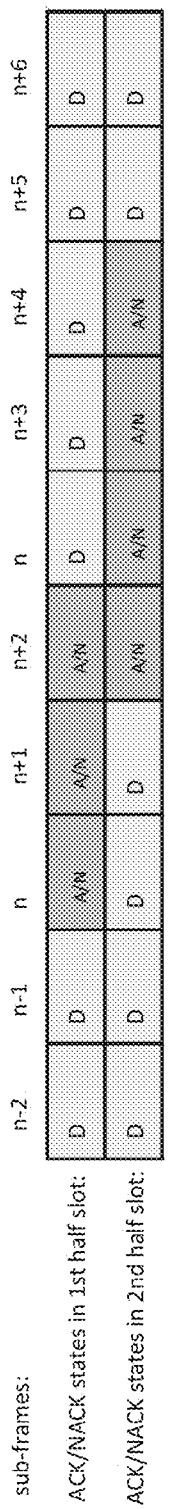
Figure 57:
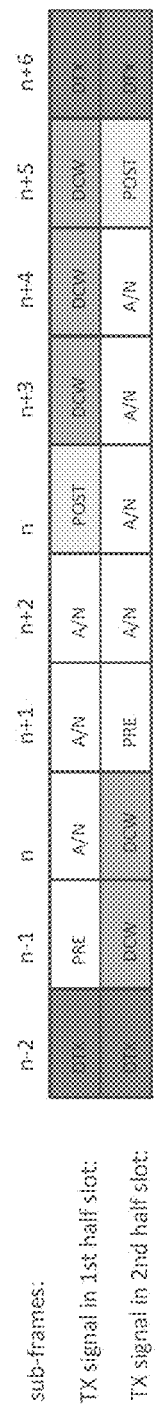

FIG. 56 shows example ACK/NACK information to be reported, and FIG. 57 shows an actual transmitted signal for the example. FIG. 56 illustrates a set of ACK/NACK information that the WTRU may convey to the Node B over a series of sub-frames. The actual transmitted signal is generated in FIG. 57. From the multiple PREs and POST, the Node B may determine over which sub-frames detection of true DTX is not required. As shown in FIG. 57, detection of true DTX may not be required from sub-frame n to n+4.

FIG. 58 shows another example of ACK/NACK information to be reported, and FIG. 59 shows an actual transmitted signal for this example. FIG. 58 illustrates a set of ACK/NACK information that the WTRU may convey to the Node B over a series of sub-frames. The Node B may make a judgment over which sub-frames of the detection of true DTX can be avoided.

In an embodiment, the transmission of PRE or POST may be determined jointly according to the ACK/NACK information on the feedback channels across the neighbouring sub-frames. In an embodiment, the transmission of PRE or POST may be determined jointly according to the ACK/NACK information for active cells. The PRE or POST may be transmitted simultaneously on both of the HARQ-ACK messages in the HARQ-ACK slot of the same sub-frame.

At sub-frame n, if the information received on HS-SCCH from any cell is not discarded, the WTRU may transmit PRE on the HARQ-ACK messages at sub-frame n−1, unless an ACK or NACK or any combination of ACK and NACK is to be transmitted for any cell in sub-frame n−1.

If ACK or NACK or any combination of ACK and NACK is transmitted for any cell in sub-frame n, the WTRU may transmit a POST on all HARQ-ACK messages in sub-frame n+2×N_acknack_transmit−1 unless ACK or NACK or PRE or any combination of ACK and NACK is to be transmitted for any cell in this sub-frame.

If ACK or NACK or any combination of ACK and NACK is transmitted for any cell in sub-frame n, and N_acknack_transmit>1, the WTRU may transmit a POST on all HARQ-ACK messages in sub-frame n+2×N_acknack_transmit−2 unless ACK or NACK or PRE or any combination of ACK and NACK is to be transmitted for any cell in this sub-frame.

Figures 60, 61:
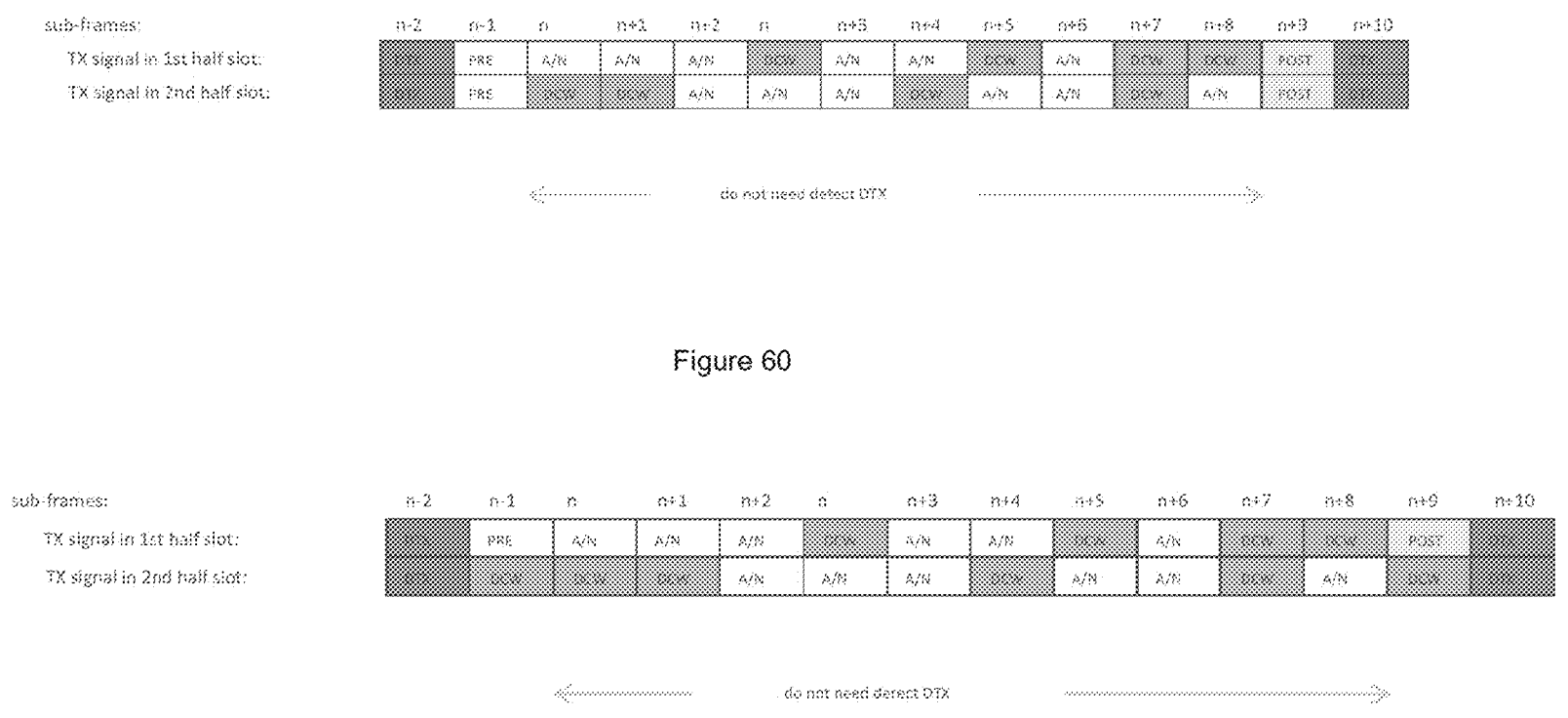

FIG. 60 illustrates the actual transmitted signal with PREs/POSTs being filled for the example described in FIG. 58.

FIG. 61 shows transmit PRE/POST on the first HARQ-ACK message. The PRE/POST may be restricted to transmit on the 1st or 2nd half slot, which may carry the ACK/NACK information for the primary cell. The PRE/POST may be restricted to transmit on the 1st HARQ-ACK message. On the other half slot, DCW may be transmitted.

In an embodiment, codebook may be optimized. For example, the size of the codebook may be reduced such that the amount of feedback associated to multi-carrier operations may be reduced. For example, the size of the codebook may be reduced by associating the same feedback codeword to many different events. Through many-to-one mapping, the receiver, such as a base station in this case, may not be capable of distinguishing between the events. The impact of this ambiguity may be minimal when the proper set of restrictions or groupings are used.

Table 44A shows example combinations of HARQ-ACK states for 3 carriers without MIMO. In an initial design without optimization, simultaneous transmission over 3 carriers would result in a total number of HARQ-ACK states in the codebook equal to $3^3-1=26$, as listed in Table 44A.

TABLE 44A

| A/D/D/ | A/N/D/ | N/A/D/ | D/D/A/ | D/N/A/ |
| A/D/A/ | A/N/A/ | N/A/A/ | D/D/N/ | D/N/N/ |
| A/D/N/ | A/N/N/ | N/A/N/ | D/A/D/ | |
| A/A/D/ | N/D/D/ | N/N/D/ | D/A/A/ | |
| A/A/A/ | N/D/A/ | N/N/A/ | D/A/N/ | |
| A/A/N/ | N/D/N/ | N/N/N/ | D/N/D/ | |

In an embodiment, carrier DTX restriction may be applied to optimize codebook. For example, the discontinuous transmission operation on one specific carrier may be not allowed unless the other configured carriers are also in the DTX state. For example, an anchor carrier may be chosen as this specific carrier over which the data transmission is scheduled with higher priority if there is any. If the WTRU fails to detect the HS-SCCH on this carrier while it succeeds on any of the other carriers, the WTRU may map DTX to NACK in its feedback for this carrier, knowing that it is not DTX'd in fact.

An example optimized set of the reported HARQ-ACK states is shown in Table 44B. For example, the total number of states may be reduced from 26 to 18.

TABLE 44B

| A/D/D/ | A/N/D/ | N/A/D/ |
| A/D/A/ | A/N/A/ | N/A/A/ |
| A/D/N/ | A/N/N/ | N/A/N/ |
| A/A/D/ | N/D/D/ | N/N/D/ |
| A/A/A/ | N/D/A/ | N/N/A/ |
| A/A/N/ | N/D/N/ | N/N/N/ |

Table 49 shows example optimized set of the reported HARQ-ACK states for 4 non-MIMO carrier. The original codebook size before the optimization is 80. Upon applying carrier DTX restriction optimization, the effective size may be reduced to 54, as shown in Table 49.

TABLE 49

| A/D/D/D | A/A/D/A | A/N/D/N | N/D/A/D | N/A/A/A | N/N/A/N |
| A/D/D/A | A/A/D/N | A/N/A/D | N/D/A/A | N/A/A/N | N/N/N/D |
| A/D/D/N | A/A/A/D | A/N/A/A | N/D/A/N | N/A/N/D | N/N/N/A |
| A/D/A/D | A/A/A/A | A/N/A/N | N/D/N/D | N/A/N/A | N/N/N/N |
| A/D/A/A | A/A/A/N | A/N/N/D | N/D/N/A | N/A/N/N | |
| A/D/A/N | A/A/N/D | A/N/N/A | N/D/N/N | N/N/D/D | |
| A/D/N/D | A/A/N/A | A/N/N/N | N/A/D/D | N/N/D/A | |
| A/D/N/A | A/A/N/N | N/D/D/D | N/A/D/A | N/N/D/N | |
| A/D/N/N | A/N/D/D | N/D/D/A | N/A/D/N | N/N/A/D | |
| A/A/D/D | A/N/D/A | N/D/D/N | N/A/A/D | N/N/A/A | |

In an embodiment, ordered DTX restriction may be applied to optimize codebook. For example, the configured carriers may be arranged in a specific order. When the network decides to DTX some carriers for downlink data transmission, it may sequentially select the low (or high) rank ones first. Some carriers may be known to transmit by the WTRU as implied or reasoned from the DTX status of the low (or high) ranked carriers. If the WTRU fails to detect HS-SCCH on these carriers, The WTRU may replace DTX by NACK in the feedback for these carriers, knowing they are not in fact DTX'd.

Table 44C shows example optimized set of HARQ-ACK states for 3 carriers without MIMO. The resulting table of the reported HARQ-ACK states is shown in Table 44C, which has a size of 15.

TABLE 44C

| | | |
|---|---|---|
| D/D/D/ | A/N/D/ | N/A/A/ |
| A/D/D/ | A/N/A/ | N/A/N/ |
| A/A/D/ | A/N/N/ | N/N/D/ |
| A/A/A/ | N/D/D/ | N/N/A/ |
| A/A/N/ | N/A/D/ | N/N/N/ |

Table 50 shows an example optimized set of HARQ-ACK states for 4 carriers without MIMO. Upon applying ordered DTX restriction optimization, the codebook size may be reduced to 30, as shown in Table 50.

TABLE 50

| | | |
|---|---|---|
| A/D/D/D | A/N/A/A | N/A/N/D |
| A/A/D/D | A/N/A/N | N/A/N/A |
| A/A/A/D | A/N/N/D | N/A/N/N |
| A/A/A/A | A/N/N/A | N/N/D/D |
| A/A/A/N | A/N/N/N | N/N/A/D |
| A/A/N/D | N/D/D/D | N/N/A/A |
| A/A/N/A | N/A/D/D | N/N/A/N |
| A/A/N/N | N/A/A/D | N/N/N/D |
| A/N/D/D | N/A/A/A | N/N/N/A |
| A/N/A/D | N/A/A/N | N/N/N/N |

In an embodiment, the reported HARQ-ACK states may be directly encoded by the 10 bit binary codewords as specified in Table 45. In Table 45, each row of the binary numbers represents a codeword that is labeled from c1 to c26. For example, the HARQ-ACK states described in Table 44A may be mapped to the binary codewords in Table 45 in a combination. An example mapping is shown in Table 46. The mapping may maintain backward compatibility with the 3GPP WCDMA Release 8 standard as c1 to c8 actually are purposely arranged to be identical to the legacy codebook in the standard.

TABLE 45

| codeword name | binary codewords | | | | | | | | | |
|---|---|---|---|---|---|---|---|---|---|---|
| c1  | 1 | 1 | 1 | 1 | 1 | 1 | 1 | 1 | 1 | 1 |
| c2  | 0 | 0 | 0 | 0 | 0 | 0 | 0 | 0 | 0 | 0 |
| c3  | 1 | 1 | 1 | 1 | 1 | 0 | 0 | 0 | 0 | 0 |
| c4  | 0 | 0 | 0 | 0 | 0 | 1 | 1 | 1 | 1 | 1 |
| c5  | 1 | 0 | 1 | 0 | 1 | 0 | 1 | 0 | 1 | 0 |
| c6  | 1 | 1 | 0 | 0 | 1 | 1 | 0 | 0 | 1 | 1 |
| c7  | 0 | 0 | 1 | 1 | 0 | 0 | 1 | 1 | 0 | 0 |
| c8  | 0 | 1 | 0 | 1 | 0 | 1 | 0 | 1 | 0 | 1 |
| c9  | 1 | 0 | 1 | 0 | 0 | 1 | 0 | 0 | 0 | 1 |
| c10 | 0 | 1 | 1 | 0 | 1 | 1 | 0 | 1 | 1 | 0 |
| c11 | 1 | 0 | 1 | 1 | 0 | 1 | 0 | 1 | 1 | 0 |
| c12 | 0 | 0 | 0 | 1 | 1 | 1 | 0 | 0 | 1 | 0 |
| c13 | 0 | 0 | 1 | 1 | 1 | 1 | 1 | 0 | 0 | 1 |
| c14 | 1 | 0 | 0 | 1 | 1 | 0 | 1 | 1 | 0 | 1 |
| c15 | 1 | 0 | 0 | 1 | 0 | 0 | 0 | 0 | 1 | 1 |
| c16 | 0 | 1 | 1 | 1 | 0 | 1 | 1 | 0 | 1 | 0 |
| c17 | 1 | 1 | 0 | 0 | 0 | 0 | 0 | 1 | 1 | 0 |
| c18 | 0 | 1 | 1 | 0 | 1 | 0 | 1 | 1 | 0 | 1 |
| c19 | 1 | 0 | 0 | 1 | 0 | 1 | 1 | 0 | 0 | 0 |
| c20 | 0 | 1 | 0 | 1 | 1 | 0 | 1 | 1 | 1 | 0 |
| c21 | 1 | 0 | 0 | 0 | 1 | 1 | 0 | 1 | 0 | 0 |
| c22 | 1 | 1 | 1 | 0 | 0 | 1 | 1 | 0 | 0 | 0 |
| c23 | 0 | 1 | 1 | 0 | 0 | 0 | 0 | 0 | 1 | 1 |
| c24 | 0 | 1 | 0 | 0 | 1 | 1 | 1 | 0 | 0 | 0 |
| c25 | 1 | 1 | 0 | 0 | 0 | 0 | 1 | 0 | 0 | 1 |
| c26 | 0 | 0 | 1 | 1 | 1 | 0 | 0 | 1 | 1 | 1 |

TABLE 46

| codeword name | HARQ-ACK states |
|---|---|
| c1 | A/D/D |
| c2 | N/D/D |
| c3 | D/A/D |
| c4 | D/N/D |
| c5 | A/A/D |
| c6 | A/N/D |
| c7 | N/A/D |
| c8 | N/N/D |
| c9 | D/D/A |
| c10 | D/D/N |
| c11 | A/D/A |
| c12 | A/D/N |
| c13 | N/D/A |
| c14 | N/D/N |
| c15 | D/A/A |
| c16 | D/A/N |
| c17 | D/N/A |
| c18 | D/N/N |
| c19 | A/A/A |
| c20 | A/A/N |
| c21 | A/N/A |
| c22 | A/N/N |
| c23 | N/A/A |
| c24 | N/A/N |
| c25 | N/N/A |
| c26 | N/N/N |

Table 47 shows the design of a complete HARQ-ACK codebook with binary codeword mapping for PRE and POST states.

TABLE 47

| HARQ-ACT states | codewords | | | | | | | | | |
|---|---|---|---|---|---|---|---|---|---|---|
| A/D/D | 1 | 1 | 1 | 1 | 1 | 1 | 1 | 1 | 1 | 1 |
| N/D/D | 0 | 0 | 0 | 0 | 0 | 0 | 0 | 0 | 0 | 0 |
| D/A/D | 1 | 1 | 1 | 1 | 1 | 0 | 0 | 0 | 0 | 0 |
| D/N/D | 0 | 0 | 0 | 0 | 0 | 1 | 1 | 1 | 1 | 1 |
| A/A/D | 1 | 0 | 1 | 0 | 1 | 0 | 1 | 0 | 1 | 0 |
| A/N/D | 1 | 1 | 0 | 0 | 1 | 1 | 0 | 0 | 1 | 1 |
| N/A/D | 0 | 0 | 1 | 1 | 0 | 0 | 1 | 1 | 0 | 0 |
| N/N/D | 0 | 1 | 0 | 1 | 0 | 1 | 0 | 1 | 0 | 1 |
| D/D/A | 1 | 0 | 1 | 0 | 0 | 1 | 0 | 0 | 0 | 1 |
| D/D/N | 0 | 1 | 1 | 0 | 1 | 1 | 0 | 1 | 1 | 0 |
| A/D/A | 1 | 0 | 1 | 1 | 0 | 1 | 0 | 1 | 1 | 0 |
| A/D/N | 0 | 0 | 0 | 1 | 1 | 1 | 0 | 0 | 1 | 0 |
| N/D/A | 0 | 0 | 1 | 1 | 1 | 1 | 1 | 0 | 0 | 1 |
| N/D/N | 1 | 0 | 0 | 1 | 1 | 0 | 1 | 1 | 0 | 1 |
| D/A/A | 1 | 0 | 0 | 1 | 0 | 0 | 0 | 0 | 1 | 1 |
| D/A/N | 0 | 1 | 1 | 1 | 0 | 1 | 1 | 0 | 1 | 0 |
| D/N/A | 1 | 1 | 0 | 0 | 0 | 0 | 0 | 1 | 1 | 0 |
| D/N/N | 0 | 1 | 1 | 0 | 1 | 0 | 1 | 1 | 0 | 1 |
| A/A/A | 1 | 0 | 0 | 1 | 0 | 1 | 1 | 0 | 0 | 0 |
| A/A/N | 0 | 1 | 0 | 1 | 1 | 0 | 1 | 1 | 1 | 0 |
| A/N/A | 1 | 0 | 0 | 0 | 1 | 1 | 0 | 1 | 0 | 0 |
| A/N/N | 1 | 1 | 1 | 0 | 0 | 1 | 1 | 0 | 0 | 0 |
| N/A/A | 0 | 1 | 1 | 0 | 0 | 0 | 0 | 0 | 1 | 1 |
| N/A/N | 0 | 1 | 0 | 0 | 1 | 1 | 1 | 0 | 0 | 0 |
| N/N/A | 1 | 1 | 0 | 0 | 0 | 0 | 1 | 0 | 0 | 1 |
| N/N/N | 0 | 0 | 1 | 1 | 1 | 0 | 0 | 1 | 1 | 1 |
| PRE | 0 | 0 | 1 | 0 | 0 | 1 | 0 | 0 | 1 | 0 |
| POST | 0 | 1 | 0 | 0 | 1 | 0 | 0 | 1 | 0 | 0 |

In an embodiment, per-state DTX restriction may be applied to optimize codebook. A set of specific carrier DTX states that may be related to the combinations of DTX status of the configured carriers may be defined. One or more of the states in the set may be restricted not to occur in the network scheduling. If a combination in the set is detected at UE because of the misdetection of HS-SCCH in some carriers, the UE may replace DTX by NACK in a feedback for these carriers, knowing they are not in fact DTXed.

In an embodiment, the carrier DTX restriction optimization may be used in conjunction with per-state DTX restriction optimization. Table 51 shows an example optimized set of HARQ-ACK states for 4 carriers without MIMO. As shown in Table 51, the HARQ-ACK states marked with dots and cross-hatch may be eliminated from the original table. This approach may take advantage of the encoding schemes for dual carrier operation in combination with MIMO as specified in Release 9, by having a table size of the reported HARQ-ACK states of 48 or smaller, excluding PRE/POST states. The states marked with cross-hatch may be obtained from the restricted DTX state, TX/DTX/TX/TX. For example, the second carrier may be DTXed when the other 3 carriers are transmitting. The states marked with dots obtained using carrier DTX restriction optimization.

TABLE 51

| D/D/D/A | D/A/D/N | D/N/A/D | ~~A/D/A/A~~ | A/A/A/N | A/N/N/D | ~~N/D/N/A~~ | N/A/N/N |
|---|---|---|---|---|---|---|---|
| D/D/D/N | D/A/A/D | D/N/A/A | ~~A/D/A/N~~ | A/A/N/D | A/N/N/A | ~~N/D/N/N~~ | N/N/D/D |
| D/D/A/D | D/A/A/A | D/N/A/N | A/D/N/D | A/A/N/A | A/N/N/N | N/A/D/D | N/N/D/A |
| D/D/A/A | D/A/A/N | D/N/N/D | ~~A/D/N/A~~ | A/A/N/N | N/D/D/D | N/A/D/A | N/N/D/N |
| D/D/A/N | D/A/N/D | D/N/N/A | ~~A/D/N/N~~ | A/N/D/D | N/D/D/A | N/A/D/N | N/N/A/D |
| D/D/N/D | D/A/N/A | D/N/N/N | A/A/D/D | A/N/D/A | N/D/D/N | N/A/A/D | N/N/A/A |
| D/D/N/A | D/A/N/N | A/D/D/D | A/A/D/A | A/N/D/N | N/D/A/D | N/A/A/A | N/N/A/N |
| D/D/N/N | D/N/D/D | A/D/D/A | A/A/D/N | A/N/A/D | ~~N/D/A/A~~ | N/A/A/N | N/N/N/D |
| D/A/D/D | D/N/D/A | A/D/D/N | A/A/A/D | A/N/A/A | ~~N/D/A/N~~ | N/A/N/D | N/N/N/A |
| D/A/D/A | D/N/D/N | A/D/A/D | A/A/A/A | A/N/A/N | N/D/N/D | N/A/N/A | N/N/N/N |

The design cases described below are exemplary and are not meant to provide an exhaustive list of all the combinations.

For example, a reduced spread factor of 128 may be used for HS-DPCCH channel such that the number of data bits per HS-DPCCH slot may doubled compared to dual-carrier HSDPA system with a spreading factor of 256. A secondary carrier may be deactivated when four carriers are configured, and HS-DPCCH may use spread factor of 128. Whether the carrier is configured in multiple input multiple output (MIMO) or non-MIMO mode and the number of non-MIMO carriers may impact HS-DPCCH channel coding design.

Figure 62:
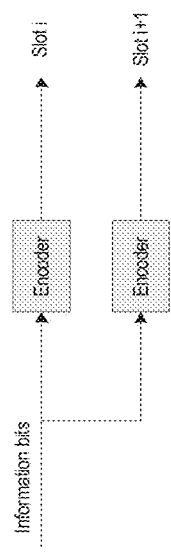
FIG. 62 shows an example encoding process.

For example, this may result in unused one slot or one subslot within each HS-DPCCH subframe. In an embodiment, repetition coding may be performed such that vacant slots may be used. FIG. 62 shows an example encoding process. As shown in FIG. 62, the same information bits may go through two same encoders, one for slot i, the other for slot i+1. However, investigating more efficient solutions than the simple code repetition, without significantly increasing decoding complexity is desirable.

Figure 63:
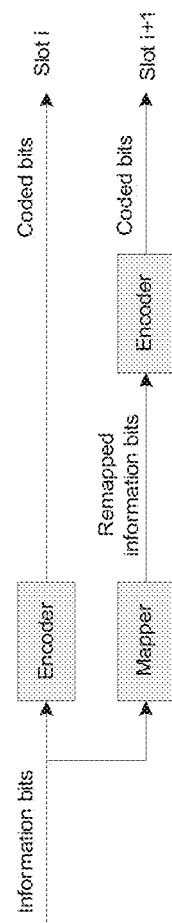
FIG. 63 shows an example encoding process.

FIG. 63 shows an example encoding process. As shown, before applying the encoder on slot i+1, a mapper may map the information bits in a way such that the obtained coded bits for slot i+1, in combination with the coded bits for slot i, may meet a certain criteria. For example, the information bit may be mapped such that the optimal decoding performance may be achieved. The encoder on slot i+1 may be the same as the encoder used for slot i.

Figure 64:
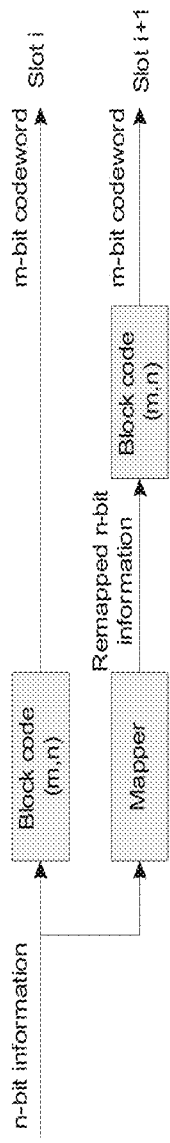
FIG. 64 illustrates an example coding scheme.

FIG. 64 illustrates an example coding scheme when the encoder is a (m,n) block code. As the two (m,n) block coding in FIG. 63 may be treated as a single (2m,n) block coding, one design criteria for the mapper may be maximization of the minimum codeword distance of the (2m,n) block code.

Figure 65:
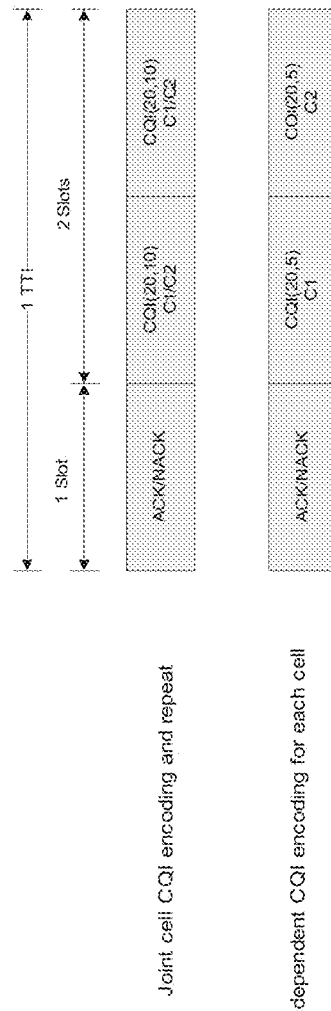
FIG. 65 illustrates example to HS-DPCCH layout.

FIG. 65 illustrates example to HS-DPCCH layout. As a result of the 4 millisecond (ms) minimum CQI feedback cycle, as shown in FIG. 65, CQI may be encoded. For example, joint cell CQI encoding and repeat (single Dual Cell (DC) CQI coding with repetition) may be implemented.

For example, independent CQI encoding for each cell (dual Single Cell (SC) CQI coding) may be implemented.

Figure 66:
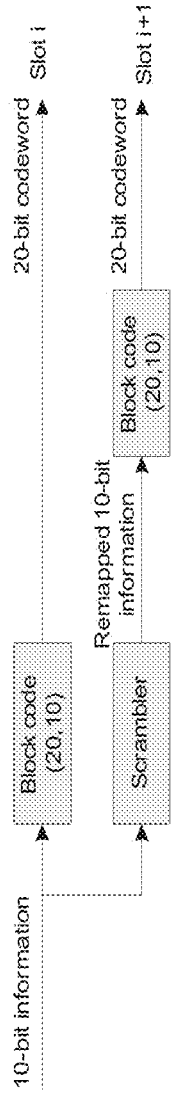
FIG. 66 illustrates an example coding scheme.

FIG. 66 illustrates an example coding scheme. For example, a scrambler, one type of the mapper, is used in this implementation.

Figure 67:
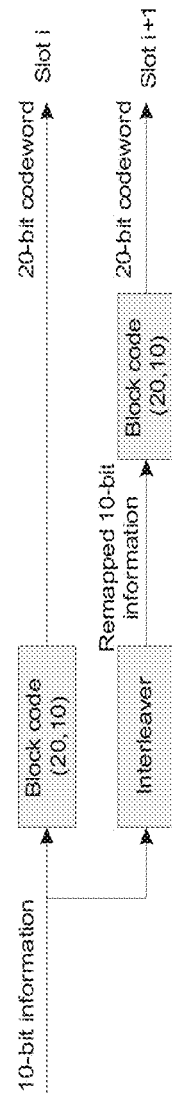
FIG. 67 illustrates an example coding scheme.

FIG. 67 illustrates an example coding scheme. For example, an interleaver may used to map the 10-bit information before applying the (20,10) block code.

Figure 68:
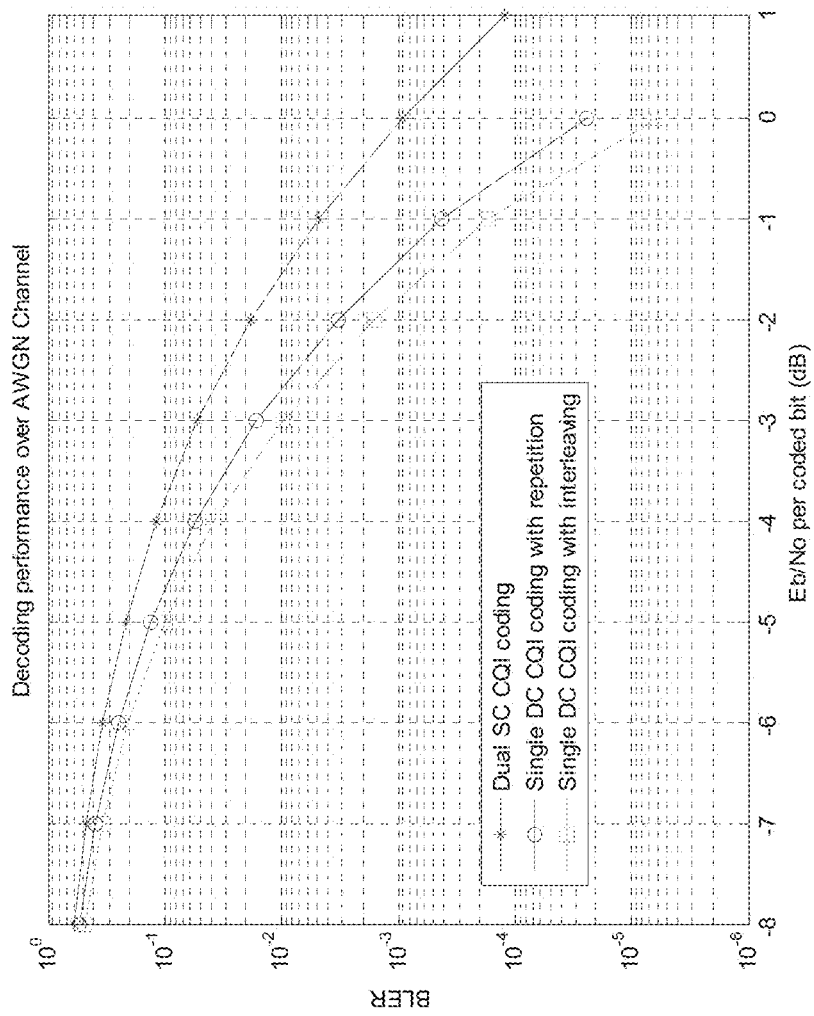
FIG. 68 shows the performance gain of this scheme over repetition coding.

FIG. 68 shows the performance gain of this scheme over repetition coding. Using computer search, an interleaver [10 9 8 5 3 7 6 2 1 4] (e.g., with input [s1 s2 s3 s4 s5 s6 s7 s8 s9 s10], the interleaver output may be [s10 s9 s8 s5 s3 s7 s6 s2 s1 s4]) maximizing the minimum weight of the (40,10) codeword may be used in the simulations.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:
1. A wireless transmit/receive unit (WTRU), comprising:
a processor configured to:
determine that the WTRU is configured with a plurality of serving cells comprising one primary serving cell and a plurality of secondary serving cells;
determine that at least one of the plurality of secondary serving cells is deactivated;
encode uplink feedback information associated with at least the primary serving cell;
determine a slot format for transmitting the encoded uplink feedback information via a high speed dedicated physical control channel (HS-DPCCH) based on the number of secondary serving cells that the WTRU is configured with and whether multiple-input multiple-output (MIMO) is configured in at least one of the plurality of serving cells;

send the encoded uplink feedback information in accordance with the determined slot format in a first portion of an HS-DPCCH sub-frame; and repeat the encoded uplink feedback information in accordance with the determined slot format in a second portion of the HS-DPCCH sub-frame.

2. The WTRU of claim 1, wherein the plurality of serving cells comprises the primary serving cell and an active secondary serving cell, and the uplink feedback information comprises hybrid automatic repeat request (HARQ) information.

3. The WTRU of claim 2, wherein the encoding of the uplink feedback information comprises jointly encoding HARQ information for the primary serving cell and HARQ information for the active secondary serving cell to form jointly-coded HARQ information.

4. The WTRU of claim 3, wherein the repeating of the encoded uplink feedback information comprises repeating the jointly-coded HARQ information to fill a time slot allocated for HARQ feedback transmission in the HS-DPCCH sub-frame.

5. The WTRU of claim 1, wherein the plurality of serving cells comprises the primary serving cell and three or more enabled secondary serving cells, at least two of the three or more enabled secondary serving cells are deactivated, and the uplink feedback information comprises channel quality indicator (CQI) information.

6. The WTRU of claim 5, wherein the repeating of the encoded uplink feedback information comprises repeating CQI information for at least the primary serving cell to fill two time slots allocated for CQI/precoding control indication (PCI) feedback transmission in the HS-DPCCH sub-frame.

7. The WTRU of claim 1, wherein the plurality of serving cells comprises a plurality of active serving cells, and the encoding of the uplink feedback information comprises independently encoding CQI information for each of the plurality of active serving cells.

8. The WTRU of claim 1, wherein the uplink feedback information comprises channel quality indicator (CQI) information, and wherein when the plurality of serving cells comprises the primary serving cell and two enabled secondary serving cells, and MIMO is configured in at least one of the plurality of serving cells, the repeating of the encoded uplink feedback information comprises repeating CQI information for at least the primary serving cell to fill a plurality of time slots allocated for CQI feedback transmission in the HS-DPCCH sub-frame.

9. The WTRU of claim 1, wherein the determined slot format comprises a spreading factor of 128.

10. The WTRU of claim 1, wherein the plurality of serving cells comprises the primary serving cell and two active secondary serving cells, MIMO is configured in at least one of the plurality of serving cells, the uplink feedback information comprises hybrid automatic repeat request (HARQ) information, and the processor is configured to send the HARQ information using a quantized amplitude ratio translated from a maximum value between a signaled value $\Delta$ACK+2 and a signaled value $\Delta$NACK+2 when the HARQ information comprises at least one of both ACK and NACK, a PRE, or a POST.

11. A method for sending uplink feedback information from a wireless transmit/receive unit (WTRU), the method comprising:

determining that the WTRU is configured with a plurality of serving cells comprising one primary serving cell and a plurality of secondary serving cells;

determining that at least one of the plurality of secondary serving cells is deactivated;

encoding uplink feedback information associated with at least the primary serving cell;

determining a slot format for transmitting the encoded uplink feedback information via a high speed dedicated physical control channel (HS-DPCCH) based on the number of secondary serving cells that the WTRU is configured with and whether multiple-input multiple-output (MIMO) is configured in at least one of the plurality of serving cells;

sending the encoded uplink feedback information in accordance with the determined slot format in a first portion of an HS-DPCCH sub-frame; and repeating the encoded uplink feedback information in accordance with the determined slot format in a second portion of the HS-DPCCH sub-frame.

12. The method of claim 11, wherein the plurality of serving cells comprises the primary serving cell and an active secondary serving cell, and the uplink feedback information comprises hybrid automatic repeat request (HARQ) information.

13. The method of claim 12, wherein the encoding of the uplink feedback information comprises jointly encoding HARQ information for the primary serving cell and HARQ information for the active secondary serving cell to form jointly-coded HARQ information.

14. The method of claim 13, wherein the repeating of the encoded uplink feedback information comprises repeating the jointly-coded HARQ information to fill a time slot allocated for HARQ feedback transmission in the HS-DPCCH sub-frame.

15. The method of claim 11, wherein the plurality of serving cells comprises the primary serving cell and three or more enabled secondary serving cells, at least two of the three or more enabled secondary serving cells are deactivated, and the uplink feedback information comprises channel quality indicator (CQI) information.

16. The method of claim 15, wherein the repeating of the encoded uplink feedback information comprises repeating CQI information associated with at least the primary serving cell to fill two time slots allocated for CQI/precoding control indication (PCI) feedback transmission in the HS-DPCCH sub-frame.

17. The method of claim 11, wherein the plurality of serving cells comprises a plurality of active serving cells, and the encoding of the uplink feedback information comprises independently encoding CQI information for each of the plurality of active serving cells.

18. The method of claim 11, wherein the uplink feedback information comprises channel quality indicator (CQI) information, and wherein when the plurality of serving cells comprises the primary serving cell and two enabled secondary serving cells, and MIMO is configured in at least one of the plurality of serving cells, the repeating of the encoded uplink feedback information comprises repeating CQI information for at least the primary serving cell to fill a plurality of time slots allocated for CQI feedback transmission in the HS-DPCCH sub-frame.

19. The method of claim 11, wherein the determined slot format comprises a spreading factor of 128.

20. The method of claim 11, wherein the plurality of serving cells comprises the primary serving cell and two active secondary serving cells, MIMO is configured in at least one of the plurality of serving cells, the uplink feedback information comprises hybrid automatic repeat request (HARQ) information, and the method comprises:

sending the HARQ information using a quantized amplitude ratio translated from a maximum value between a signaled value $\Delta ACK+2$ and a signaled value $\Delta NACK+2$ when the HARQ information comprises at least one of both ACK and NACK, a PRE, or a POST.

* * * * *